US010847985B2

(12) United States Patent
Waters et al.

(10) Patent No.: US 10,847,985 B2
(45) **Date of Patent: *Nov. 24, 2020**

(54) FLASHLIGHT WITH LONGITUDINAL COOLING FINS

(71) Applicants: Michael Waters, Aspen, CO (US); Charles Waters, Aspen, CO (US)

(72) Inventors: Michael Waters, Aspen, CO (US); Charles Waters, Aspen, CO (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/120,015

(22) Filed: Aug. 31, 2018

(65) Prior Publication Data

US 2019/0074701 A1 Mar. 7, 2019

Related U.S. Application Data

(63) Continuation of application No. 14/957,457, filed on Dec. 2, 2015, now Pat. No. 10,069,318.

(60) Provisional application No. 62/118,308, filed on Feb. 19, 2015, provisional application No. 62/086,586, filed on Dec. 2, 2014.

(51) Int. Cl.

| | |
|---|---|
| ***F21L 4/00*** | (2006.01) |
| ***H02J 7/00*** | (2006.01) |
| ***F21L 4/08*** | (2006.01) |
| ***F21V 23/04*** | (2006.01) |
| ***F21V 29/76*** | (2015.01) |
| ***G08B 5/36*** | (2006.01) |

(52) U.S. Cl.

CPC ............ *H02J 7/0047* (2013.01); *F21L 4/005* (2013.01); *F21L 4/085* (2013.01); *F21V 23/045* (2013.01); *F21V 23/0414* (2013.01); *F21V 29/763* (2015.01); *G08B 5/36* (2013.01)

(58) Field of Classification Search

CPC .. F21L 4/08; F21L 13/00; F21V 15/01; F21V 29/503; F21V 29/74; F21V 29/76; F21V 29/763

See application file for complete search history.

(56) References Cited

U.S. PATENT DOCUMENTS

| | | | |
|---|---|---|---|
| 1,261,824 | A | 1/1918 | La Vine |
| 1,255,265 | A | 2/1918 | Zachara |
| 1,438,586 | A | 12/1922 | Eaton |

(Continued)

FOREIGN PATENT DOCUMENTS

| | | | |
|---|---|---|---|
| CA | 2466175 | A1 | 5/2003 |
| CA | 2608746 | A1 | 11/2006 |

(Continued)

OTHER PUBLICATIONS

Notification of Transmittal of the International Search Report and the Written Opinion of the International Searching Authority, or the Declaration from the International Bureau of WIPO for International Application No. PCT/US2015/063536 dated Mar. 29, 2016, 12 pages.

*Primary Examiner* — Ismael Negron

(74) *Attorney, Agent, or Firm* — Fitch, Even, Tabin & Flannery LLP

(57) ABSTRACT

Flashlights include an elongated housing, a power source, a switch, and LED light source disposed in a forward portion of the housing to project light through an opening on a forward surface of the housing, and a cooling fin structure extending rearwardly from the forward surface to effectively dissipate generated heat.

10 Claims, 51 Drawing Sheets

(56) References Cited

U.S. PATENT DOCUMENTS

| | | | |
|---|---|---|---|
| 1,448,353 A | | 3/1923 | Barany |
| 1,572,210 A | | 2/1926 | Kolibas |
| 1,615,067 A | | 1/1927 | Boerman |
| 1,879,512 A | | 9/1932 | Rotea |
| 2,196,543 A | | 4/1940 | Anderson |
| 2,461,254 A | | 2/1949 | Bassett |
| 2,531,585 A | | 11/1950 | Pope |
| 2,567,046 A | | 9/1951 | Anderson |
| 2,591,112 A | | 4/1952 | Zwierzynski |
| 2,638,532 A | | 5/1953 | Brady |
| 2,904,670 A | | 9/1959 | Calmes |
| 2,966,580 A | | 12/1960 | Taylor |
| 2,966,872 A | | 1/1961 | Schmocker |
| 3,060,308 A | | 10/1962 | Fortuna |
| D207,919 S | | 6/1967 | Fai |
| 3,350,552 A | | 10/1967 | Lawrence |
| D215,751 S | | 10/1969 | Castellano |
| 3,602,759 A | | 8/1971 | Evans |
| 3,634,676 A | | 1/1972 | Castellano |
| 3,647,059 A | | 3/1972 | Humphreys |
| 3,683,168 A | | 8/1972 | Tatje |
| 3,769,663 A | | 11/1973 | Perl |
| D229,975 S | | 1/1974 | Klugmann |
| 3,793,517 A | | 2/1974 | Carlini |
| 4,210,952 A | | 7/1980 | Ressmeyer |
| 4,254,451 A | | 3/1981 | Cochran, Jr. |
| 4,283,127 A | | 8/1981 | Rosenwinkel et al. |
| 4,332,007 A | | 5/1982 | Gibstein et al. |
| 4,406,040 A | | 9/1983 | Cannone |
| D274,845 S | | 7/1984 | Stansbury |
| 4,462,064 A | | 7/1984 | Schweitzer |
| 4,516,157 A | | 5/1985 | Campbell |
| 4,541,698 A | | 9/1985 | Lerner |
| 4,570,206 A | | 2/1986 | Deutsch |
| 4,616,297 A | | 10/1986 | Liu |
| 4,631,644 A | | 12/1986 | Dannhauer |
| 4,648,013 A | | 3/1987 | Curiel |
| 4,680,682 A | | 7/1987 | Parker |
| D296,012 S | * | 5/1988 | Petterson ........................ D26/46 |
| D296,477 S | | 6/1988 | Powell |
| 4,774,643 A | | 9/1988 | McGinnis et al. |
| 4,782,432 A | | 11/1988 | Coffman |
| D298,860 S | | 12/1988 | Witte |
| 4,822,160 A | | 4/1989 | Tsai |
| 4,822,161 A | | 4/1989 | Jimmy |
| 4,904,078 A | | 2/1990 | Gorike |
| 4,959,760 A | | 9/1990 | Wu |
| 4,963,045 A | | 10/1990 | Willcox |
| 5,070,436 A | | 12/1991 | Alexander et al. |
| 5,113,325 A | | 5/1992 | Eisenbraun |
| 5,122,943 A | | 6/1992 | Pugh |
| 5,140,220 A | | 8/1992 | Hasegawa |
| 5,143,443 A | | 9/1992 | Madsen |
| 5,158,356 A | | 10/1992 | Guthrie |
| 5,164,749 A | | 11/1992 | Shelton |
| 5,174,649 A | | 12/1992 | Alston |
| 5,183,326 A | | 2/1993 | Case |
| 5,189,512 A | | 2/1993 | Cameron et al. |
| 5,218,385 A | | 6/1993 | Lii |
| 5,230,558 A | | 7/1993 | Jong |
| 5,245,516 A | | 9/1993 | de Haas et al. |
| D343,470 S | | 1/1994 | Yuen |
| 5,278,734 A | | 1/1994 | Ferber |
| D349,123 S | | 7/1994 | Cooley et al. |
| 5,331,333 A | | 7/1994 | Tagawa et al. |
| 5,331,357 A | | 7/1994 | Cooley et al. |
| 5,367,345 A | | 11/1994 | da Silva |
| 5,386,351 A | | 1/1995 | Tabor |
| D355,272 S | | 2/1995 | Chabria |
| 5,438,698 A | | 8/1995 | Burton et al. |
| 5,452,190 A | | 9/1995 | Priesemuth |
| 5,459,671 A | | 10/1995 | Duley |
| 5,460,346 A | | 10/1995 | Hirsch |
| 5,485,358 A | | 1/1996 | Chien |
| D369,422 S | | 4/1996 | Dalton |
| 5,541,767 A | | 7/1996 | Murphy et al. |
| 5,541,816 A | | 7/1996 | Miserendino |
| 5,546,099 A | | 8/1996 | Quint et al. |
| D375,372 S | | 11/1996 | Allen |
| 5,575,554 A | | 11/1996 | Guritz |
| 5,606,743 A | | 2/1997 | Vogt et al. |
| 5,608,808 A | | 3/1997 | da Silva |
| 5,610,678 A | | 3/1997 | Tsuboi et al. |
| D383,754 S | | 9/1997 | Yuen |
| D383,863 S | | 9/1997 | Yuen |
| 5,667,291 A | | 9/1997 | Caplan |
| 5,667,292 A | | 9/1997 | Sabalvaro, Jr. |
| D388,113 S | | 12/1997 | Feinbloom |
| 5,708,449 A | | 1/1998 | Heacock |
| 5,722,762 A | | 3/1998 | Soll |
| 5,741,060 A | | 4/1998 | Johnson |
| 5,786,665 A | | 7/1998 | Ohtsuki et al. |
| 5,803,582 A | | 9/1998 | Huang |
| 5,806,961 A | | 9/1998 | Dalton et al. |
| 5,836,673 A | | 11/1998 | Lo |
| D405,901 S | | 2/1999 | Feinbloom |
| 5,871,271 A | | 2/1999 | Chien |
| 5,893,631 A | | 4/1999 | Padden |
| 5,918,966 A | | 7/1999 | Arnold |
| 5,946,071 A | | 8/1999 | Feldman |
| D417,019 S | | 11/1999 | Rachwal |
| 5,997,165 A | | 12/1999 | Lehrer |
| 6,005,536 A | | 12/1999 | Beadles et al. |
| 6,012,822 A | | 1/2000 | Robinson |
| 6,012,827 A | | 1/2000 | Caplan et al. |
| D420,035 S | | 2/2000 | Hartman |
| D425,228 S | | 5/2000 | Kibler |
| 6,056,413 A | | 5/2000 | Urso |
| D428,431 S | | 7/2000 | Jordan |
| 6,086,214 A | | 7/2000 | Ridge |
| 6,168,286 B1 | | 1/2001 | Duffy |
| 6,172,657 B1 | | 1/2001 | Kamakura et al. |
| 6,174,075 B1 | | 1/2001 | Fuwausa |
| 6,206,543 B1 | | 3/2001 | Henry |
| D445,928 S | | 7/2001 | Sharrah et al. |
| D446,324 S | | 8/2001 | Lynch et al. |
| 6,290,368 B1 | | 9/2001 | Lehrer |
| D449,703 S | | 10/2001 | Dalton |
| 6,299,323 B1 | | 10/2001 | Yu et al. |
| 6,302,570 B1 | | 10/2001 | Petell et al. |
| 6,305,818 B1 | | 10/2001 | Lebens et al. |
| 6,311,837 B1 | | 11/2001 | Blaustein et al. |
| 6,320,822 B1 | | 11/2001 | Okeya et al. |
| D453,580 S | | 2/2002 | Lynch |
| 6,367,949 B1 | | 4/2002 | Pederson |
| D457,670 S | | 5/2002 | Allen |
| 6,386,701 B1 | | 5/2002 | Khulusi |
| 6,390,640 B1 | | 5/2002 | Wong et al. |
| 6,439,738 B1 | | 8/2002 | Matthews et al. |
| 6,447,143 B2 | | 9/2002 | Krietzman et al. |
| 6,457,838 B1 | | 10/2002 | Dugmore et al. |
| 6,461,025 B1 | | 10/2002 | Payne |
| 6,474,830 B1 | | 11/2002 | Hansen |
| 6,491,408 B1 | | 12/2002 | Cooper et al. |
| D469,198 S | | 1/2003 | Olson |
| 6,504,099 B2 | | 1/2003 | Huang |
| 6,513,949 B1 | | 2/2003 | Marshall et al. |
| 6,523,973 B2 | | 2/2003 | Galli |
| 6,530,672 B2 | | 3/2003 | Galli |
| D473,890 S | | 4/2003 | Waters |
| 6,549,231 B1 | | 4/2003 | Matsui |
| 6,554,444 B2 | | 4/2003 | Shimada et al. |
| D475,149 S | | 5/2003 | Chun |
| D477,432 S | | 7/2003 | Parsons |
| 6,604,837 B2 | | 8/2003 | Sandberg |
| 6,612,695 B2 | | 9/2003 | Waters |
| 6,612,696 B2 | | 9/2003 | Waters |
| D484,905 S | | 1/2004 | Waters |
| 6,713,956 B2 | | 3/2004 | Hsing Chen et al. |
| 6,749,166 B2 | | 6/2004 | Valentine et al. |
| 6,764,194 B1 | | 7/2004 | Cooper |
| 6,787,999 B2 | | 9/2004 | Stimac |
| 6,802,636 B1 | | 10/2004 | Bailey, Jr. |
| 6,808,284 B1 | | 10/2004 | Chao |

(56) References Cited

U.S. PATENT DOCUMENTS 6,830,357 B2 12/2004 Lopez
D501,266 S 1/2005 Harris, Jr. et al.
6,857,739 B1 2/2005 Watson
6,860,628 B2 3/2005 Robertson
6,863,416 B2 3/2005 Waters
6,896,392 B2 * 5/2005 Jigamian .................. F21L 4/00 362/183
D507,368 S 7/2005 Waters
D507,369 S 7/2005 Waters
6,929,878 B2 8/2005 Chen et al.
6,966,668 B2 11/2005 Cugini
6,966,677 B2 11/2005 Galli
6,977,776 B2 12/2005 Volkenandt et al.
6,982,518 B2 1/2006 Chou
6,993,803 B2 2/2006 Chan
6,997,552 B1 2/2006 Hung
7,003,353 B1 2/2006 Parkhouse
7,004,582 B2 2/2006 Jannard et al.
7,008,074 B1 3/2006 Halm
7,021,790 B2 4/2006 Parsons
7,094,981 B2 8/2006 Sorrentino et al.
7,104,670 B2 9/2006 Waters
7,105,939 B2 9/2006 Bednyak
7,111,956 B2 9/2006 Brown
7,118,241 B2 10/2006 Sohn
7,118,262 B2 10/2006 Negley
7,147,324 B2 12/2006 Jannard et al.
7,150,526 B2 12/2006 Jannard et al.
D542,952 S 5/2007 Bhavnani
7,213,917 B2 5/2007 Jannard et al.
7,216,973 B2 5/2007 Jannard et al.
7,234,831 B1 6/2007 Hanley
7,226,180 B2 7/2007 Sung
7,255,437 B2 8/2007 Howell et al.
7,264,350 B2 9/2007 Jannard et al.
D553,177 S 10/2007 Chen
D553,276 S 10/2007 Campbell
7,278,734 B2 10/2007 Jannard et al.
7,281,826 B2 10/2007 Huang
7,311,417 B1 * 12/2007 Lemke ..................... F21L 4/00 362/158
7,314,286 B2 * 1/2008 Sharrah .................. F21L 4/025 320/113
D568,922 S 5/2008 Anderl
D569,023 S 5/2008 Lee
7,377,664 B2 5/2008 Waters
7,438,409 B2 10/2008 Jordan
D580,077 S 11/2008 Sham
7,524,089 B2 * 4/2009 Park ......................... F21V 3/02 362/294
D592,339 S 5/2009 Crawford
7,549,772 B2 6/2009 Wang
7,562,979 B2 7/2009 Waters
D600,738 S 9/2009 Su et al.
7,607,775 B2 10/2009 Hermanson et al.
7,618,154 B2 * 11/2009 Rosiello ................... F21L 4/00 362/202
D606,688 S 12/2009 Ma
7,661,818 B2 2/2010 Waters
D611,086 S 3/2010 Meng-Suen
7,670,023 B1 3/2010 Peterson
7,699,486 B1 4/2010 Beiner
D617,826 S 6/2010 Waters
7,726,844 B2 6/2010 Chen
7,784,969 B2 * 8/2010 Reisenauer ............. F21V 25/10 362/294
D629,544 S 12/2010 Deguglimo
D631,586 S * 1/2011 Li ................................. D26/37
7,862,979 B2 1/2011 Waters
D636,509 S 4/2011 Killion
7,938,553 B1 5/2011 Beiner
8,167,460 B2 5/2012 Chu
8,235,524 B2 8/2012 Waters
8,246,193 B2 8/2012 Weng
8,342,716 B2 1/2013 Lin
D676,993 S 2/2013 Kotsis
8,388,164 B2 3/2013 Waters
8,444,266 B2 5/2013 Waters
8,491,118 B2 7/2013 Waters
D687,989 S 8/2013 Yeh
D687,992 S 8/2013 Yeh
D689,226 S 9/2013 Yeh
D689,228 S * 9/2013 Yeh ............................... D26/46
8,545,012 B2 10/2013 Waters
D693,951 S 11/2013 Rugendyke
D698,056 S 1/2014 Forbes
D698,959 S 2/2014 Shen
D731,687 S 6/2015 Haws
9,046,230 B2 * 6/2015 O'Brien ................. F21L 4/005
9,097,393 B2 8/2015 Huang
9,185,278 B2 11/2015 Waters
D753,855 S 4/2016 Cacciabeve
D756,011 S 5/2016 Nojima
D757,318 S 5/2016 Evans
D760,414 S 6/2016 Brown
10,069,318 B2 * 9/2018 Waters .................... G08B 5/36
2002/0131275 A1 9/2002 Yamamoto et al.
2002/0159258 A1 10/2002 Beeman
2002/0163800 A1 11/2002 Hansen
2002/0186557 A1 12/2002 Lary et al.
2002/0187806 A1 12/2002 Jang
2003/0079387 A1 5/2003 Derose
2003/0151914 A1 * 8/2003 Kish ........................ F21L 4/08 362/183
2003/0169207 A1 9/2003 Beigel
2003/0189824 A1 10/2003 Meeder et al.
2004/0201995 A1 10/2004 Galli
2004/0222638 A1 11/2004 Bednyak
2004/0240067 A1 12/2004 Marusi et al.
2004/0240204 A1 12/2004 Russ et al.
2004/0264176 A1 12/2004 Vanderschuit
2005/0001433 A1 1/2005 Seelin
2005/0072458 A1 4/2005 Goldstein
2005/0099799 A1 5/2005 Cugini et al.
2005/0204490 A1 9/2005 Kemp et al.
2005/0211187 A1 9/2005 Harman et al.
2005/0248932 A1 11/2005 Waters
2005/0254238 A1 11/2005 Parker et al.
2005/0265015 A1 12/2005 Salazar
2006/0012974 A1 1/2006 Su
2006/0012975 A1 1/2006 Huttner et al.
2006/0091784 A1 5/2006 Conner et al.
2006/0091787 A1 5/2006 Kabay et al.
2006/0092621 A1 5/2006 Lai
2006/0138440 A1 6/2006 Jyo
2006/0158895 A1 7/2006 Brands et al.
2006/0198122 A1 9/2006 Senter
2006/0238995 A1 10/2006 Wang
2006/0239018 A1 10/2006 Jardin
2006/0291193 A1 12/2006 Hill
2007/0013865 A1 1/2007 Joradn
2007/0030442 A1 2/2007 Howell et al.
2007/0053179 A1 3/2007 Pang
2007/0058361 A1 3/2007 Sevilla
2007/0074752 A1 4/2007 Shau
2007/0145746 A1 6/2007 Biamonte
2007/0153537 A1 7/2007 Scott et al.
2007/0159810 A1 7/2007 Kim
2007/0159823 A1 7/2007 Ho
2007/0189003 A1 8/2007 Daley
2007/0206373 A1 9/2007 Whiteside et al.
2007/0211470 A1 * 9/2007 Huang ..................... F21L 4/00 362/294
2007/0236915 A1 10/2007 Chen
2007/0236916 A1 10/2007 Hsu
2008/0069391 A1 3/2008 Steyn et al.
2009/0213323 A1 8/2009 Mermanson
2010/0177508 A1 7/2010 Maglica
2010/0181889 A1 7/2010 Falicoff et al.
2010/0271813 A1 10/2010 Peterson
2010/0302767 A1 12/2010 Mattheis

(56) References Cited

U.S. PATENT DOCUMENTS

| | | | |
|---|---|---|---|
| 2011/0211156 | A1 | 9/2011 | Beiner |
| 2013/0343042 | A1 | 12/2013 | Windom |
| 2016/0197502 | A1 | 7/2016 | Waters |

FOREIGN PATENT DOCUMENTS

| | | | |
|---|---|---|---|
| CA | 2610073 | A1 | 5/2008 |
| CN | 1603677 | A | 4/2005 |
| CN | 101950091 | A | 1/2011 |
| CN | 301445845 | S | 1/2011 |
| CN | 201796205 | U | 4/2011 |
| DE | 3043007 | | 6/1982 |
| DE | 9410886 | | 9/1994 |
| EP | 1451633 | | 9/2004 |
| EP | 2290433 | A1 | 3/2011 |
| EP | 2299311 | A1 | 3/2011 |
| EP | 2350734 | | 8/2011 |
| GB | 2272073 | A | 5/1994 |
| JP | 2004207580 | | 7/2004 |
| WO | 113033 | A1 | 2/2001 |
| WO | 177575 | A1 | 10/2001 |
| WO | 2003040808 | A2 | 5/2003 |
| WO | 2006124928 | | 11/2006 |
| WO | 2011041591 | A1 | 4/2011 |
| WO | 2011100471 | A1 | 8/2011 |
| ZA | 20043826 | | 9/2005 |

* cited by examiner

FLASHLIGHT WITH LONGITUDINAL COOLING FINS

CROSS-REFERENCE TO RELATED APPLICATION

This application is a continuation of U.S. application Ser. No. 14/957,457 filed Dec. 2, 2015 which claims the benefit of U.S. Provisional Application No. 62/118,308, filed Feb. 19, 2015 and U.S. Provisional Application No. 62/086,586, filed Dec. 2, 2014, which are all incorporated by reference in their entirety herein.

FIELD

The invention is directed to flashlights and, more specifically, to compact flashlights.

BACKGROUND

Often an individual desires a light source focused to illuminate an area while performing a task. Flashlights can face competing issues of using a large power source to provide a relatively long usage time before having to replace the power source or having a compact housing with a smaller power source and corresponding shorter usage time. Moreover, when an individual is using a tool, such as a knife, it can be difficult to work with one hand while holding a flashlight in the other to provide light on the working area.

BRIEF DESCRIPTION OF THE DRAWINGS

FIG. 47 is an example screen generated by application software for communicating with a light device showing a plurality of light devices that the application software can communicate with;

DETAILED DESCRIPTION OF THE PREFERRED EMBODIMENTS

Figure 1:
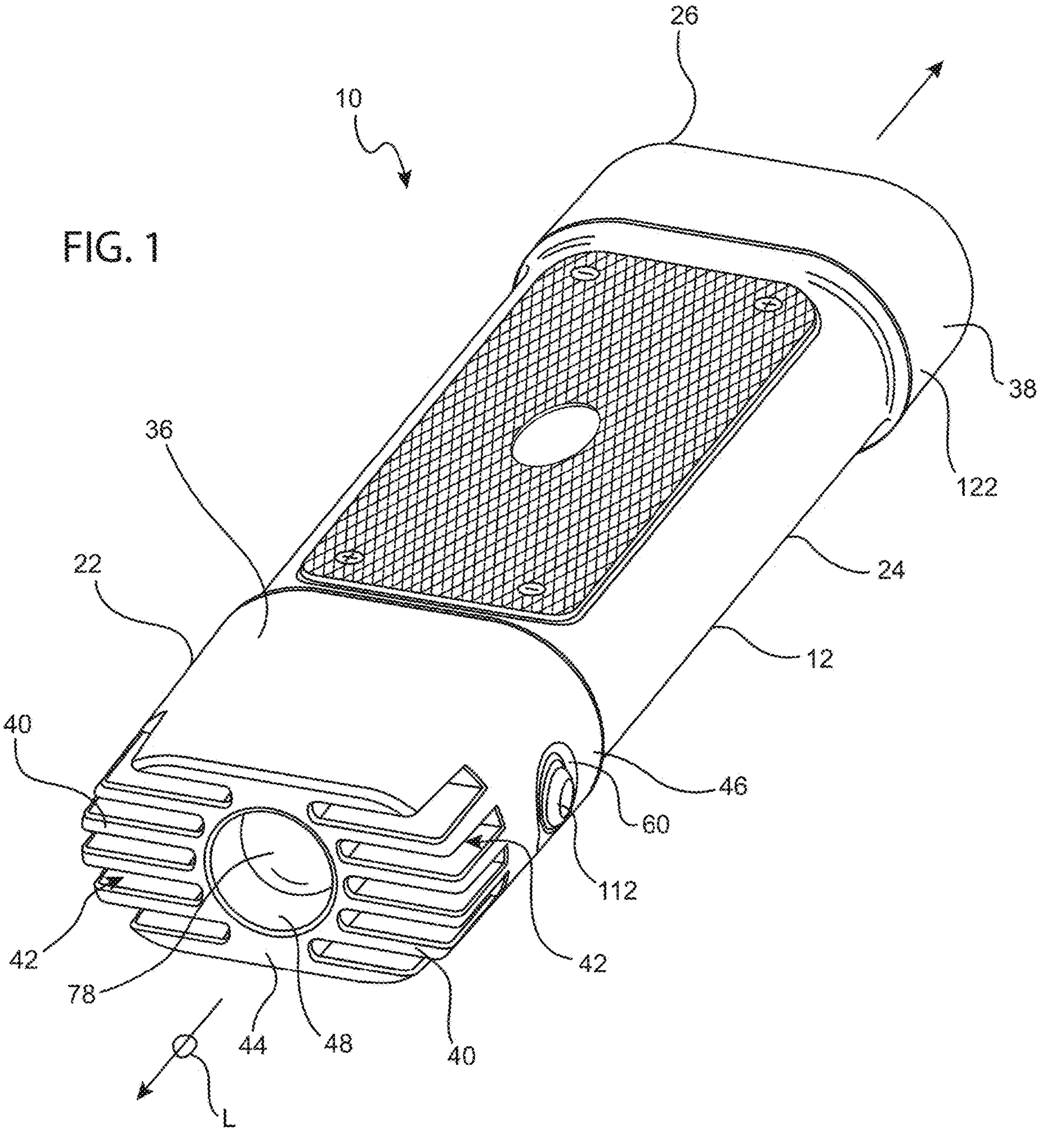
FIG. 1 is a perspective view of a first embodiment of a flashlight showing a recessed light source in a flashlight head having cooling fins extending laterally outwardly on either side thereof.
Figure 2:
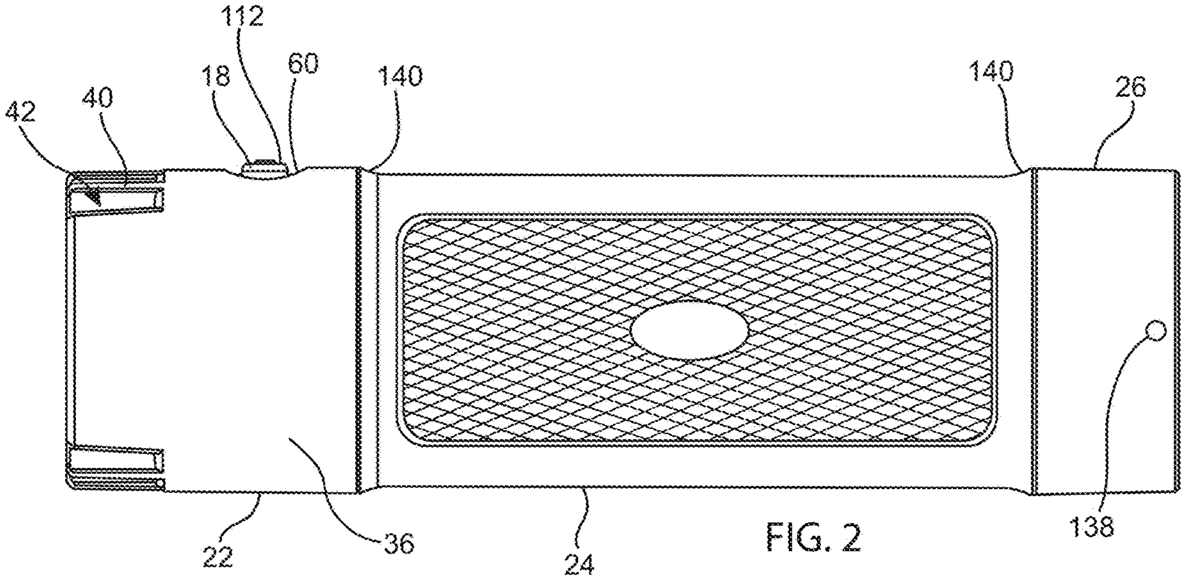
FIG. 2 is a right side elevation view of the flashlight of FIG. 1.
Figure 3:
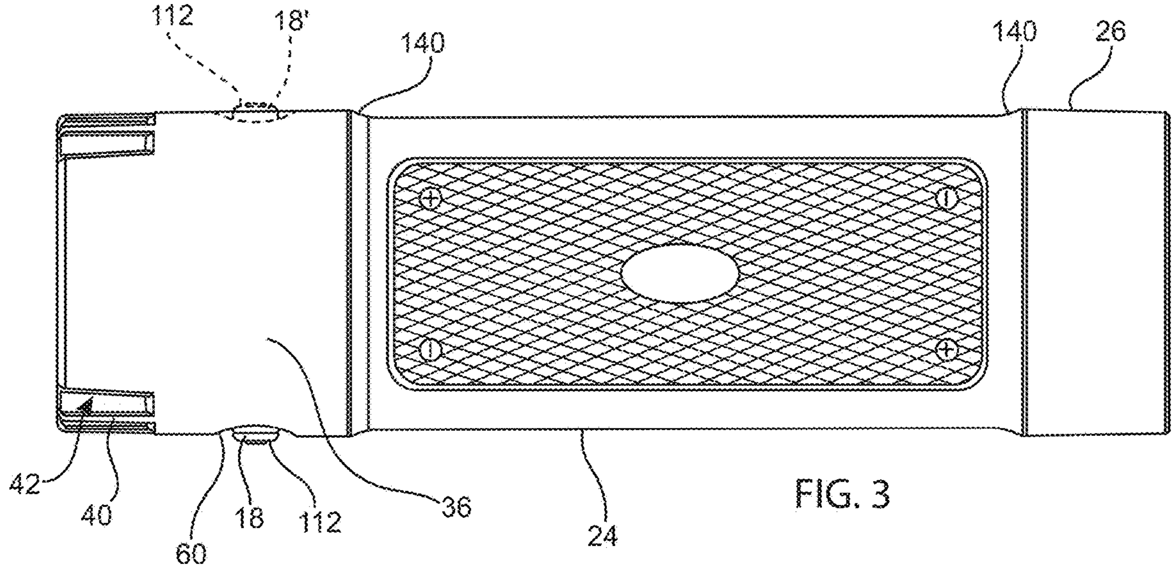
FIG. 3 is a left side elevation view of the flashlight of FIG. 1.
Figure 4:
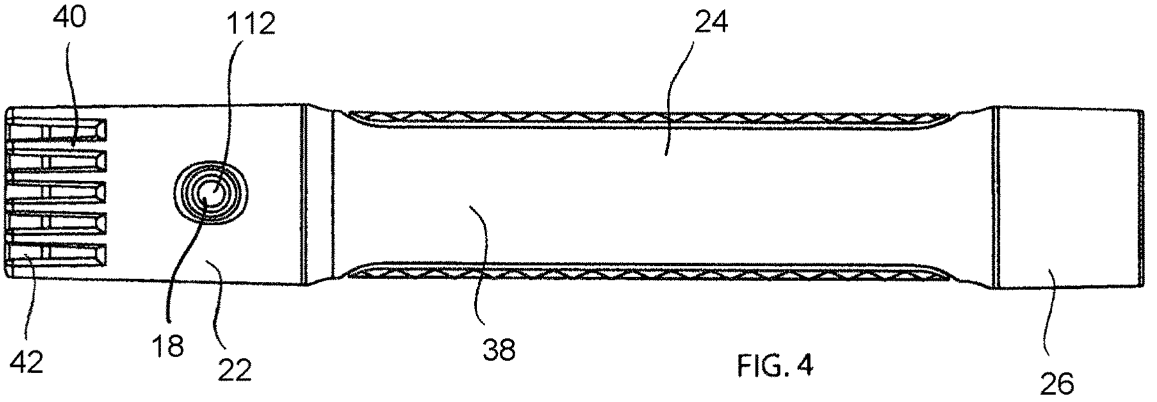
FIG. 4 is a top plan view of the flashlight of FIG. 1.
Figure 5:
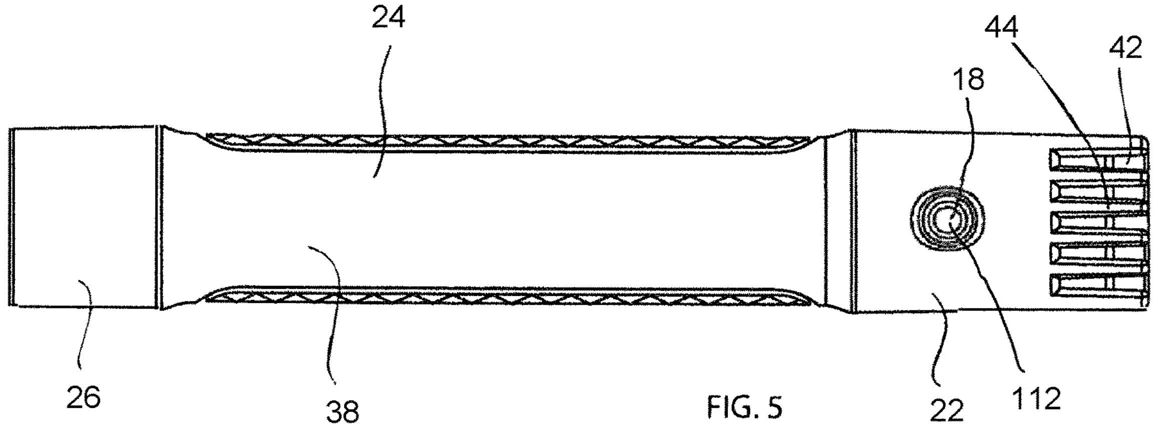
FIG. 5 is a bottom plan view of the flashlight of FIG. 1.
Figure 6:
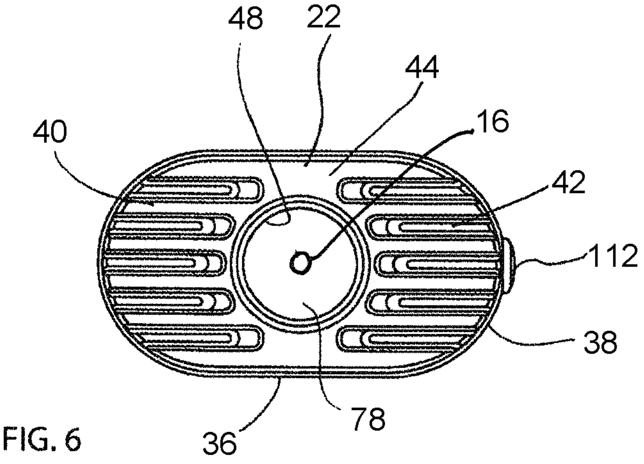
FIG. 6 is a front elevation view of the flashlight of FIG. 1.

Compact flashlights are provided herein that are advantageously sized to fit within small spaces such as those found in pockets, purses, or the like. The flashlights described herein utilize LEDs to provide high intensity light while using a low amount of power. Such LEDs can generate a significant amount of heat when used for prolonged periods and, as such, the flashlights can include a heat sink, including a cooling fin structure, to effectively dissipate any generated heat so that no damage is done to the flashlight thereby. Traditional flashlights using incandescent bulbs have to utilize relatively large reflectors to dissipate heat. The reflectors are traditionally a thin arced material with a reflective coating disposed thereon that extend around the bulbs and direct the heat forwardly of the flashlight. The heat sink described herein advantageously avoids the need for such traditional reflectors and allows the flashlights to have a compact housing. Moreover, flashlights described herein can be substantially water proof due to a high-quality construction of tight fitting components along with seals, O-rings, gaskets, and switch covers that minimize the ingress of water into the flashlight housing.

A flashlight 10 having these qualities is shown in FIGS. 1-31. The flashlight 10 includes a compact housing 12 sized to receive a lighting assembly 14 therein. The lighting assembly 14 includes a light source 16, a switch device 18, and a power source 20 that are electrically connected via wires, connectors, traces, or the like for selectively providing power to the light source 16. The housing 14 extends along a longitudinal axis L and the light source 16 is disposed therein so as to project light generally along the longitudinal axis L.

As shown in FIGS. 1-26, the housing has a three part construction, including a forward portion or head 22, a central body portion 24, and an end portion or cap 26. The three portions 22, 24, 26 are configured to be coupled together, and preferably in a watertight manner. In the illustrated form, the head and end cap 22, 26 fit over necks 28 at ends 30 of the central portion 24. The necks 28 can have one or more annular grooves 32 extending therearound generally transverse to the longitudinal axis L sized to receive resilient O-rings 34 or other sealing structure. So configured, when the head or end cap 22, 26 is coupled over the necks 28 of the central portion, the O-rings seal against an interior surface of head or end cap 22, 26 to make the seam between the portions water tight as well as ensure that the portions are tightly engaged together. As illustrated, the central body portion 24 is preferably includes a power source compartment sized to generally conform to the size and shape of the power source 20. For example, the power source compartment can be sized to receive two rows of stacked AA batteries therein, shown in FIG. 1, two rows of stacked AAA batteries therein, shown in FIG. 8, two rows of stacked CR123 batteries therein, shown in FIG. 15, or can alternatively be sized to receive stacked coin-cell batteries.

The housing 14 preferably has an other than circular cross section so that the flashlight 10 can rest stably and does not have a tendency to roll when placed on a flat support surface, which can undesirably damage the flashlight 10 and inconvenience a user. In the illustrated form, the housing 12 has an oval, oblong, or track-shaped cross section with flat sides 36 and rounded ends 38. The flat sides 36 provide a stable resting surface, while the rounded ends 38 provide comfort for the hands of a user.

The head 22 of the flashlight is configured to receive the light source 16 therein and dissipate heat generated thereby. To achieve this, the head 22 includes a heat sink structure including a number of cooling fins 40 separated by grooves or slots 42. The cooling fins 40 extend generally longitudinally along the head 22 to increase the surface area of the head 22 adjacent to the light source 16. The head 22 includes a front wall portion 44, with the slots 42 open to the front wall portion 44 with the fins 40 extending rearwardly therefrom. A sidewall portion 46 extends rearwardly from the rearward and laterally outer ends of the fins 40. A through opening 48 extends longitudinally through the front wall 44 so that the light source 16 can project light forwardly therethrough. In the illustrated form, the opening 48 is generally centrally located in the head 44 and the fins and grooves 40, 42 extend laterally outwardly therefrom with a small portion of the front wall 44 therebetween. As illustrated, the small portion is an annular wall portion. Of course, other configurations can also be utilized, such as an offset opening, grooves and fins on only one side, or the like.

The fins 40 and grooves 42 can take any suitable shape and/or size. For example, the grooves 42 can be disposed laterally on either side of the opening 48 in a stacked orientation, which can include three, four, and five grooves as shown, or other suitable numbers based on particular applications. Additionally, the grooves 42 are shown as slots with planar sides that extend along the longitudinal axis L and laterally outward away from their inner ends which are closely adjacent to and spaced from the opening 48 to create openings on the rounded ends 38 of the flashlight head 22. As such, the fins 40 are generally flat wall portions extending between the grooves 42 with inner edges thereof extending longitudinally along the annular wall portion of the front wall 44 and outer edges forming a portion of the rounded ends 38 of the flashlight head 22. Of course, the grooves 42, and therefore the fins 40, can also have curvilinear portions extending longitudinally and/or laterally. The fin 40 and groove 42 structure also advantageously extend forwardly beyond the light source 16 so that the light source 16 can be recessed in the head 22, which provides the light source 16 with protection against damage thereto.

Figure 25:
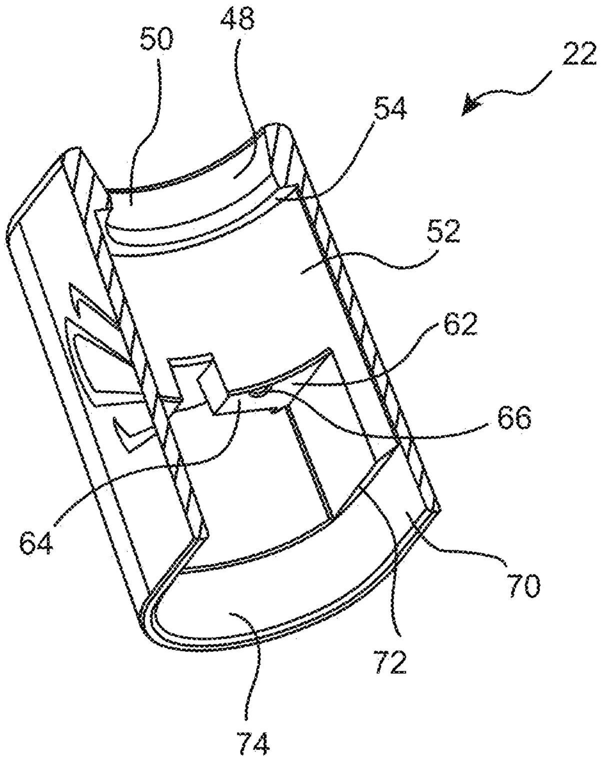
FIG. 25 is a cross-section of the flashlight head of FIG. 24 showing the internal structure thereof.
Figure 26:
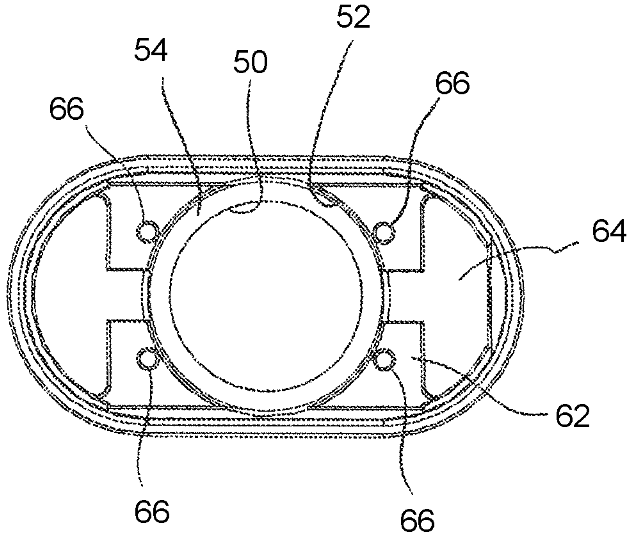
FIG. 26 is a bottom plan view of the flashlight head of FIG. 24.

As shown in the view into the interior of the head 22 shown in FIGS. 25 and 26, the through opening 48 includes a relatively narrow smaller diameter front portion 50 and a relatively wider larger diameter rear portion 52 creating a rim or shoulder 54 therebetween against which a front light assembly 56, which will be described in greater detail below, can be mounted. The head 22 further includes a switch opening 58 in the sidewall portion 46 thereof, which as shown can be in the rounded end 38 portion or elsewhere as desired. In one form, the sidewall portion 46 can include a recess or depression 60 that surrounds the switch opening 58 so that the switch device 18 can be generally flush with the rest of the sidewall 46. An interior block portion or portions 62 extend radially away from an interior surface 64 of the front wall portion 44 adjacent to the opening rear portion 52. The depth of the upstanding wall portion 62 provides additional material through which threaded bores 66 can extend so that components of the lighting assembly 14 can be mounted thereto using fasteners 68. Alternatively, the thickness of the front wall portion 44 can be increased to accommodate the bores 66. As shown, the sidewall 46 includes a relatively wider rearward portion 70 creating a shoulder 72 extending around an interior 74 thereof. The increased size is configured to receive the central portion neck 28 therein, which can then abut the shoulder 72 when the portions are fully nested together.

Figure 23:
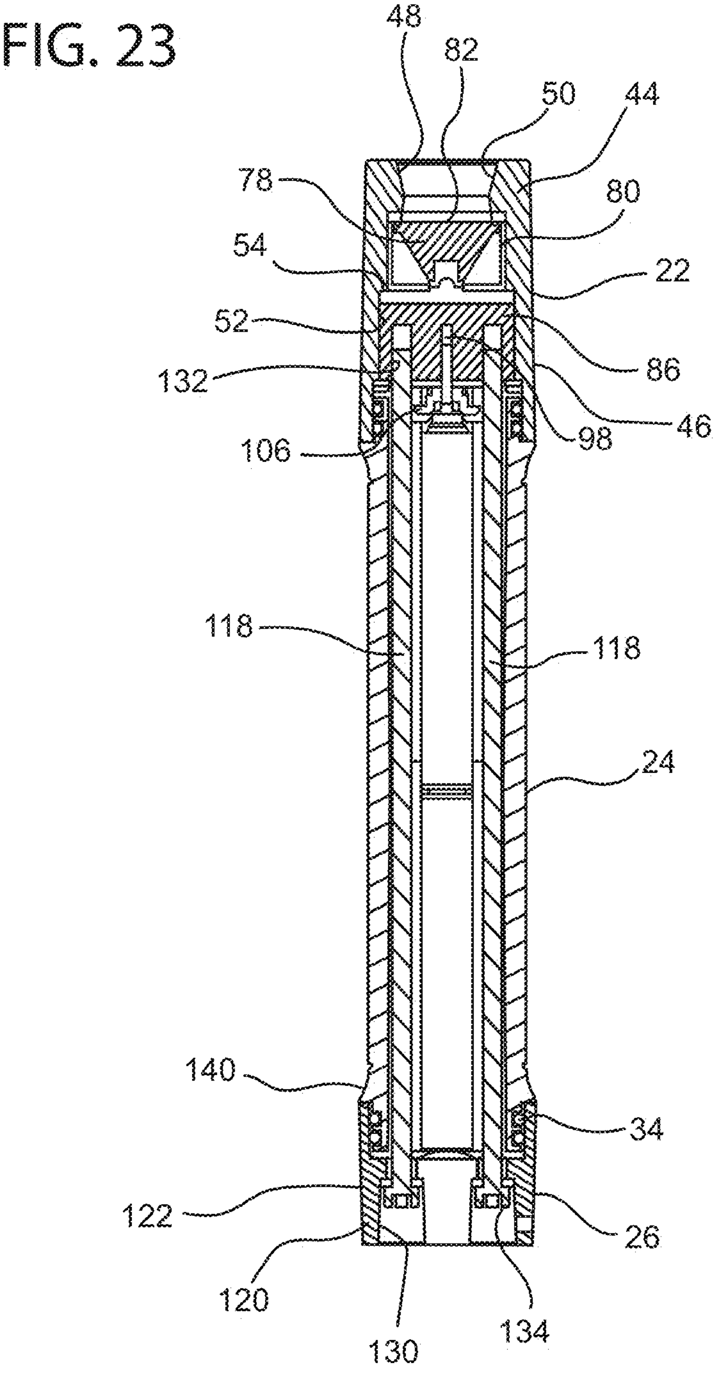
FIG. 23 is a cross-section view of the flashlight of FIG. 8 showing the connections of the flashlight components.
Figure 24:
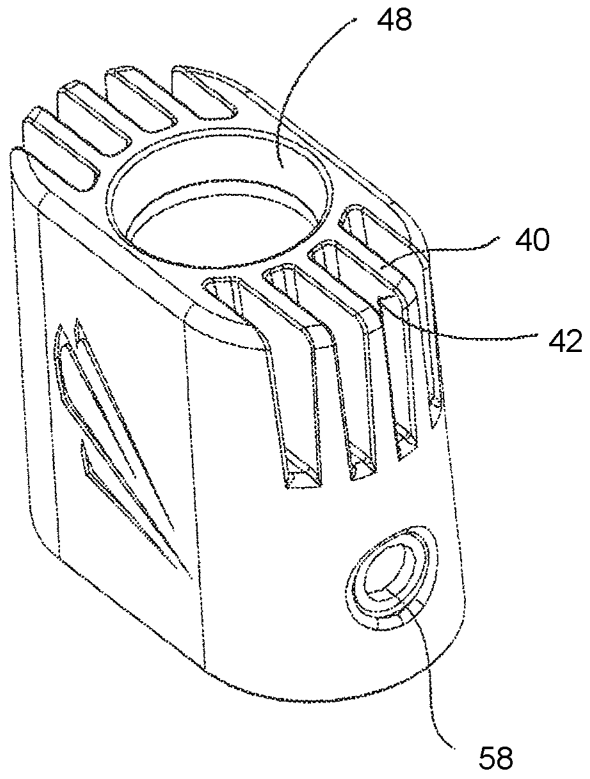
FIG. 24 is a perspective view of the flashlight head of the flashlight of FIG. 15 showing cooling fins and a switch opening.

As such, the head is configured to have the front light assembly 56 mounted thereto, which is shown in FIGS. 23 and 28. In the illustrated form, the light source 16 is an LED mounted to a backing plate 76. Suitable LEDs include 1 W through 6 W LEDs having a light intensity of between about 10 lumens to about 200 lumens, and more specifically between about 40 lumens to about 100 lumens, and can be any suitable color, such as white, green, red, blue, yellow, or the like. Additionally, multiple LEDs, such as two, three, four, or more, can be mounted to the backing plate 76 if a stronger intensity is desired. In a preferred form, the backing plate 76 has a rear substrate layer 76B of a non-electrically conductive material, such as an aluminum alloy, and a forward layer 76A that is configured as a printed circuit board for connecting the LED 16 to the other components of the light assembly 14. The backing plate 76 therefor is configured to provide a circuit board for the LED 16, as well as spread heat generated by the LED 16 out over the entire area of the backing plate 76 due to the non-conductive material layer 76B.

Figure 28A:
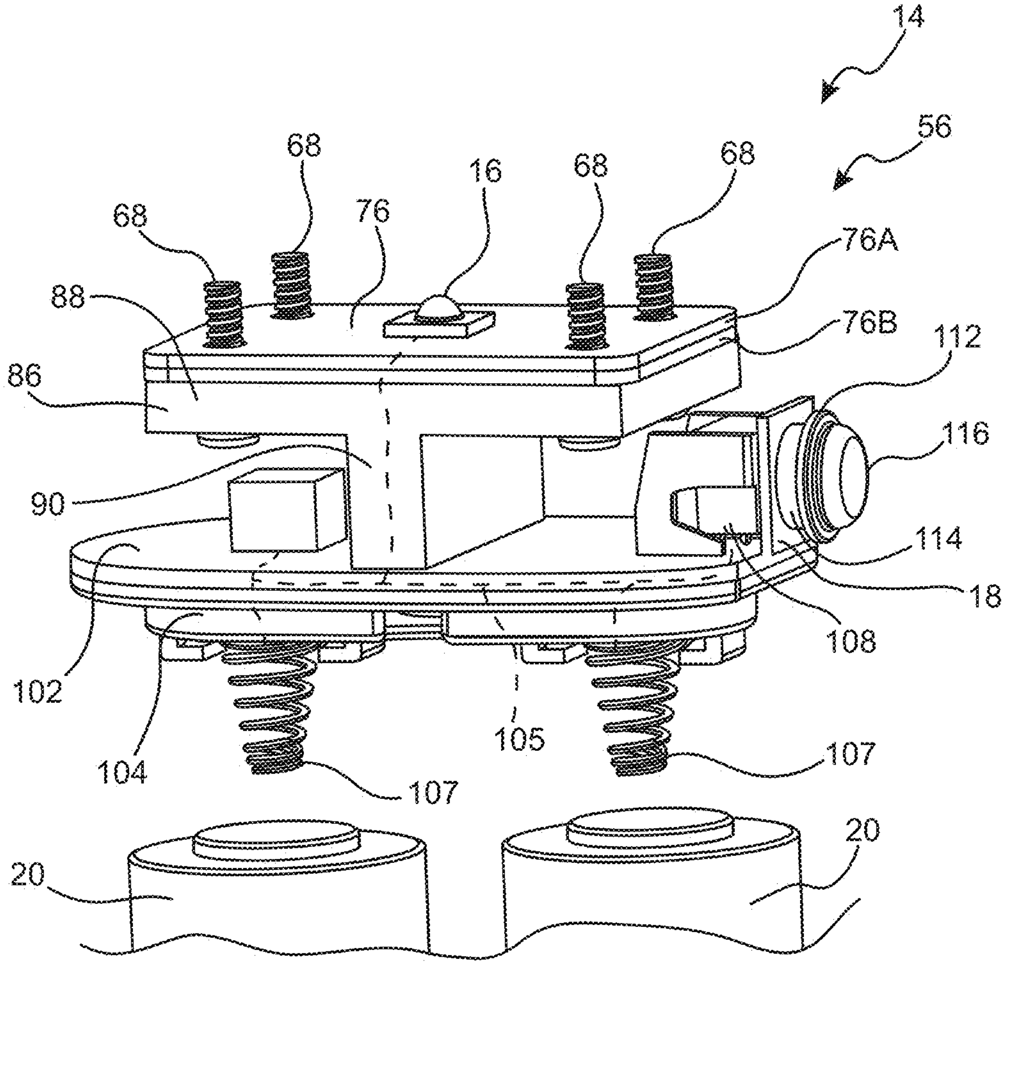
FIG. 28A is a perspective view of a front light assembly showing an LED mounted to a first circuit board that is connected to a second circuit board having a switch device mounted thereto and a contact assembly with the T-shaped bracket of FIG. 27.
Figure 28B:
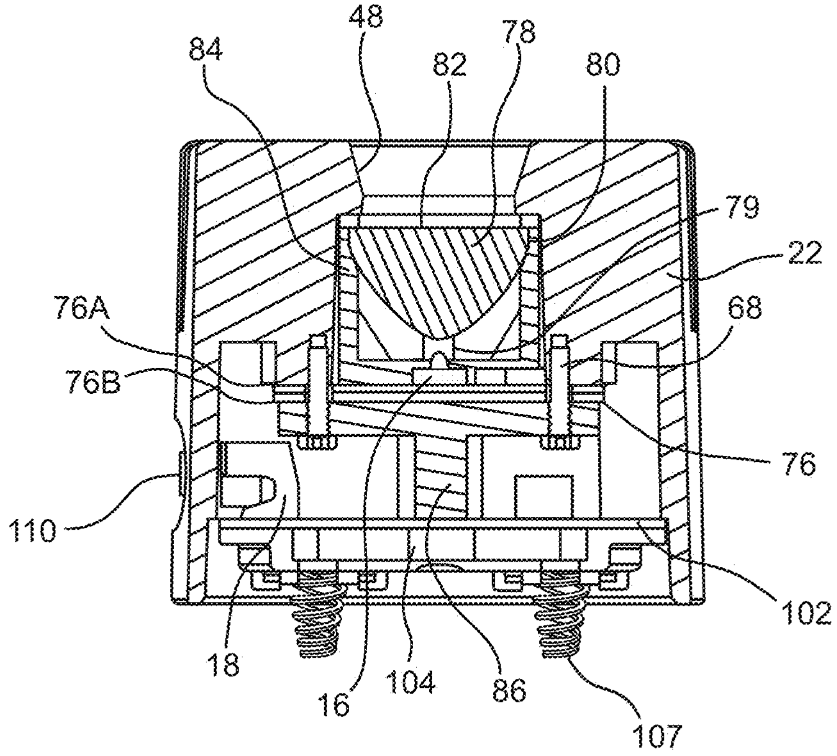
FIG. 28B is a cross-sectional view of the front light assembly of FIG. 28A mounted to a flashlight head with a lens and lens housing disposed forwardly of a light source.

The LED 16 is received at least partially within a lens 78 shown in broken lines in FIG. 28B. The lens 78 has a frusto-conical shape configured to direct and focus light emitted from the LED 16. As shown, the lens 78 includes a cylindrical opening 79 at the truncated end thereof and the light source 16 at least partially projects into the cylindrical opening 79 so that the lens 78 can direct light projected from the light source 16. The lens 78 includes an outwardly projecting rim 80 extending therearound adjacent to a forward surface 82 thereof that engages a lens housing 84. A shown, the lens housing 84 is annular and sized to fit within the through opening 48, preferably with a friction fit. The lens rim 80 snap fits within the housing 84 so that the lens 78 is mounted within the opening 48 to direct light forwardly of the flashlight housing 12. Additionally, an O-ring or other seal gasket can be disposed between the lens 78, lens housing 84, and or the flashlight head 22 so that the connections therebetween are substantially water tight.

Figure 22:
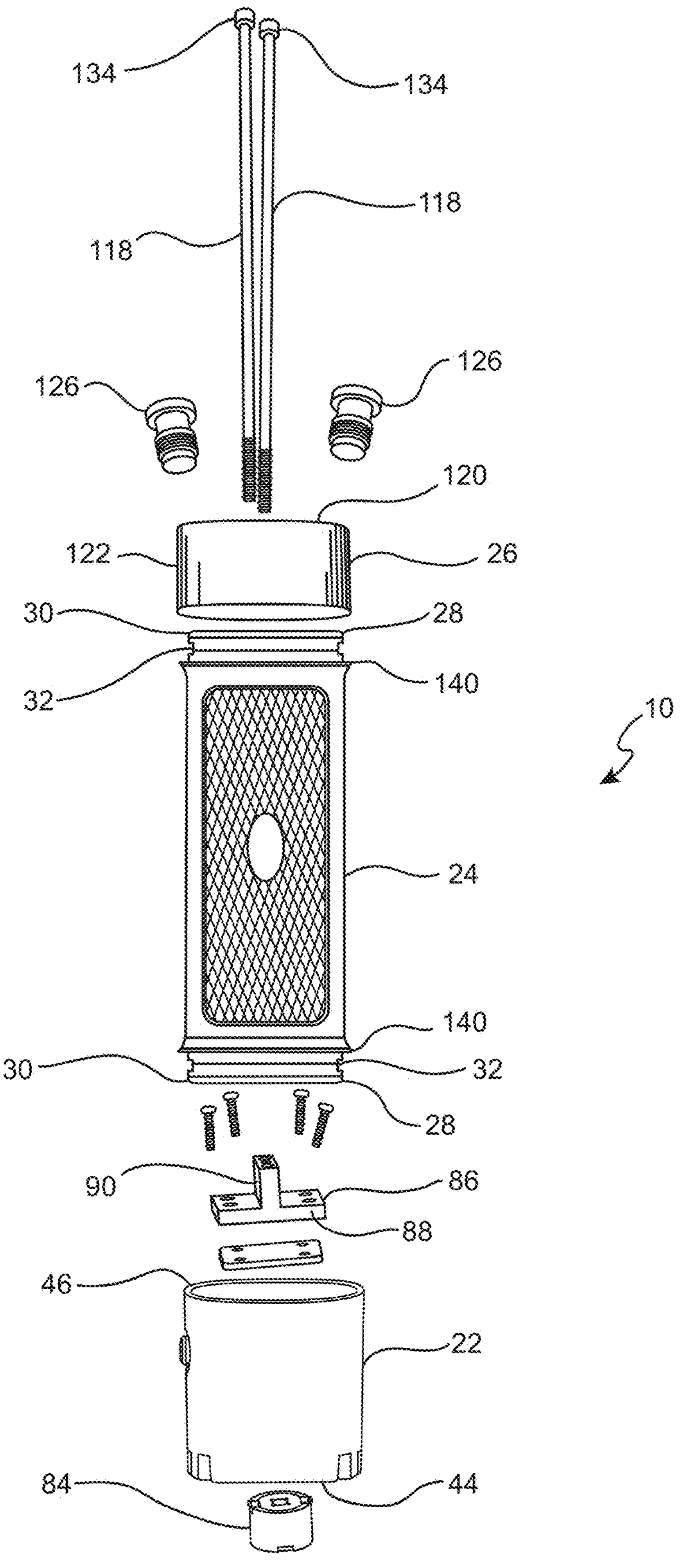
FIG. 22 is an exploded view of the flashlight of FIG. 8.
Figure 27:
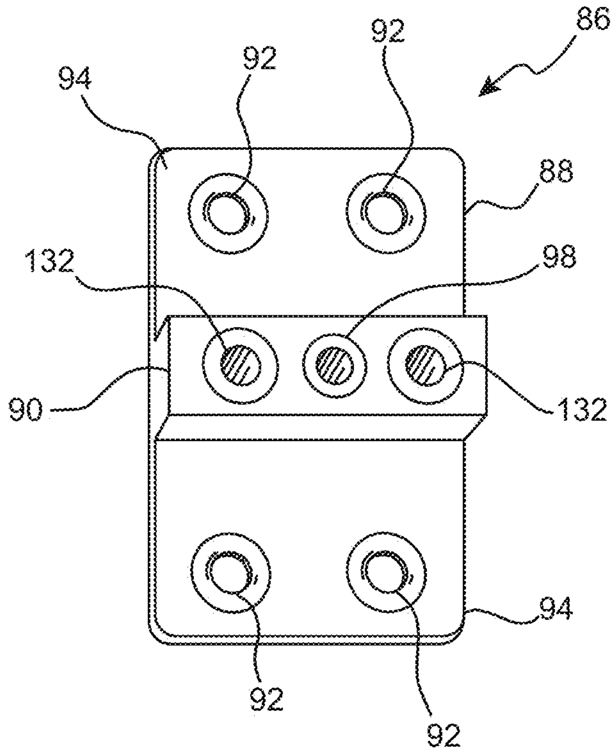
FIG. 27 is a bottom perspective view of a T-shaped bracket configured to connect portions of a flashlight together.

A mounting bracket 86 is disposed rearwardly of the backing plate 76 that includes a base 88 extending laterally along the backing plate 76 and a rearwardly projecting wall 90, as shown in FIGS. 22, 27, and 28A. In the illustrated form, the wall 90 is generally centrally located so that the bracket 86 is T-shaped. The bracket base 88 further includes openings 92 in corners 94 thereof that align with openings 96 in the backing plate 76. So configured, the fasteners 68 can mount the bracket 86 and the backing plate 76 to the head 44. As such, the backing plate 76 is mounted directly to the flashlight head 22 and, therefore, the heat sink configured structure of its fins and grooves 40, 42. Heat generated by the LED 16 is conducted through the backing plate 76 to the flashlight head 22 to be dissipated thereby. More specifically, the fins and grooves 40, 42 of the flashlight head 22 substantially increase the surface area in contact with air so that heat is more efficiently dissipated thereby The flashlight head 22 and the rear substrate layer 76B of the backing plate 76 can be constructed out of any suitable heat sink material, such as aluminum alloys having thermal conductivity values of between about 120 W/mK to about 240 W/mK, including aluminum alloys 1050A, 6061, 6063, which have thermal conductivity values at 229 W/mK, 166 W/mK, and 201 W/mK, respectively. Other suitable materials include copper, copper-tungsten pseudoalloy, silicon carbide in an aluminum matrix, beryllium oxide in a beryllium matrix, or the like. The flashlight head 22 and the rear substrate layer 76B can have a thermal resistance ranging from about 0.4° C./W up to about 85° C./W.

The mounting bracket wall 90 includes a central through bore 98 that extends longitudinally therethrough. Using this through bore 98 and aligned central openings 100, a circuit board 102 and a contact mounting plate 104 are mounted to the bracket 86 with a central fastener 106. The circuit board 102 is electrically coupled to the LED 16 and the contact mounting plate 104 using wires, traces, or other conductive structure 105, shown in FIG. 28A. The contact mounting plate 104 has laterally spaced contact springs 107 mounted thereto that project rearwardly along the longitudinal axis L to engage electrical contacts of the power source 20.

The switch device 18 is mounted to the circuit board 102 to thereby control operation of the LED 16. The switch device 18 includes a switch base 108 and an actuator 110 that is depressible with respect to the base 108. Other switch types can also be utilized. As shown, the switch device 18 is mounted to the circuit board 102 so that the actuator 110 at least partially projects through the switch opening 58 to be actuated by a user. In a preferred form, a switch cover 112 is disposed over the switch actuator to prevent or minimize the ingress of water into the flashlight 10. More specifically, the switch cover 112 is of a flexible material and has a bell-shaped configuration with a central waisted portion 114. So configured, the switch cover 112 can be deformed so that a forward portion 116 thereof projects through the switch opening 58 and the waisted portion 114 engages the annular edge of the switch opening 58 to thereby minimize the ingress of water.

The flashlight 10 can further include a second switch device 18' disposed on an opposite side of the sidewall 46 from the first switch device 18. The second switch device 18' can be mounted and configured similar to the first switch device 18 as described herein. The second switch devices provides several functional advantages over a single switch. For example, the flashlight can be configured to turn on only if both switches are actuated. This protects against inadvertent actuation and the resulting wasted battery life. Additionally, actuation of both switches when the flashlight is already in an 'on' state can transition the flashlight to a strobe light mode for safety or entertainment purposes.

The second switch device 18' can also provide an indication as to a remaining charge of the power source 20. The flashlight can include a charge monitoring circuit, discussed in more detail below, to monitor a current charge of the power source 20 and output a signal. The switch cover 112 can then be made of a transparent or translucent material and a multi-color LED can be mounted within the flashlight such that light projecting therefrom is visible through the switch cover 112. The LED can be electrically connected to the charge measuring circuit and the second switch device 18'. So configured, when a user actuates the second switch device, the charge monitoring circuit can output a signal to the LED to provide a visual indication of the charge. For example, if the charge is good, such as above 25%, the LED can illuminate as green, if the charge is low, such as between 25% and 5%, the LED can illuminate as yellow, and if the charge is 5% or less, the LED can illuminate as red. This provides an easy mechanism for a user to check on the status of the power source 20. Of course, this functionality can be incorporated into the first switch device using a long actuation, functionality cycling, or the like.

The central tubular portion 24 couples between the head 22 and the end cap 26 as described above. As shown in FIG. 23, the portions can be secured together using long fasteners 118 that couple the end cap 26 to the head 22, thereby trapping the central tubular portion 24 therebetween, as described in greater detail below. As shown, the long fasteners 118 extend along a majority of the longitudinal length of the flashlight housing 12 and, more specifically, entirely through the central body portion 24 and the power source compartment therein. Alternatively, these portions can snap fit together.

Figure 7:
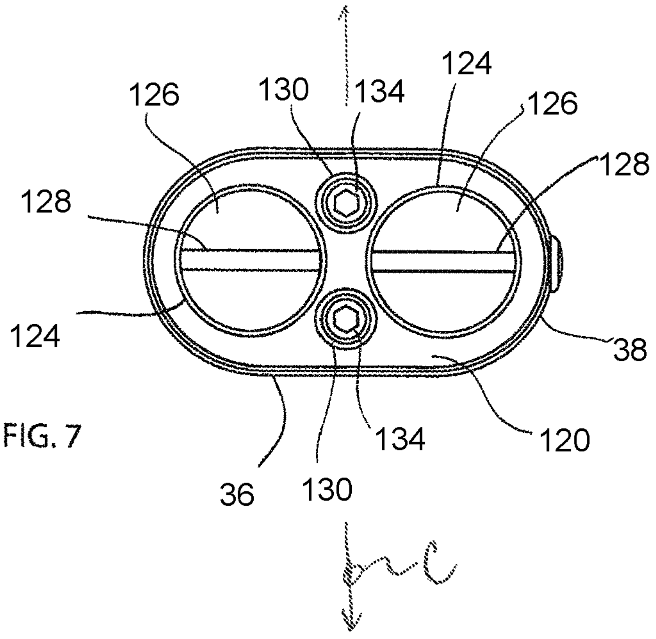
FIG. 7 is a rear elevation view of the flashlight of FIG. 1.
Figure 8:
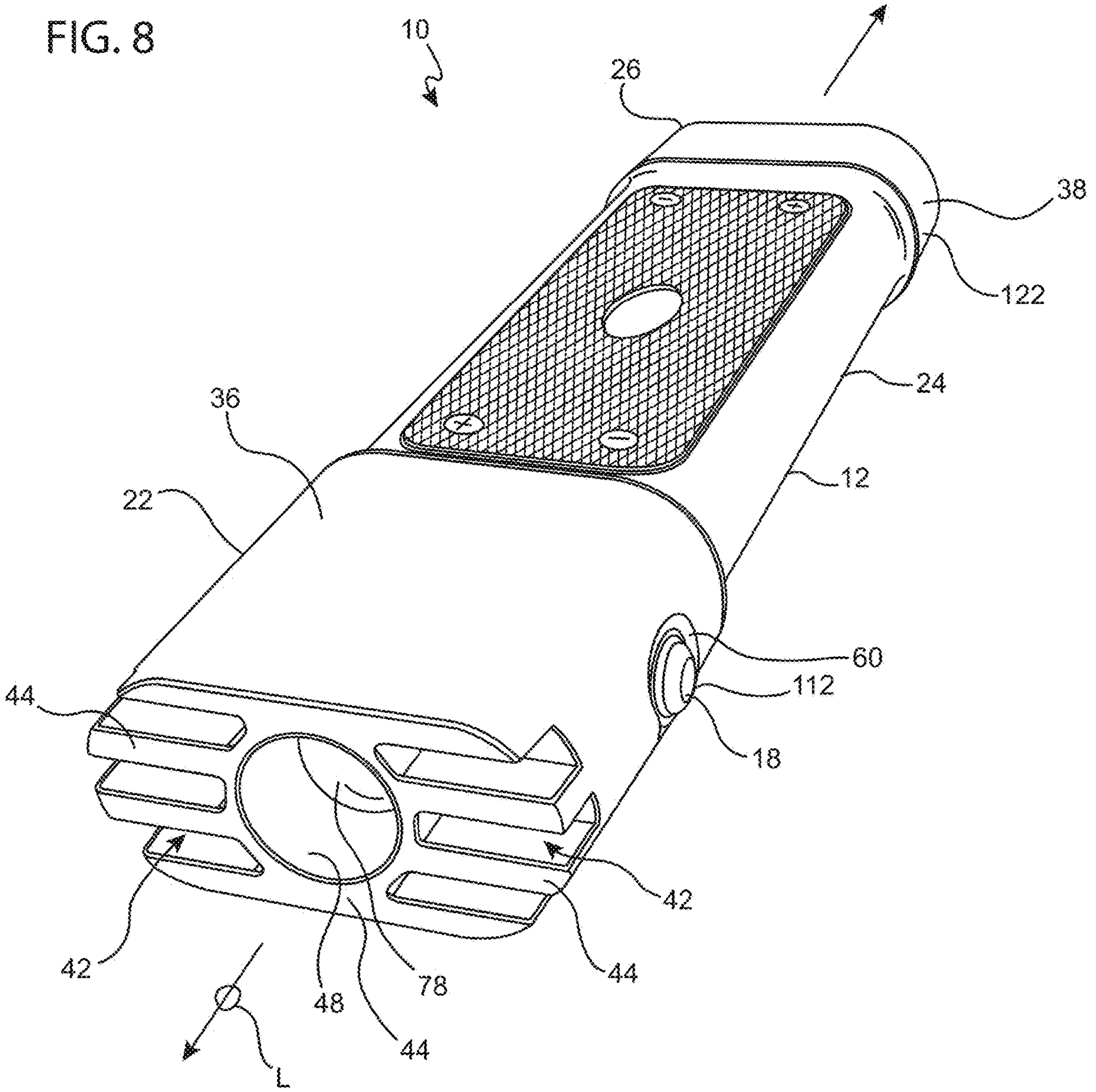
FIG. 8 is a perspective view of a second embodiment of a flashlight showing a recessed light source in a flashlight head having cooling fins extending laterally outwardly on either side thereof.
Figure 9:
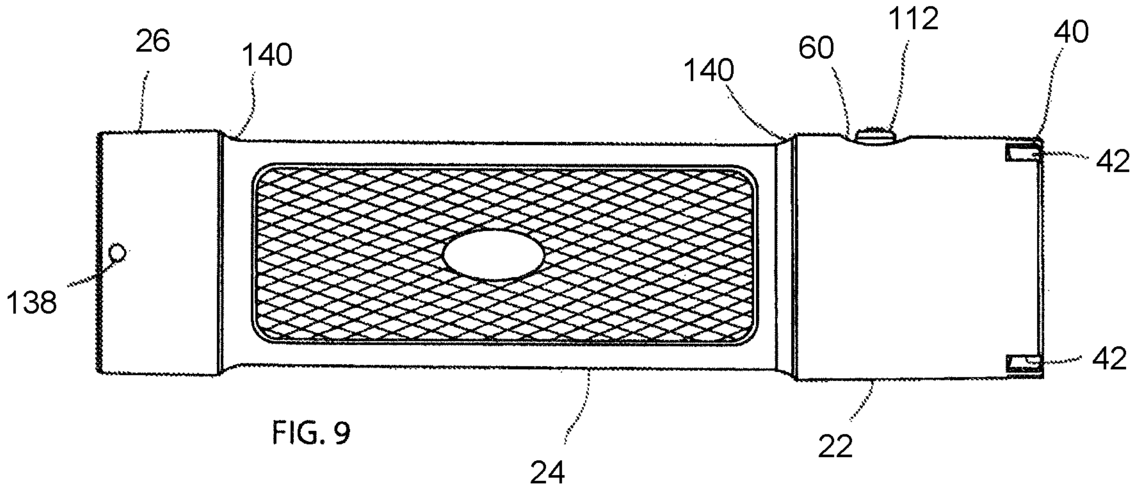
FIG. 9 is a right side elevation view of the flashlight of FIG. 8.
Figure 10:
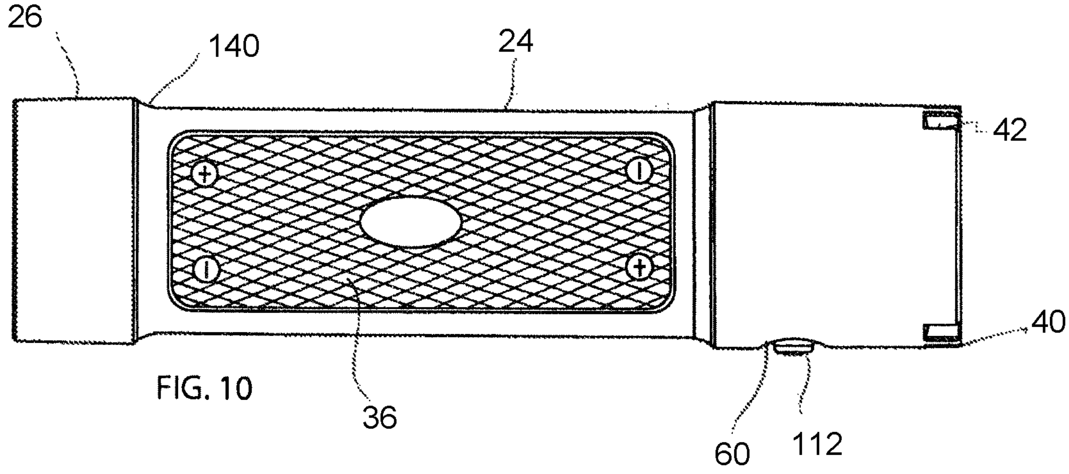
FIG. 10 is a left side elevation view of the flashlight of FIG. 8.
Figure 11:
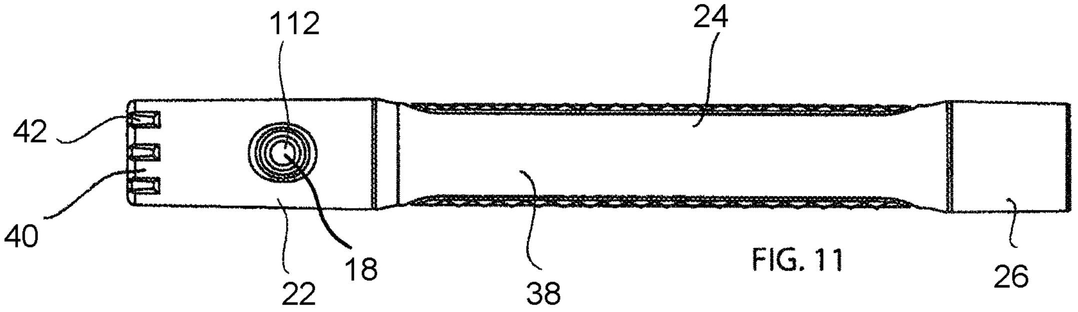
FIG. 11 is a top plan view of the flashlight of FIG. 8.
Figure 12:
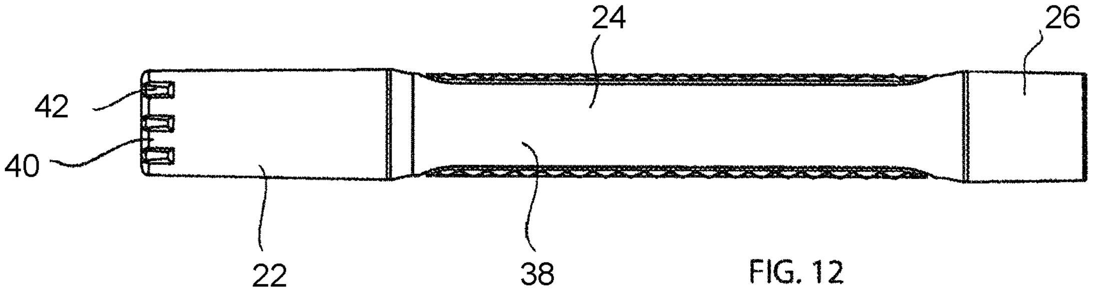
FIG. 12 is a bottom plan view of the flashlight of FIG. 8.
Figure 13:
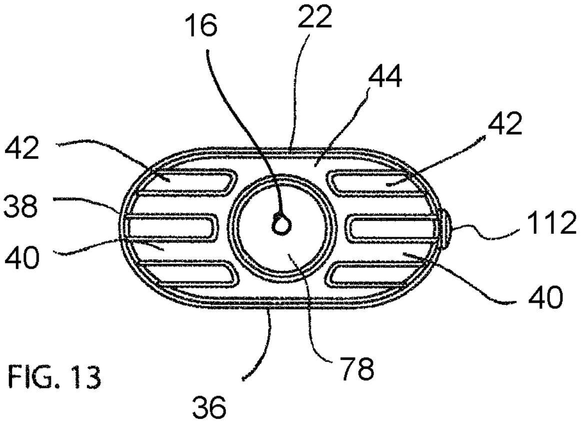
FIG. 13 is a front elevation view of the flashlight of FIG. 8.
Figure 14:
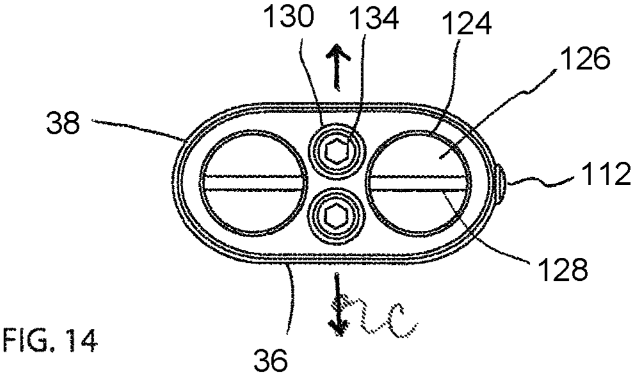
FIG. 14 is a rear elevation view of the flashlight of FIG. 8.
Figure 15:
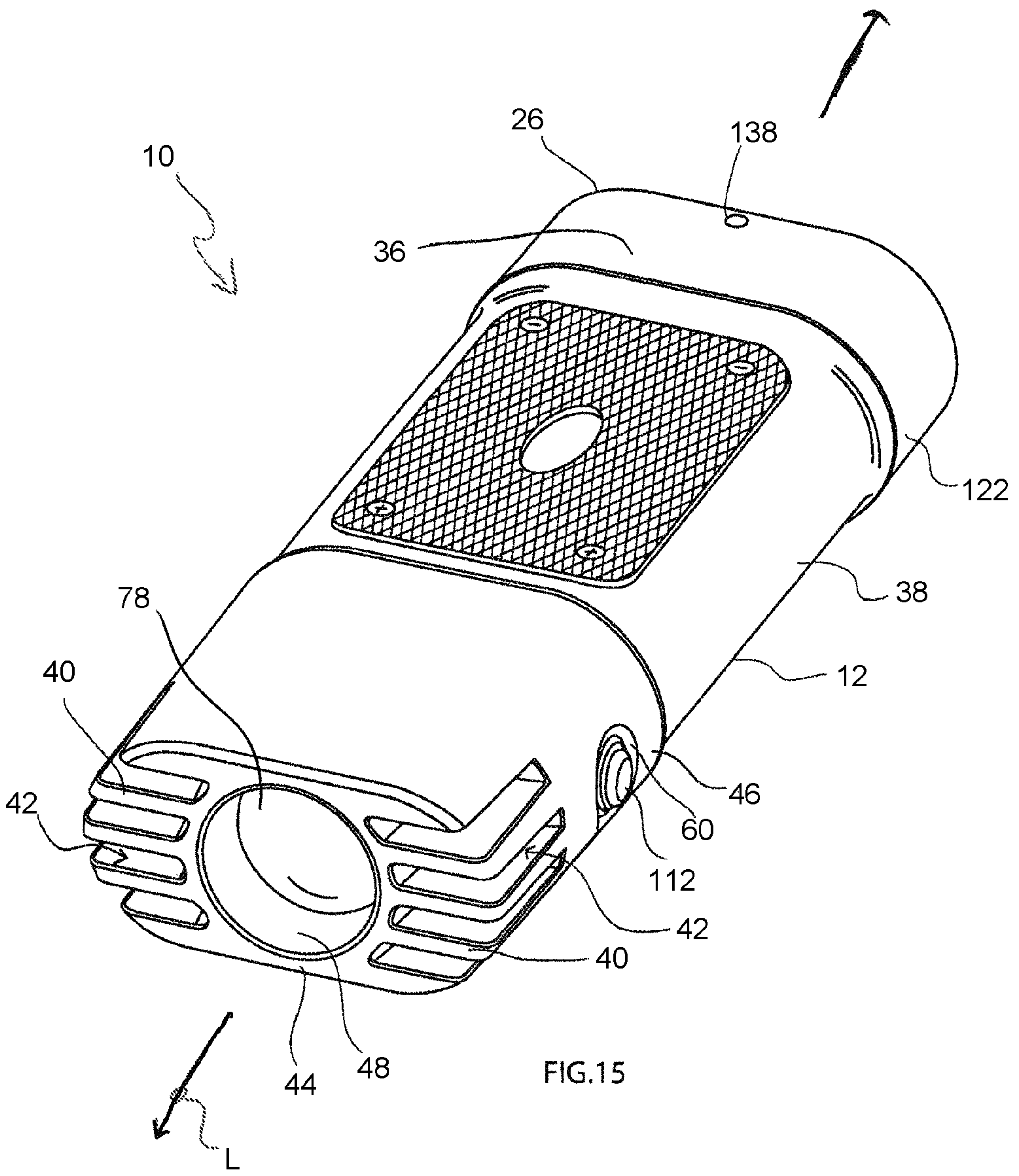
FIG. 15 is a perspective view of a third embodiment of a flashlight showing a recessed light source in a flashlight head having cooling fins extending laterally outwardly on either side thereof.
Figure 16:
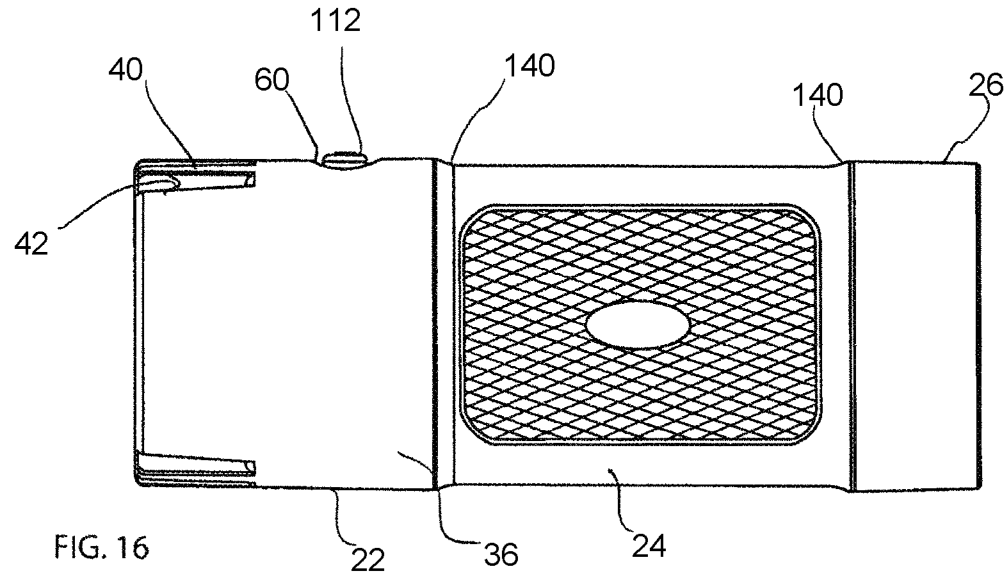
FIG. 16 is a right side elevation view of the flashlight of FIG. 15.
Figure 17:
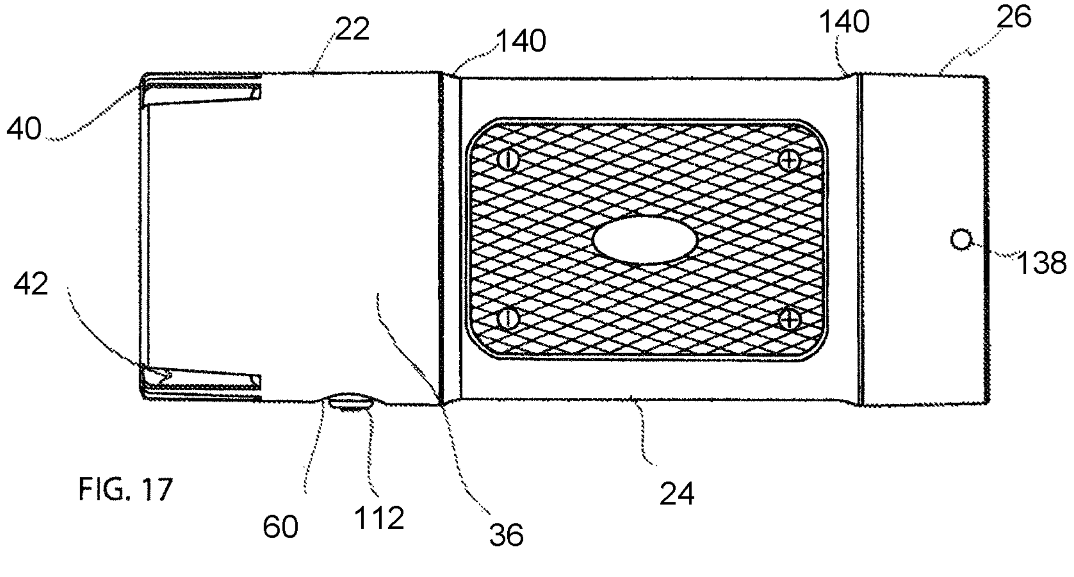
FIG. 17 is a left side elevation view of the flashlight of FIG. 15.
Figure 18:
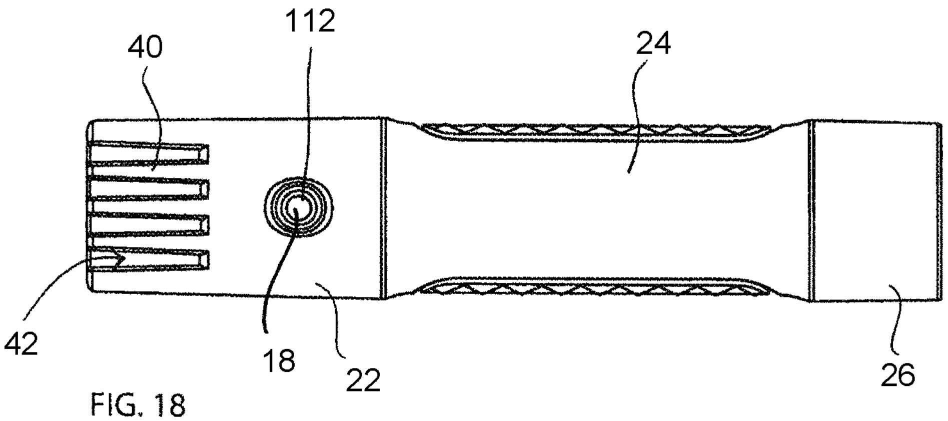
FIG. 18 is a top plan view of the flashlight of FIG. 15.
Figure 19:
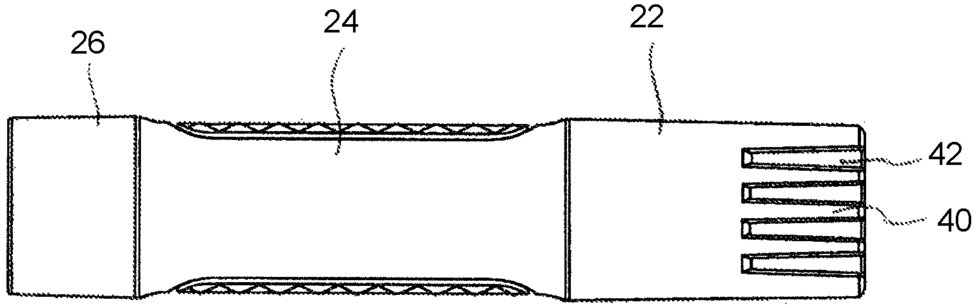
FIG. 19 is a bottom plan view of the flashlight of FIG. 15.
Figure 20:
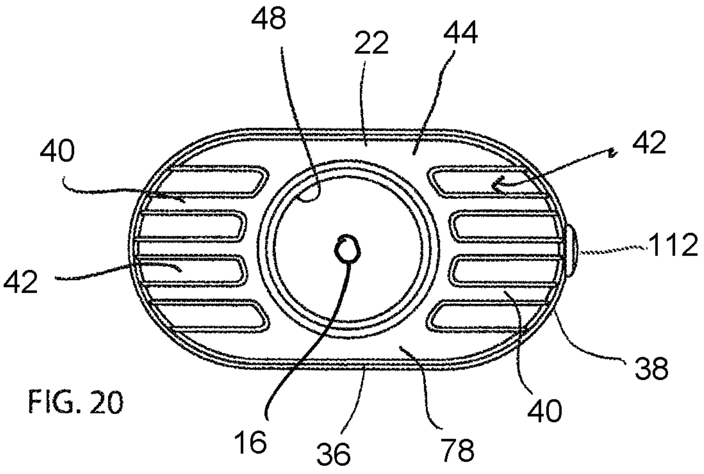
FIG. 20 is a front elevation view of the flashlight of FIG. 15.
Figure 21:
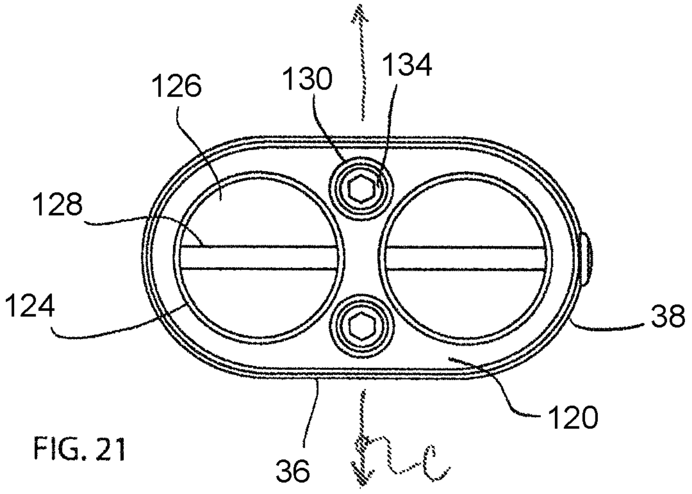
FIG. 21 is a rear elevation view of the flashlight of FIG. 15.
Figure 30:
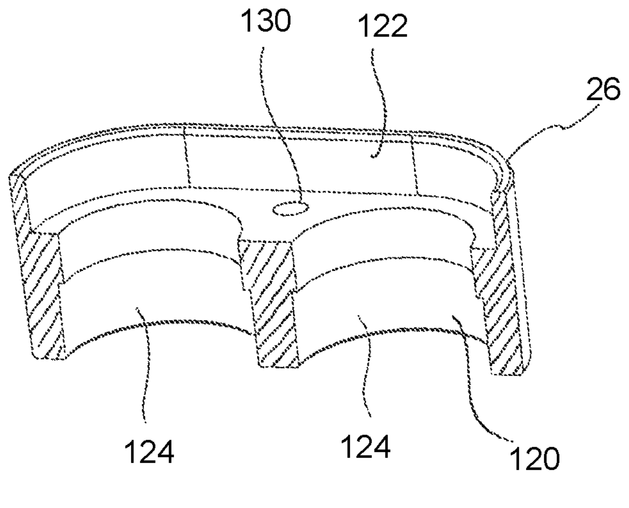
FIG. 30 is a cross-sectional view of an end cap for the flashlight of FIG. 8 showing the internal structure thereof.
Figure 31:
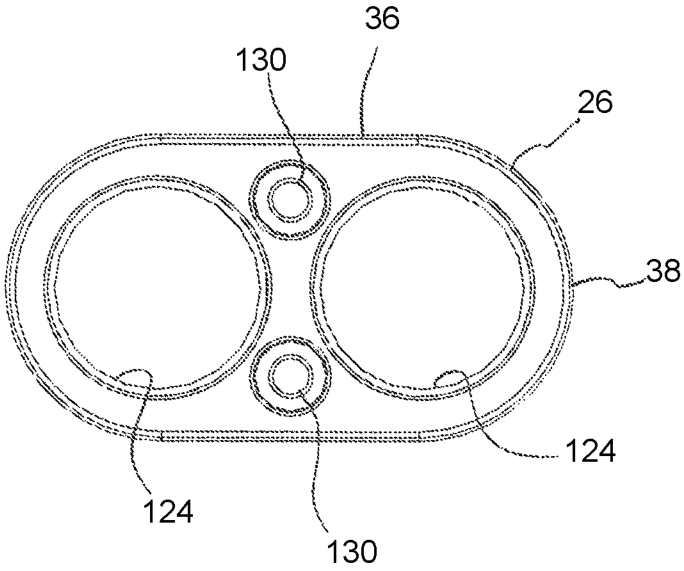
FIG. 31 is a bottom plan view of the end cap of FIG. 30 showing battery through openings and attachment screw through openings.

The end cap 26 is shown in more detail in FIGS. 7, 30, and 31. The end cap 26 includes an end wall portion 120 and a sidewall 122 extending around the oblong perimeter of the end wall portion 120 and forwardly therefrom. The sidewall 122 is sized to fit over the neck 28 of the central portion 24 so that the neck 28 can be received therein. As discussed above, preferably the O-rings 34 extending around the neck 28 engage an interior surface 123 of the sidewall 122. Alternatively, the end cap 26 and central body portion 24 can be an integral single piece configured to couple to the head 22, such as using the long fasteners 118 or snap-fit structure.

Laterally spaced battery through openings 124 extend through the end wall portion 120 and are sized large enough for batteries 20 to pass therethrough. This allows a user to easily change the batteries 20 during use. In the illustrated form, the battery openings 124 are threaded and threaded plugs 126 are sized to tightly fit therein, making the connection watertight. Additionally, the plugs 126 can have o-rings or the like disposed therearound for an additional watertight feature. For easy removal, the plugs 126 can include slots 128 thereacross so that a user can easily rotate the plugs 126. Other suitable options can also be utilized, such as knurled projecting ends or recesses that require hardware including screwdrivers or the like. More specifically, when the power source 20 is exhausted, the user can unscrew the plugs 126 to access the openings 124. The user can then upend the flashlight 10 so that the dead batteries 20 fall out. The user then inserts fresh batteries 20 through the openings 124 to engage the contact springs 107 at the other end of the battery compartment of the flashlight 10. Screwing the plugs 126 back in forces the batteries 20 toward the contact springs 107 so that they are compressed to tightly hold the batteries 20 within the flashlight 10 in electrical connection with the front light assembly 56.

The end cap 26 further includes two spaced connecting screw openings 130 that are disposed along a laterally central line C of the end cap 26. Moreover, the bracket wall 90 includes corresponding spaced connecting screw threaded bores 132. Additionally, the circuit board 102 and contact mounting plate 104 can have corresponding openings or recesses 131 so that the long fasteners 118 can pass therethrough or thereby. So configured, the long fasteners 118 can extend through the openings 130 in the end cap 26 and screw into the threaded bores 132 of the bracket 86 to thereby secure the body portions of the flashlight housing 12 together. As shown, the long fasteners 118 can include heads 134 with opening structure 136 therein, such as the hexagon opening shown, a flathead slot, a Philips slot, or other suitable configurations. Due to the ease of changing the batteries 20 via the battery openings 124, the long fasteners 118 need not be easily removable. Further, washers or O-rings can be disposed around the long fasteners 118 adjacent to the heads 134 thereof to substantially seal the connection between the fastener's heads 134 and the end cap 26.

The end cap 26 can further include a lanyard through opening 138 that can extend through the end wall 122 and sidewall 124 or through an outwardly projecting tab as desired. So configured, a lanyard or the like can be attached to the flashlight 10 therethrough so that a user can securely hold the flashlight with a loop around a wrist or tied to a desired structure.

Additional details of the central body portion 24 are shown in FIGS. 4, 5, 22, 23, and 29. The central body portion 24 includes flared flanges or rims 140 adjacent to and inwardly of the necks 28. The flanges 140 engage the sidewalls 46, 122 of the head 22 and end cap 26 and are sized to provide a smooth transition between the central body portion 24 and the head 22/end cap 26. So configured, the central body portion 24 is slightly recessed providing a secure handhold for a user.

As discussed above, the central body portion 24 has a tubular structure with a hollow interior 142 that serves as the battery compartment. The batteries 20 are configured to be disposed in a side-by-side and end-to-end manner. Preferably, the curvature of the rounded sides 38 of the central body portion 24 generally matches the curvature of the battery sidewalls 144 so that the batteries 20 are not loosely disposed within the interior 142.

Figure 29:
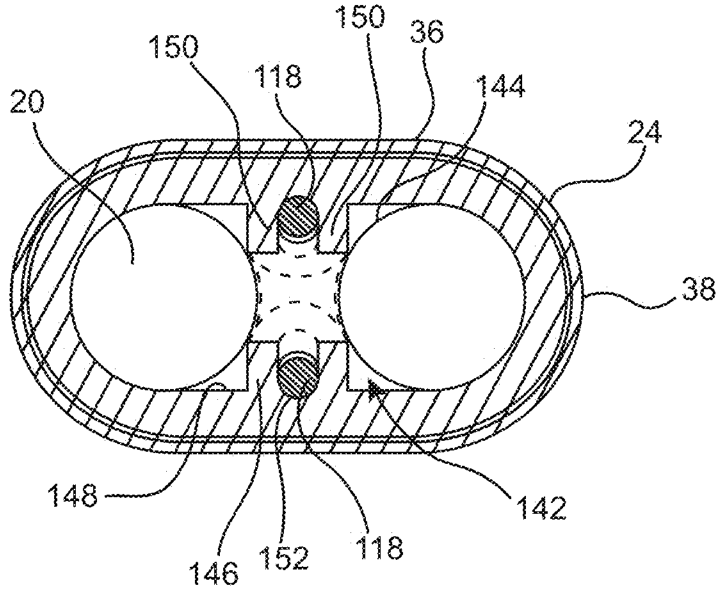
FIG. 29 is a cross-sectional view of a central body portion of the flashlight of FIG. 8 showing batteries disposed therein and a support structure for attachment screws.

As shown in FIG. 29, the central body portion 24 includes support structures 146 for the long fasteners 118 that extend longitudinally along an interior 148 of the flat sides 36. The support structures 146 in the illustrated form include two walls 150 that define a trough 152 therebetween sized to receive the long fasteners 118 therein. Alternatively, the support structure can be outwardly projecting tabs with a bore extending therethrough or the support structure can extend across the interior 142 to separate the interior 142 into two cavities for the batteries 20.

As discussed above, utilizing a heat sink advantageously allows the flashlights as described herein to have a compact configuration. For example, the flashlight 10 can have a housing length extending along the longitudinal axis L of between about 120 mm and about 150 mm, a maximum housing width extending between the rounded ends 38 of the flashlight 10 orthogonal to the longitudinal axis L and in a lateral direction of between about 40 mm and about 50 mm, and a housing thickness extending between the flat sides 36 of the flashlight 10 orthogonal to the longitudinal axis L and in another lateral direction that is orthogonal to the lateral direction between the rounded ends 38 of between about 15 mm and about 30 mm. The grooves 42 can have a depth extending along the longitudinal axis L of between about 5 mm and about 15 mm, a thickness of between about 1 mm and 3 mm, and a width extending orthogonal to the longitudinal axis L and in a lateral direction of about 10 mm. Finally, the long fasteners can have a length of between about 85 mm and 115 mm.

In an example utilizing four AA batteries, which have a diameter of 14.5 mm and a length of 50.5 mm, in a configuration as described above, the flashlight can have the following dimensions: an overall length extending along the longitudinal axis L of about 150 mm—the head being about 39 mm, the central body portion being about 104 mm, and the end cap being about 20 mm with overlapping portions as described above; a width extending orthogonal to the longitudinal axis L between the flashlight ends 38 of about 42 mm at the central body portion and between about 43 mm and about 44 mm at the head and end cap; and a thickness extending orthogonal to the longitudinal axis L between the flashlight sides 36 of about 22 mm at the central body portion and between about 23 mm and about 25 mm at the head and end cap. Additionally, the grooves can have a depth extending along the longitudinal axis L of about 12 mm, a thickness of about 2 mm, and a width extending orthogonal to the longitudinal axis L of about 10 mm. Finally, the long fasteners can have a length of about 115 mm.

In an example utilizing four AAA batteries, which have a diameter of 10.5 mm and a length of 44.5 mm, in a configuration as described above, the flashlight can have the following dimensions: an overall length extending along the longitudinal axis L of about 134 mm—the head being about 35 mm, the central body portion being about 93 mm, and the end cap being about 17 mm with overlapping portions as described above; a width extending orthogonal to the longitudinal axis L between the flashlight ends 38 of about 33 mm at the central body portion and between about 34 mm and about 36 mm at the head and end cap; and a thickness extending orthogonal to the longitudinal axis L between the flashlight sides 36 of about 15 mm at the central body portion and between about 17 mm and about 19 mm at the head and end cap. Additionally, the grooves can have a depth extending along the longitudinal axis L of about 5 mm, a thickness of about 2 mm, and a width extending orthogonal to the longitudinal axis L of about 10 mm. Finally, the long fasteners can have a length of about 106 mm.

In an example utilizing four CR123 batteries, which have a diameter of 17 mm and a length of 34.5 mm, in a configuration as described above, the flashlight can have the following dimensions: an overall length extending along the longitudinal axis L of about 122 mm—the head being about 42 mm, the central body portion being about 72 mm, and the end cap being about 18 mm with overlapping portions as described above; a width extending orthogonal to the longitudinal axis L between the flashlight ends 38 of about 46 mm at the central body portion and between about 47 mm and about 48 mm at the head and end cap; and a thickness extending orthogonal to the longitudinal axis L between the flashlight sides 36 of about 25 mm at the central body portion and between about 26 mm and about 27 mm at the head and end cap. Additionally, the grooves can have a depth extending along the longitudinal axis L of about 11 mm, a thickness of about 2 mm, and a width extending orthogonal to the longitudinal axis L of about 10 mm. Finally, the long fasteners can have a length of about 85 mm.

Figure 32:
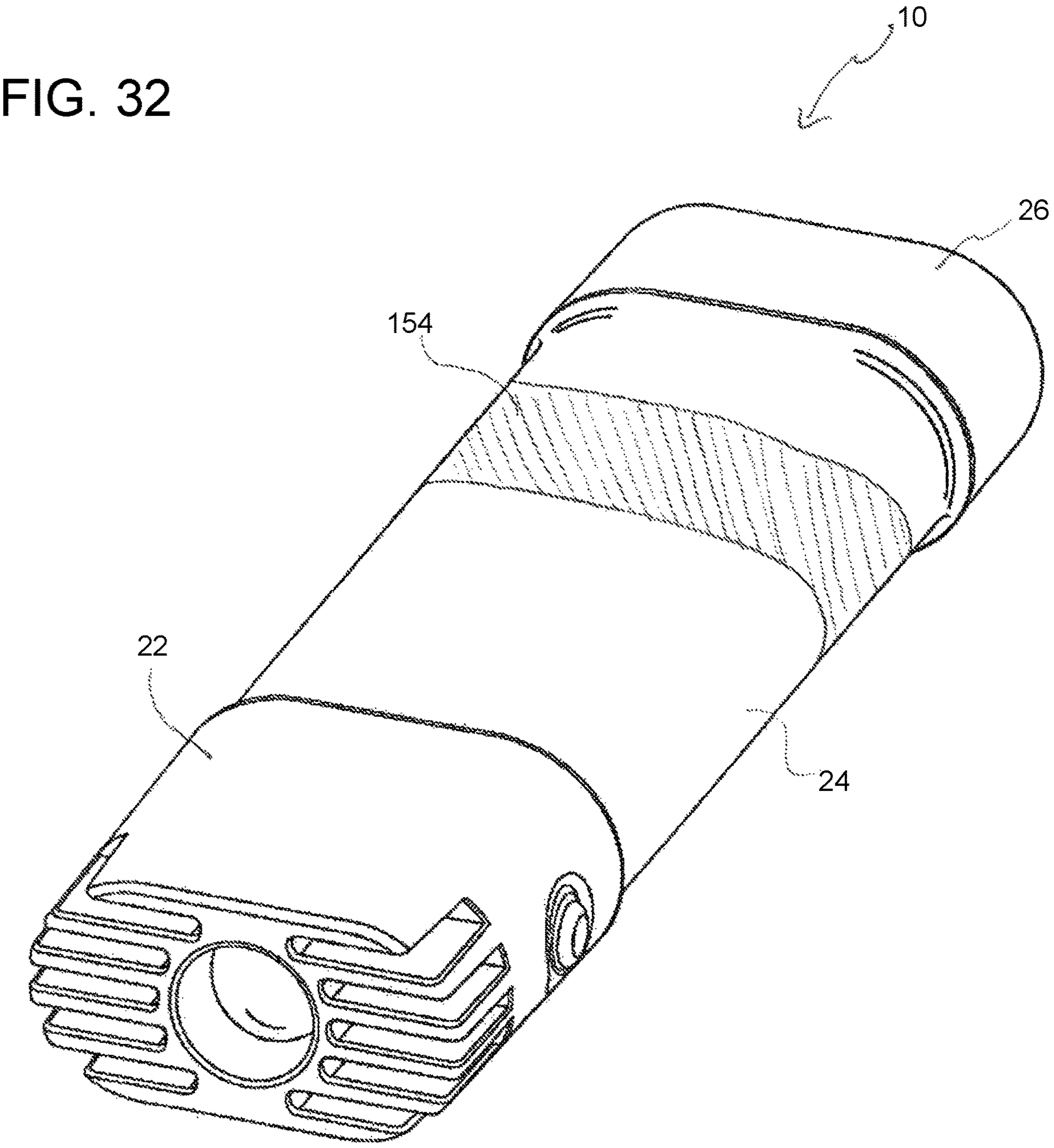
FIG. 32 is a perspective view of an alternative housing for a flashlight having rubber insets providing a soft surface for a user's teeth when the user is holding the flashlight in his/her mouth for hands free lighting.
Figure 33:
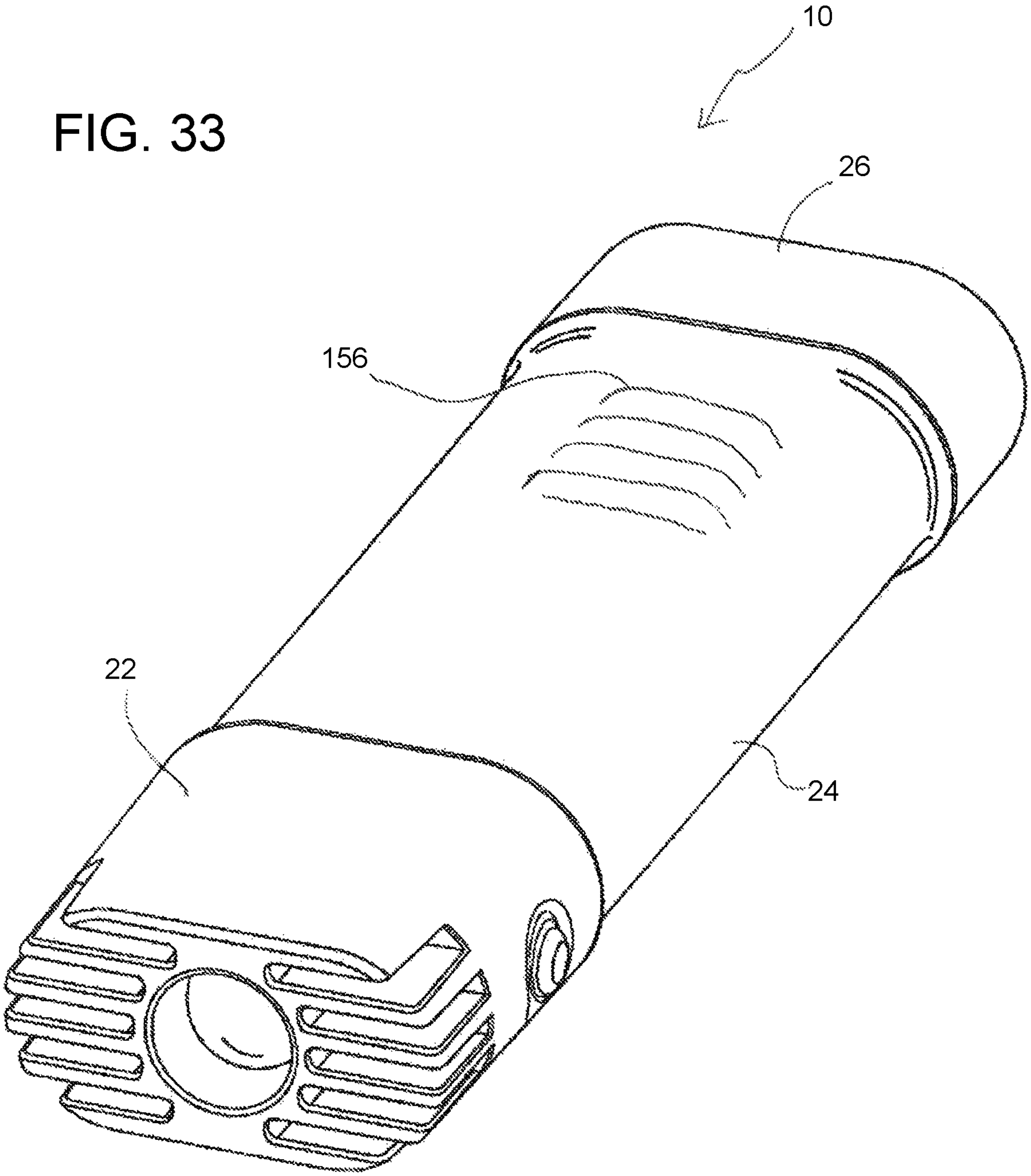
FIG. 33 is a perspective view of an alternative housing for a flashlight having transverse ridges for a user's teeth when the user is holding the flashlight in his/her mouth for hands free lighting.

Users occasionally clamp flashlights in their teeth so that light shines forwardly thereof while the users' hands are free. In order to ease this use, the flashlight 10 can include rubber insets or panels 154 that extend at least partially over the flat sides 36 of the flashlight housing 12, as shown in FIG. 32. The rubber panels 154 provide a soft surface for the user's teeth. Alternatively, the flashlight housing 12 can include transverse ridges 156 extending thereacross in the end cap 26 or rear portion of the of the central body portion 24 so that the ridges 156 can provide a gripping surface for the user's teeth, as shown in FIG. 33.

Figure 34:
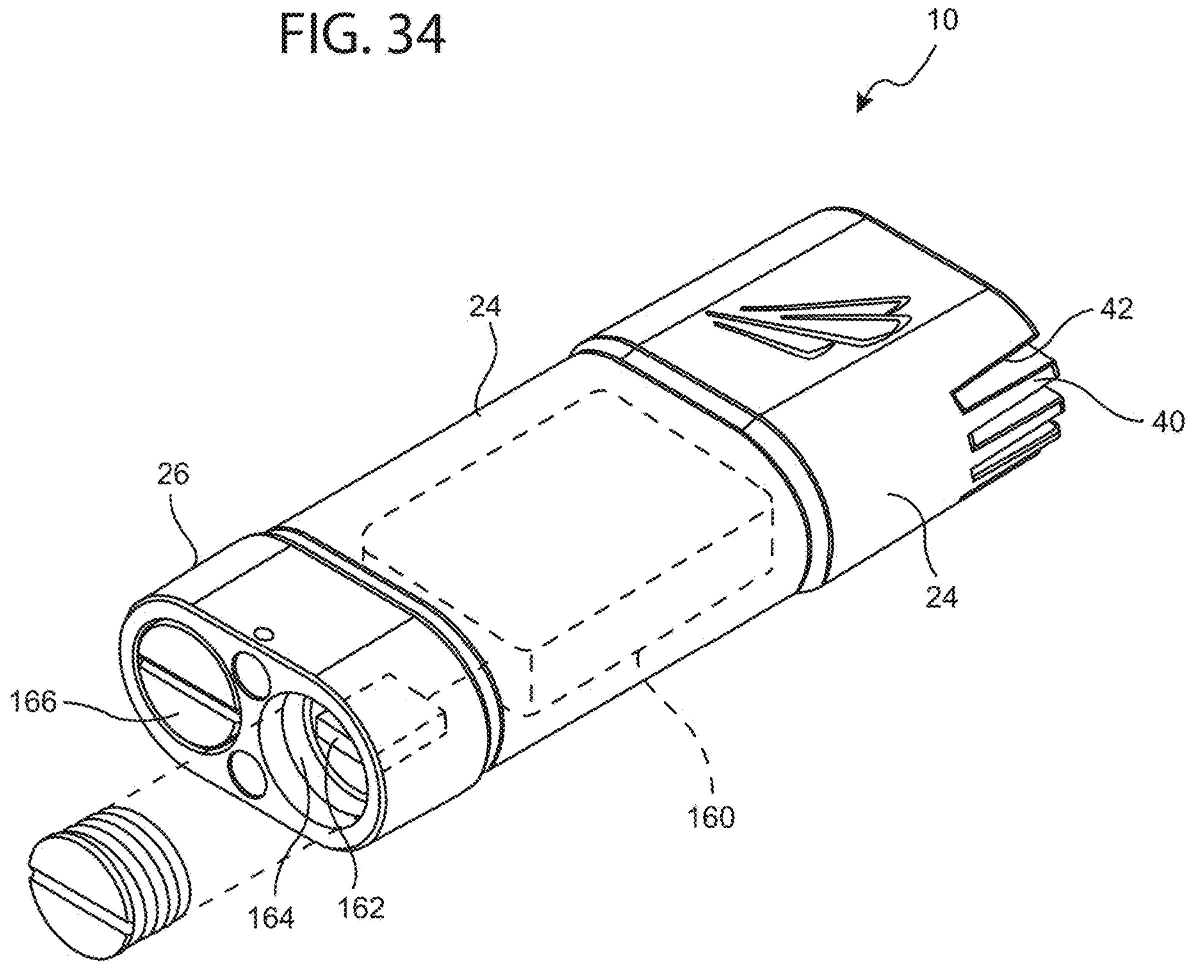
FIG. 34 is a perspective view of a flashlight having a rechargeable battery therein and a charging port accessible through an opening in an end cap thereof.
Figure 35:
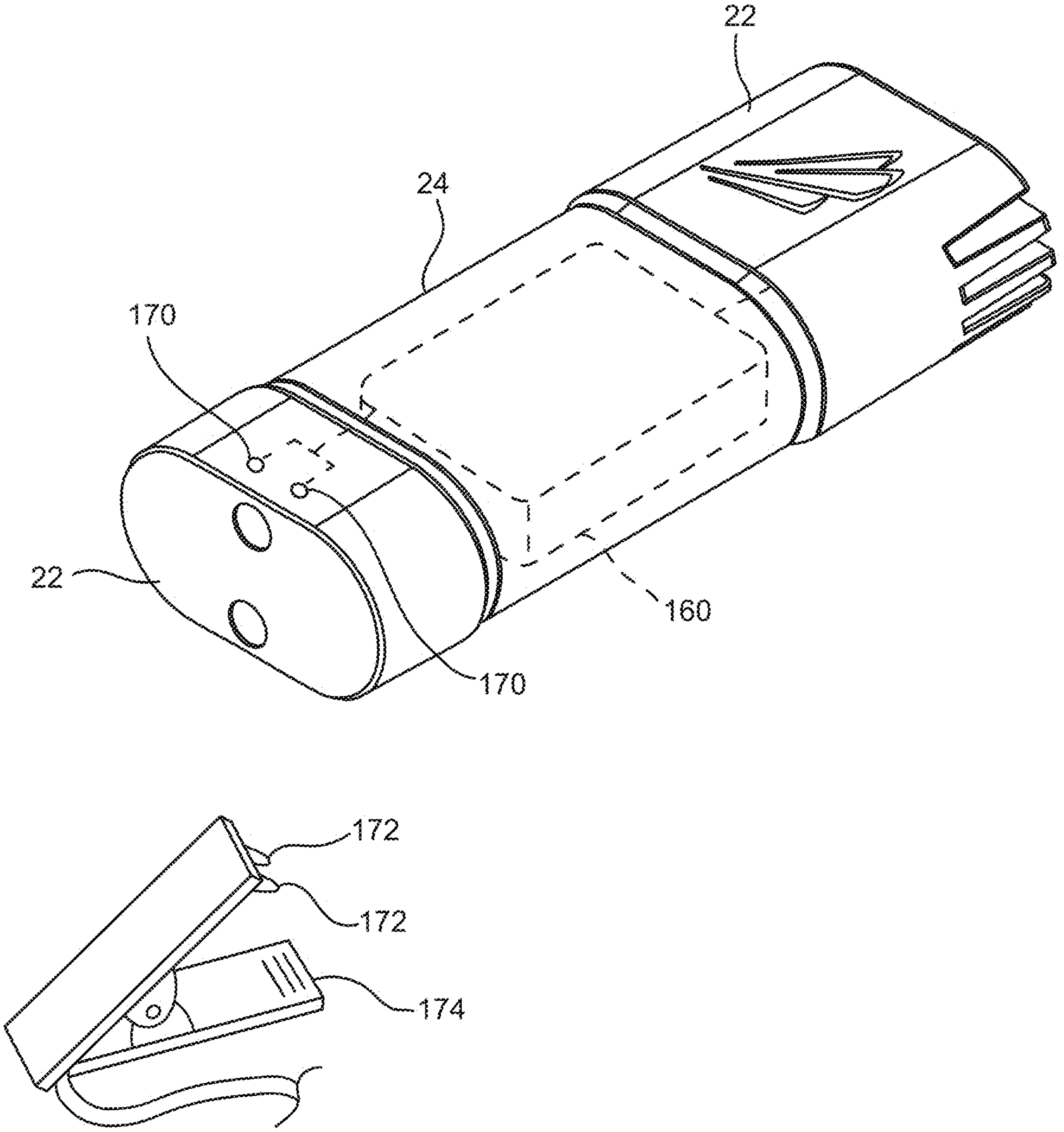
FIG. 35 is a perspective view of a flashlight having a rechargeable battery therein and recharging contacts on an exterior surface of an end cap to receive recharging power.
Figure 36:
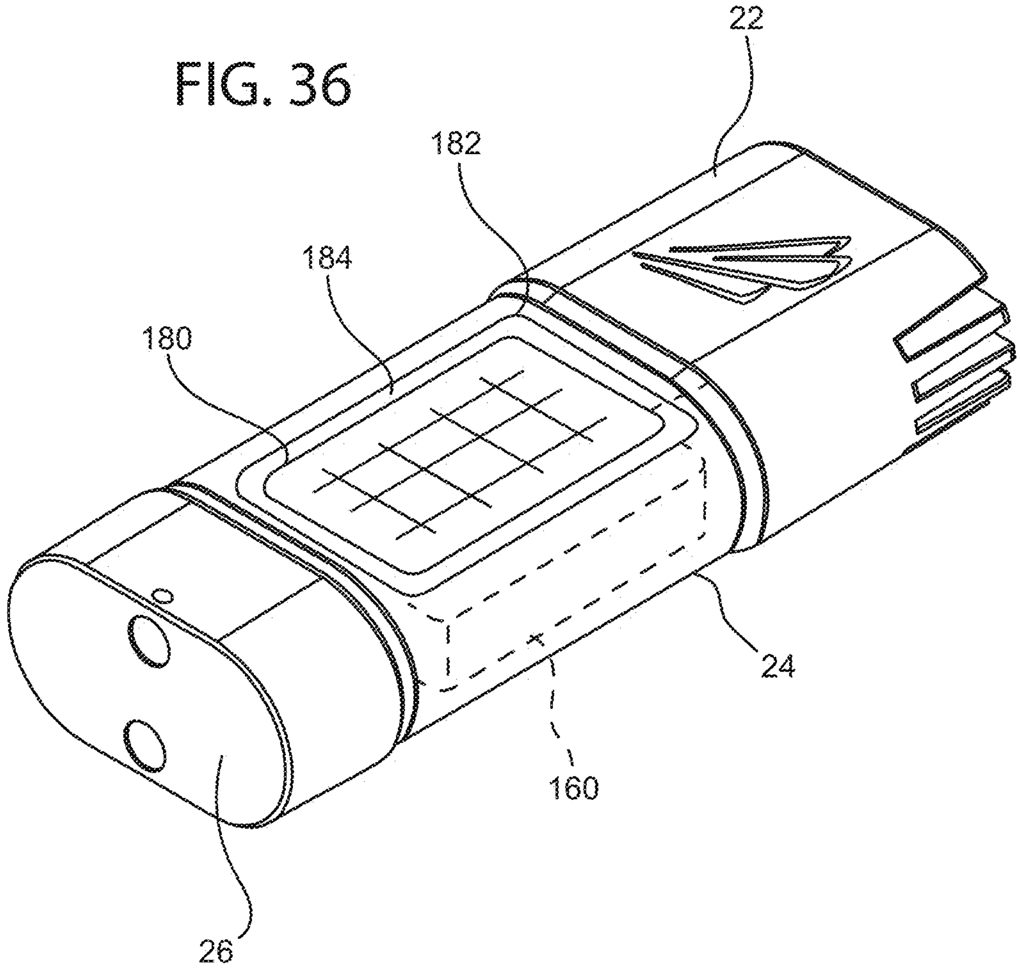
FIG. 36 is a perspective view of a flashlight having a recharge battery therein and a solar panel mounted thereto to provide recharging power to the rechargeable battery.

Although the above forms utilize replaceable batteries 20, the flashlight 10 can also utilize a rechargeable battery 160. The rechargeable battery 160 is electrically coupled to the circuit board 102 to thereby provide power to the LED 16. Several mechanisms, shown in FIGS. 34-36, are suitable to provide recharging power to the rechargeable battery 160. In a first form, shown in FIG. 34, a port or connector 162 is accessible via a through opening 164 and removable plug 166 configured similarly to the battery openings 124 and plugs 126 described above. The port 162 can be any suitable electrical connection, such as a USB, mini-USB, lightning, or the like. So configured, when the charge of the rechargeable battery 160 runs low, a user can remove the plug 166 to access the port 162. The user can then plug an electrical supply into the port 162 to recharge the battery 160 and replace the plug 166 after the battery 160 is recharged.

In a second form, shown in FIG. 35, the end cap 26 can have spaced recharging electrical contacts 170 that are accessible on the end cap end wall 120 or sidewall 122 and electrically coupled to the rechargeable battery 160. Although shown in a side-by-side configuration, the contacts 170 can be disposed on opposite sides of the end cap 26 or elsewhere as desired. To recharge the battery 160, a user brings two corresponding supply contacts 172 into electrical engagement with the recharging contacts 170. In the illustrated form, the recharging contacts 170 are disposed on one of the flat sides 36 of the end cap 26. So configured, an alligator clip 174 having the supply contacts 172 thereon can clip to the end cap 26 to provide secure recharging of the battery 160.

In a third form, shown in FIG. 36, the flashlight 10 can have one or more solar panels 180 mounted thereto and electrically coupled to the rechargeable battery 160 to generate recharging power therefor. As shown, the solar panel 180 is mounted within an opening 182 in the flat side 36 of the central body portion 24. In order to maintain the watertight properties of the flashlight 10, a transparent or translucent cover 184 can be disposed thereover and sealed to the central body portion 24.

Figure 37:
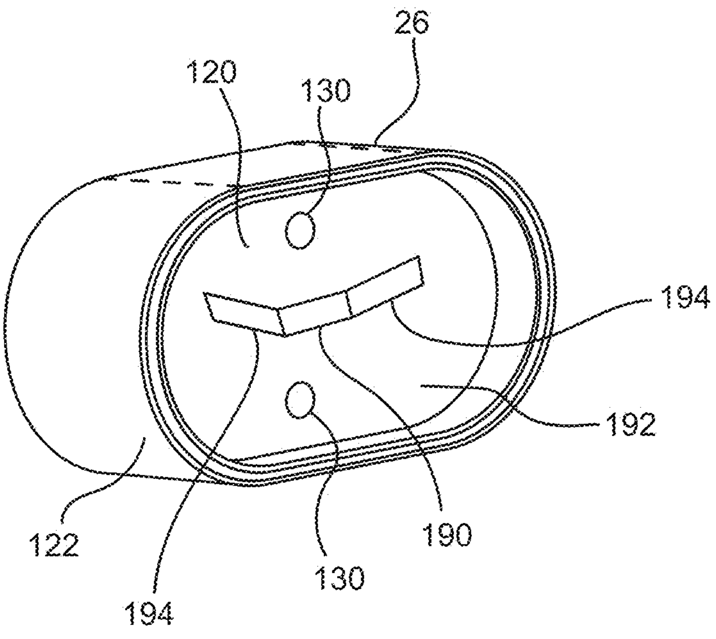
FIG. 37 is a perspective view of an alternative end cap for a flashlight having a contact bar mounted to an interior surface thereof.

As shown in FIG. 37, the end cap 26 can alternatively include a contact bar 190 on an interior surface 192 of the end wall portion 120. The contact bar 190 includes two arms 194 that project at least slightly away from the interior surface 192 so that placement of the cap 26 onto the central body portion 24 causes the batteries 20 to deform and flex the arms 194 rearwardly holding the batteries 20 securely within the flashlight 10 as well as completing electrical circuits between the batteries 20.

Figure 38:
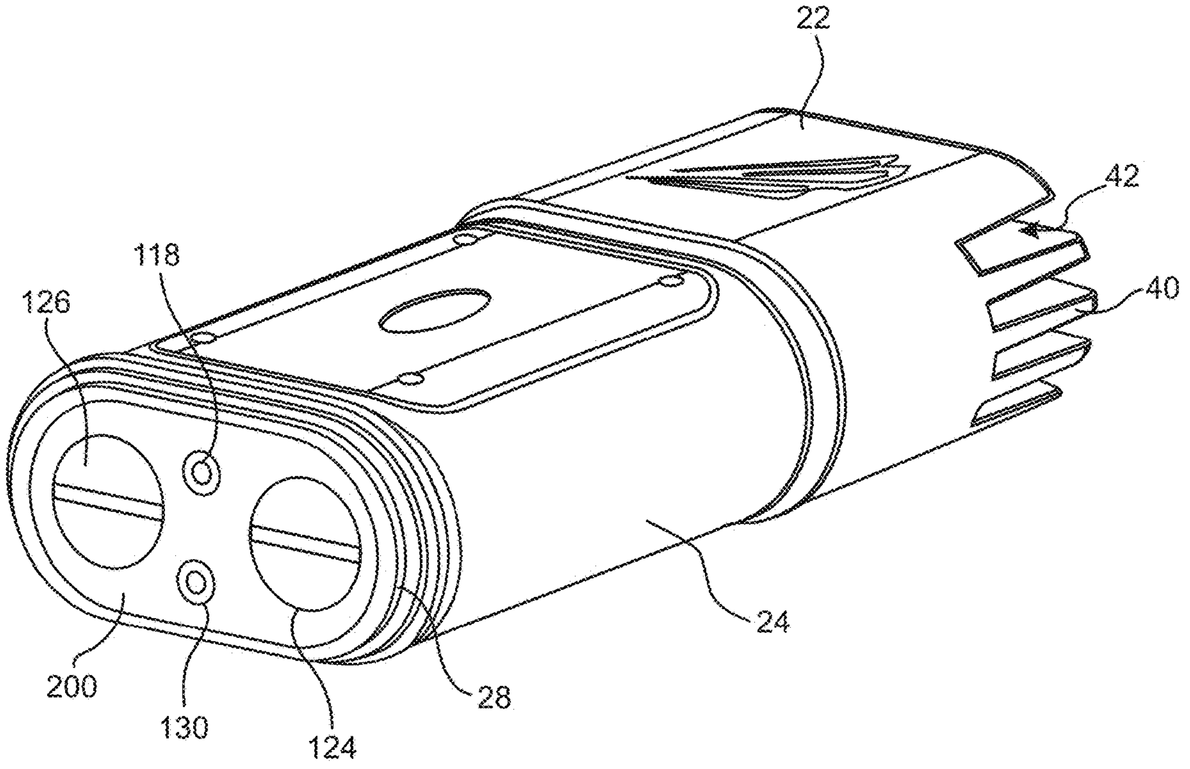
FIG. 38 is a perspective view of a flashlight having an interference-fit end plate disposed in a distal end of a central body portion thereof.

In another alternative embodiment shown in FIG. 38, the end cap 26 can be replaced with an end plate 200 that is sized to have an interference fit within the distal end 30 of the central body portion 24. The end plate 200 has the battery through openings 124 so that a user can replace the batteries 20 within the central body portion 24.

Figure 39:
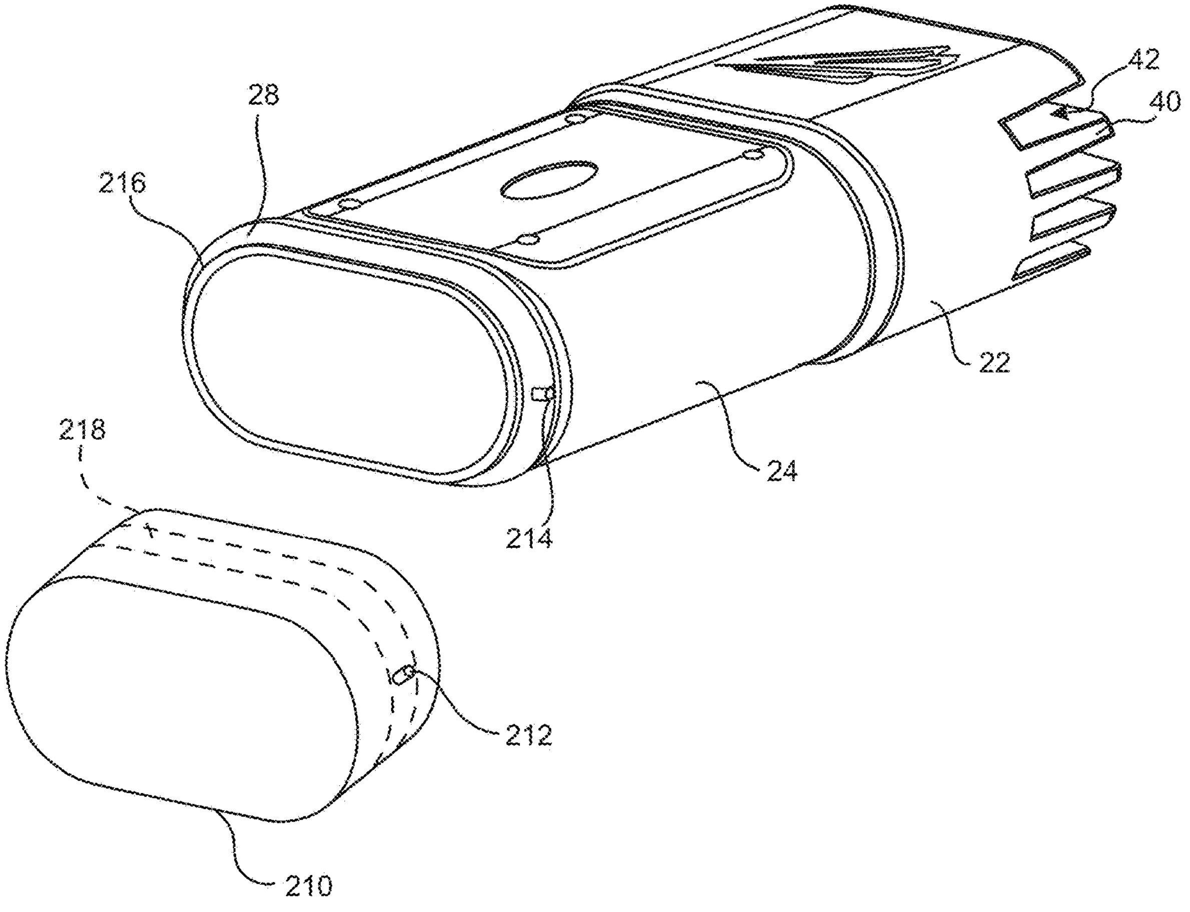
FIG. 39 is a perspective view of an alternative end cap and central body portion attachment showing a post on the central body portion and a corresponding opening on the end cap to secure the end cap to the central body portion.

In yet another embodiment shown in FIG. 39, an alternative end cap 210 can be of a flexible or semi-flexible material, such as rubber, so that the end cap 210 can be partially deformed over the neck 28 of the central body portion 24 to secure the end cap 210 thereto. More specifically, the end cap 210 can include a through opening or recess 212 and the central body portion 24 can include a corresponding post 214, so that the end cap 210 can deform to pass the opening 212 over the post 214 and secure the end cap 210 to the central body portion 24. Although an opening and post are shown, other suitable snap-fit structure can also be utilized. For example, the opening 212 and post 214 can be utilized in conjunction with a rim 216 that extends around the neck 28 and the end cap 210 can include a corresponding annular recess 218 configured to mate with the rim 216.

Figure 40:
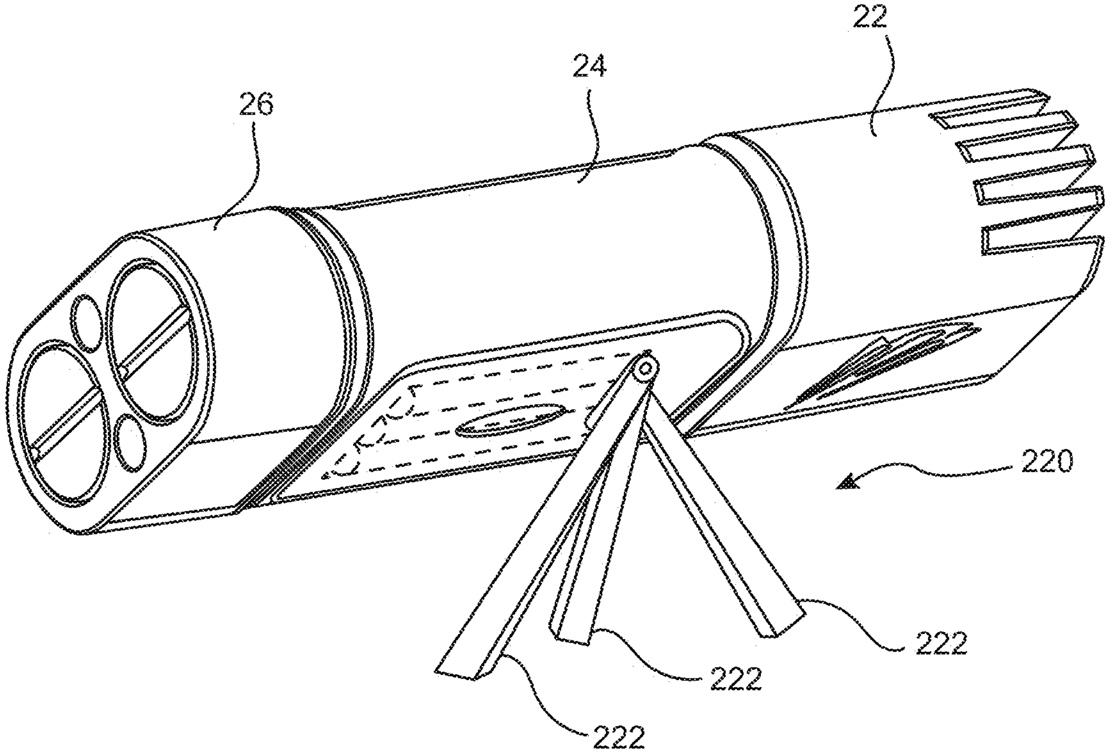
FIG. 40 is a perspective view of a flashlight having legs rotatably attached thereto to support the flashlight in a desired position.

Any of the flashlight embodiments described herein can further include a support structure 220 having a stored configuration where the structure 220 does not impact the streamlined profile of the flashlight and a use configuration shifted away from the flashlight housing 12. In the use configuration, the support structure 220 can provide a configurable and adjustable base to support the flashlight in a desired orientation so that a user can direct hands-free illumination to desired areas. In the illustrated form of FIG. 40, the support structure can include a number of legs 222, such as three as shown, rotatably mounted to the flashlight housing 12, and preferably with a ball-and-socket connection. So configured, a user can pivot the legs, either independently of one another, such as with a ball-and-socket connection or along a common rotation axis with a shared pivot, so that the flashlight 10 can rest on a surface in a desired orientation.

The end cap 26 described above can be constructed of any suitable material, including metal, such as aluminum, or plastic, or a combination of such materials. For flashlights having a plastic end cap 26 or other plastic body structure, the flashlight 10 can further be fitted with a battery charge measuring circuit 250 that can provide a battery charge status remotely to a user. The plastic cap or body structure allows a wireless signal to pass therethrough.

Figure 41:
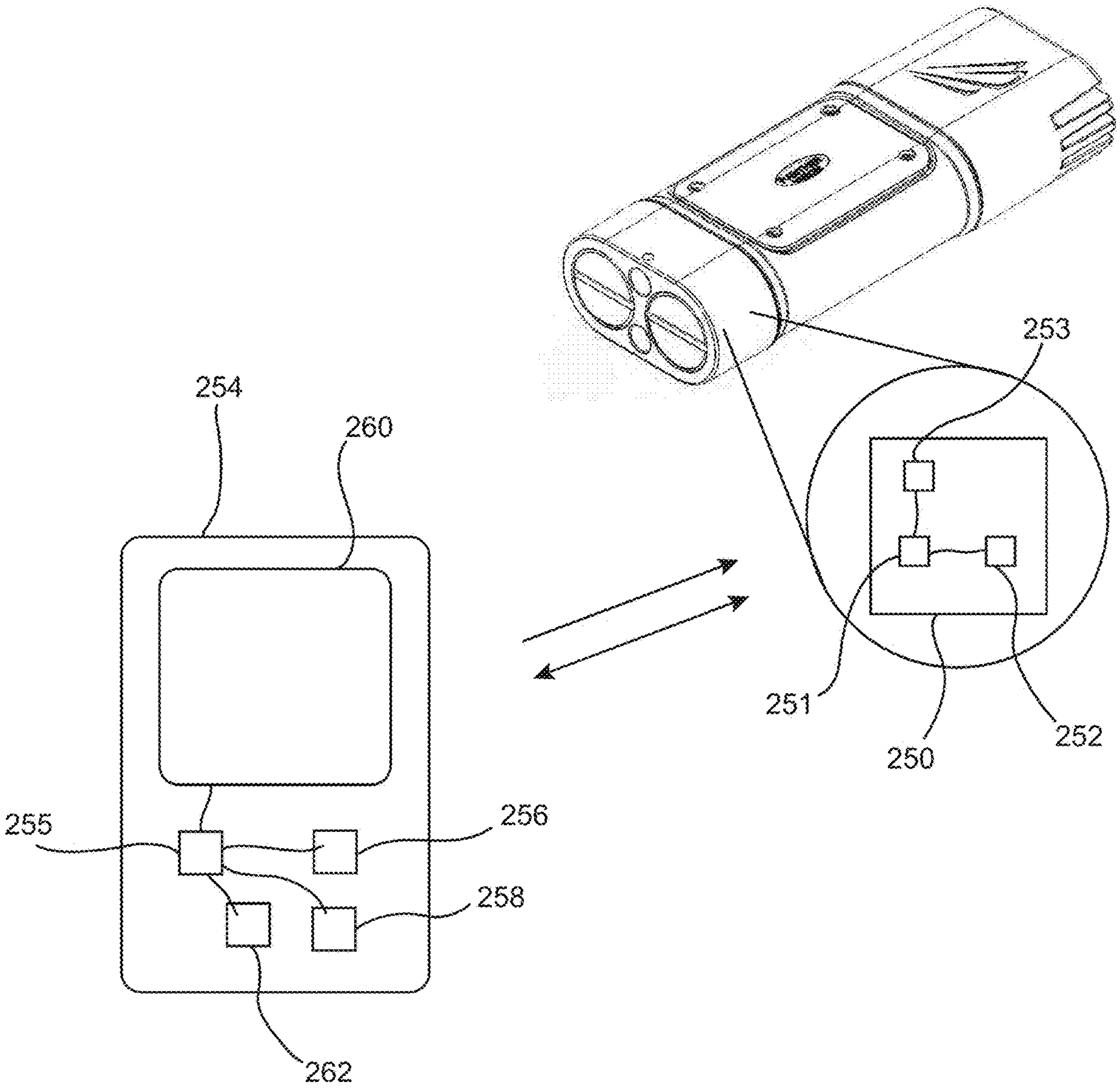
FIG. 41 is a diagram of a charge measuring circuit for monitoring the charge of batteries in a flashlight and a user communication device configured to communicate with the charge measuring circuit.
Figure 42A:
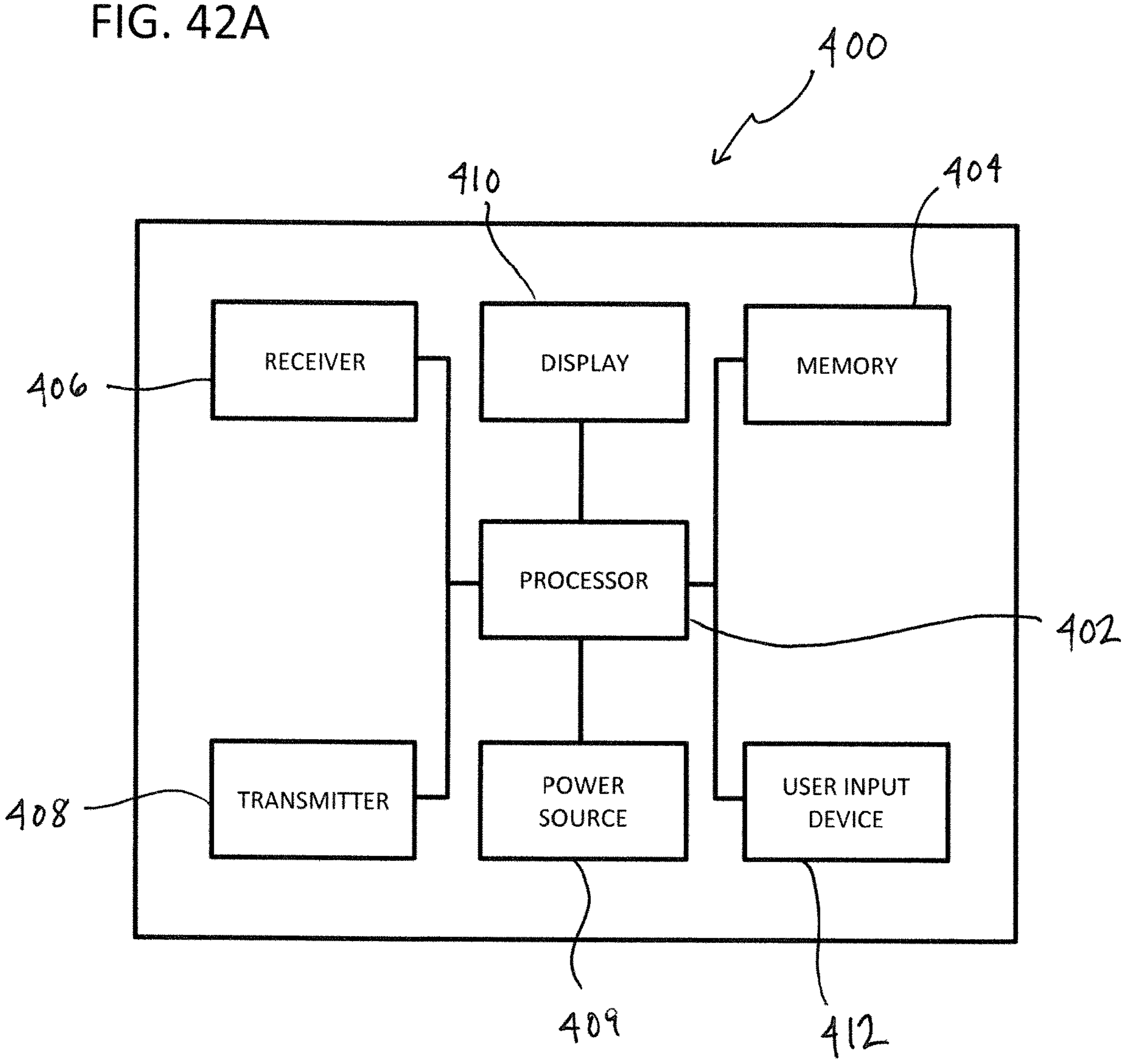
FIG. 42A is a diagram of a communication device configured to operate application software.

As shown in FIGS. 41 and 42, the charge measuring circuit 250 is electrically connected to the batteries 20 to measure their charge during use of the flashlight 10. The circuit 250 includes a processing device 251, a transmitter 252 configured to transmit a signal, and a receiver 253 configured to receive a signal, the transmitter 252 and receiver 253 configured to operate over any suitable network, including Bluetooth, Wi-Fi, near field communication, or radio. The circuit 250 further includes a clock, which is preferably low energy, so that the circuit 250 can be configured to check the battery condition at predetermined intervals, such as once or twice a day.

The other mechanism of the charge measuring circuit 250 is a software application ("application") that operates on a user's computing device. In the illustrated form, a user can download, install, and operate the application on a mobile phone or other portable communication device 254. The communication device 254 includes a processing device 255, a receiver 256, a transmitter 258, a display 260, and a user input 262, such as a keypad, touch screen, or other suitable input.

So configured, when the charge measuring circuit 250 detects that the battery charge falls below a predetermined level, such as when the battery charge reaches half, a quarter, or other percentage of the total voltage, the processing device 251 can cause a low charge signal to be sent to the communication device 254 via the transmitter 252 to inform the user of the battery status. In an additional form, the charge measuring circuit 250 can send a series of queries out to determine whether the communication device 254 is within range. For example, the charge measuring circuit 250 can send out query signals every, 15 minutes, 30 minutes, or every hour.

Alternatively, or in addition thereto, the user can send a query to the charge measuring circuit 250 via the user input 262 and the transmitter 258. Upon receiving the query, the charge measuring circuit checks the battery condition and sends a battery status signal to the communication device 254.

Figure 42B:
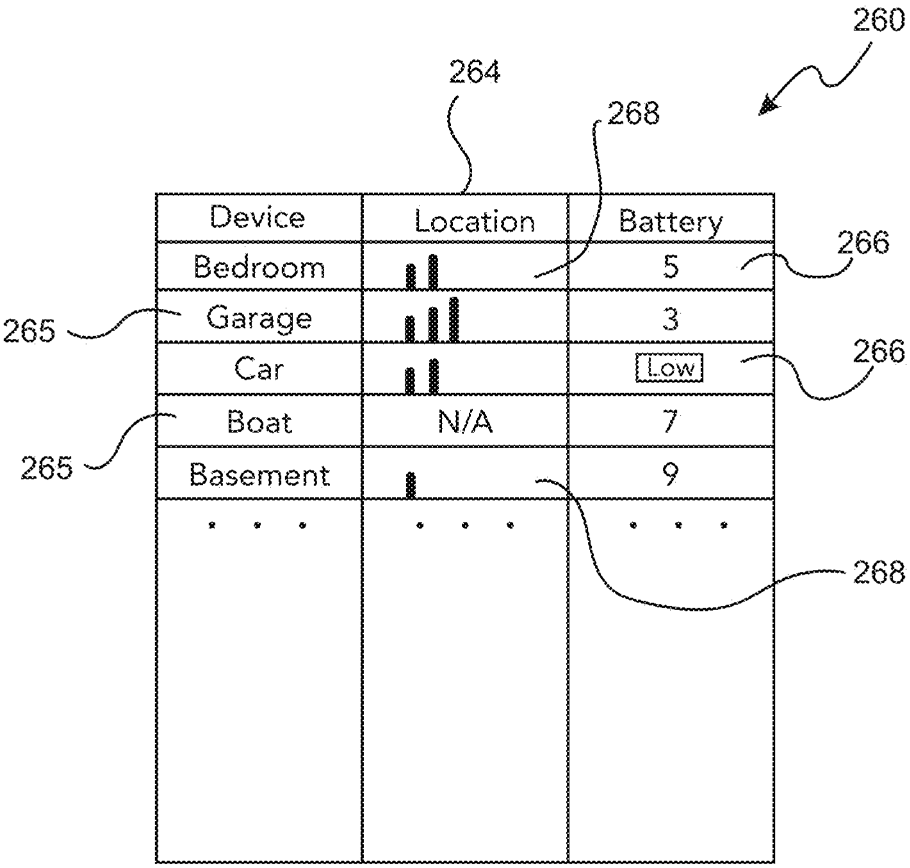
FIG. 42B is an example screen generated by application software for communicating with the charge measuring circuit showing a column of unique identifiers, a column of charge levels, and a column of signal strength which can be used to locate a flashlight.

An example application screen 264 is shown in FIG. 42B. In a preferred embodiment, the charge measuring circuit 250 provides a unique identifier 265 for each flashlight 10 or other electronic device having a charge measuring circuit. So configured, the application can easily identify the flashlight 10 to a user. If desired, the application can provide renaming capabilities to the user so that the user can change the unique identifier for the flashlight 10. As shown in FIG. 42B, the application lists all of the devices that it is in communication with along with a battery status 266 adjacent thereto. The battery status 266 can be any scale, such as between 1-10, low-medium-high, or other suitable indicators. Moreover, if desired, the battery status 266 can further provide additional indicators as to a battery's low charge status, such as blinking, using red indicators, and/or audible alarms.

The signal strength of signals received from the charge measuring circuit 250 can also advantageously be utilized to determine a location 268 of the flashlight 10. As shown in FIG. 42B, the application can display the signal strength of the signal received from the charge measuring circuit 250. As such, the user can walk around to find a location where the signal strength increases in order to narrow down the flashlight's location.

The application can also monitor and display the current power status 270 of the various associated flashlights. As shown in FIG. 42B, the application display can include a column showing whether a flashlight is "on" or "off," which informs a user if a flashlight was inadvertently left on. Moreover, the application can provide a user with the ability to remotely turn a flashlight "on" and "off" via a power button 272 as shown in the last column of FIG. 42. This advantageously allows a user to turn off a flashlight that was inadvertently left on or that is remote from the user. The user can also position a flashlight in a desired orientation and subsequently remotely power the flashlight on so that a desired area is illuminated.

Application software ("app") configured to operate on a mobile communication device, such as a mobile phone, tablet, or the like, or other computing device is described herein that provides a connection to, and control of, one or more light devices. As is understood and shown in FIG. 42A, an example user device 254 is a mobile communication device 400 that includes one or more processors 402, a memory 404, a receiver 406, a transmitter 408, a power source 409, and other electrical components, including electrical connections such as wires, traces, and the like. The app is configured to be stored in the memory 404 of the mobile communication device 400 and executed by the processor 402 to generate a user interface on a display 410 of the device 400 control various functionalities as described herein. The functionalities can be controlled interaction with user inputs 412, such as buttons, including physical and touch screen buttons. The app is described with respect to FIGS. 43-50. The app connects to a light device using any suitable protocol or standard, such as Bluetooth. The app can be configured to connect to any suitable light device, including the flashlights described herein or other light devices, including hats, glasses, buttons, work lamps, or the like, and allows a user to control the light device and change modes of operation thereof, such as shifting between on and off states, changing a setting, changing an effect, or the like as described herein.

Figure 43:
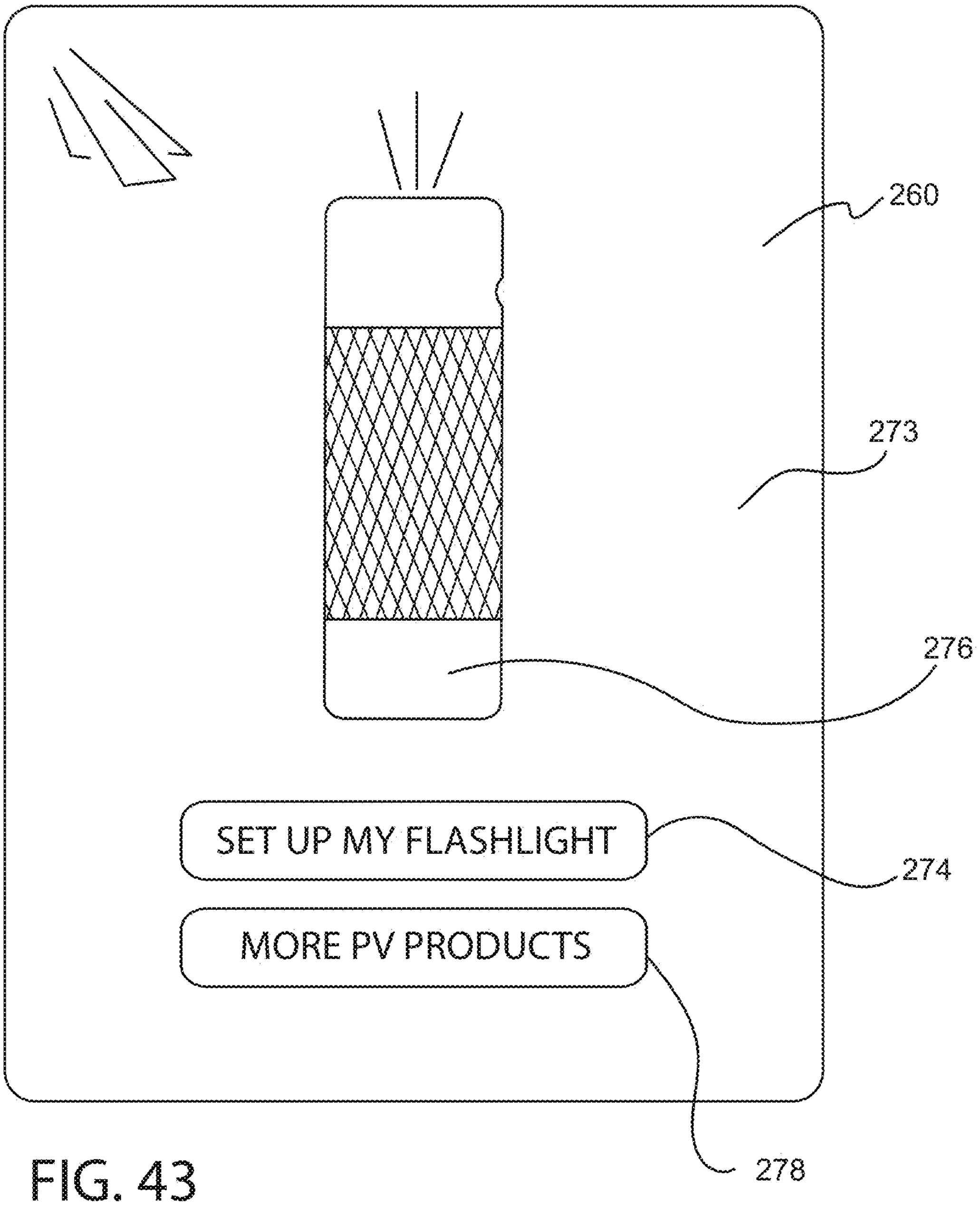
FIG. 43 is an example screen generated by application software for communicating with a light device showing a first set up screen.

As shown in FIG. 43, the app, once opened and brought to the front on a display 260 of the user device 254, can include an introduction screen 273 providing a button 274 for setting up a light device 276 and, if desired, a button 278 that links to other available light devices configured to be operated by the app. The app can further include introductory directions shown in FIGS. 44 and 45 for setting up light devices and operating the app, accessible, for example, by selecting the button 274 for setting up the light device 276. For example, a first step can be to make sure that the desired light device 276 is currently turned "on." A second step can be to make sure that the user device 254 currently has Bluetooth activated. A third step can be to connect the user device 254 to the light device 276. The connection can be achieved through selection of the desired light device identified on the display of the device, either within the app itself or within a separate settings section of the user device 254. The app can then confirm that the light device 276 is connected to the user device 254.

Figure 46:
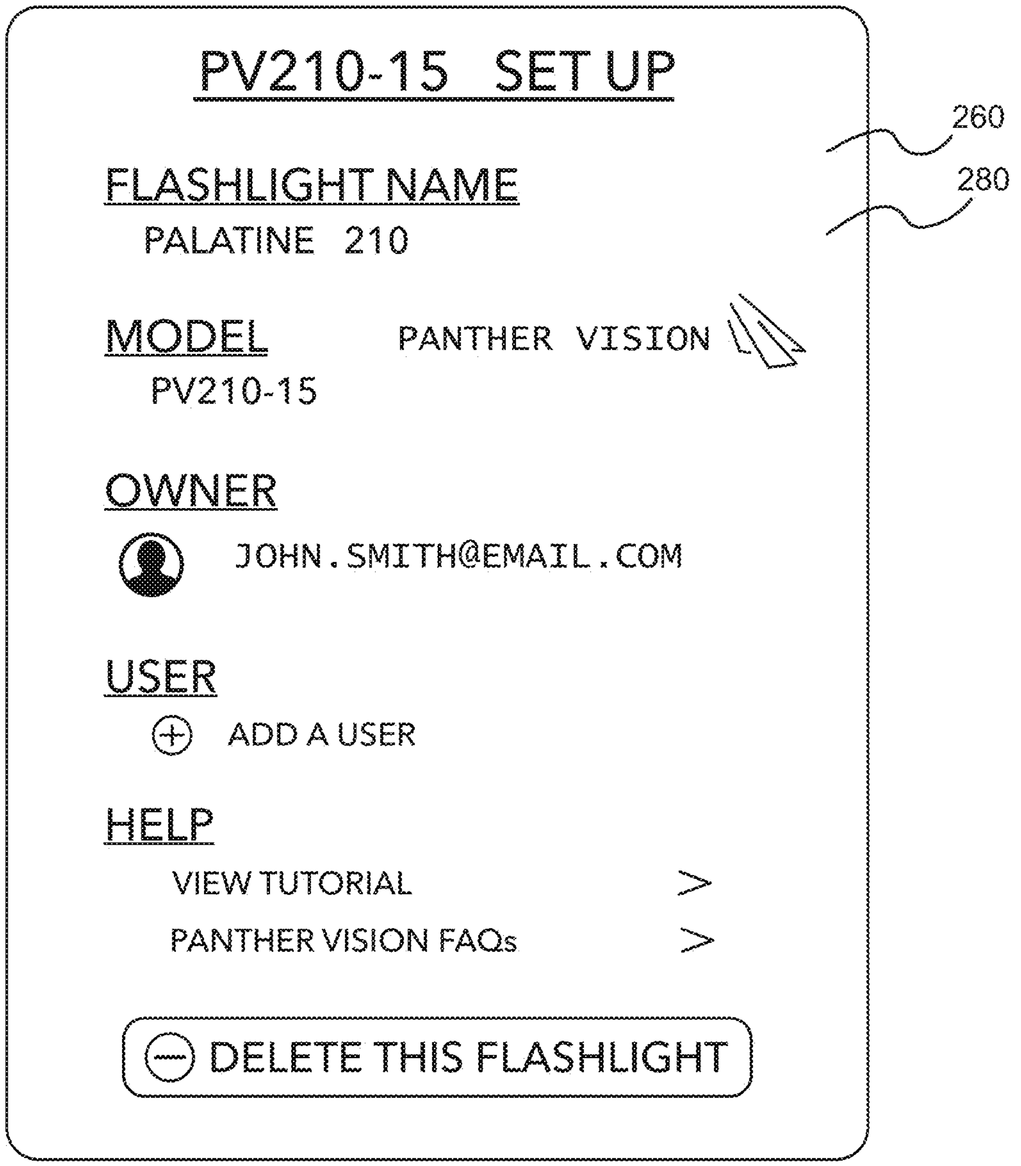
FIG. 46 is an example screen generated by application software for communicating with a light device showing a light device information screen.
Figure 47:
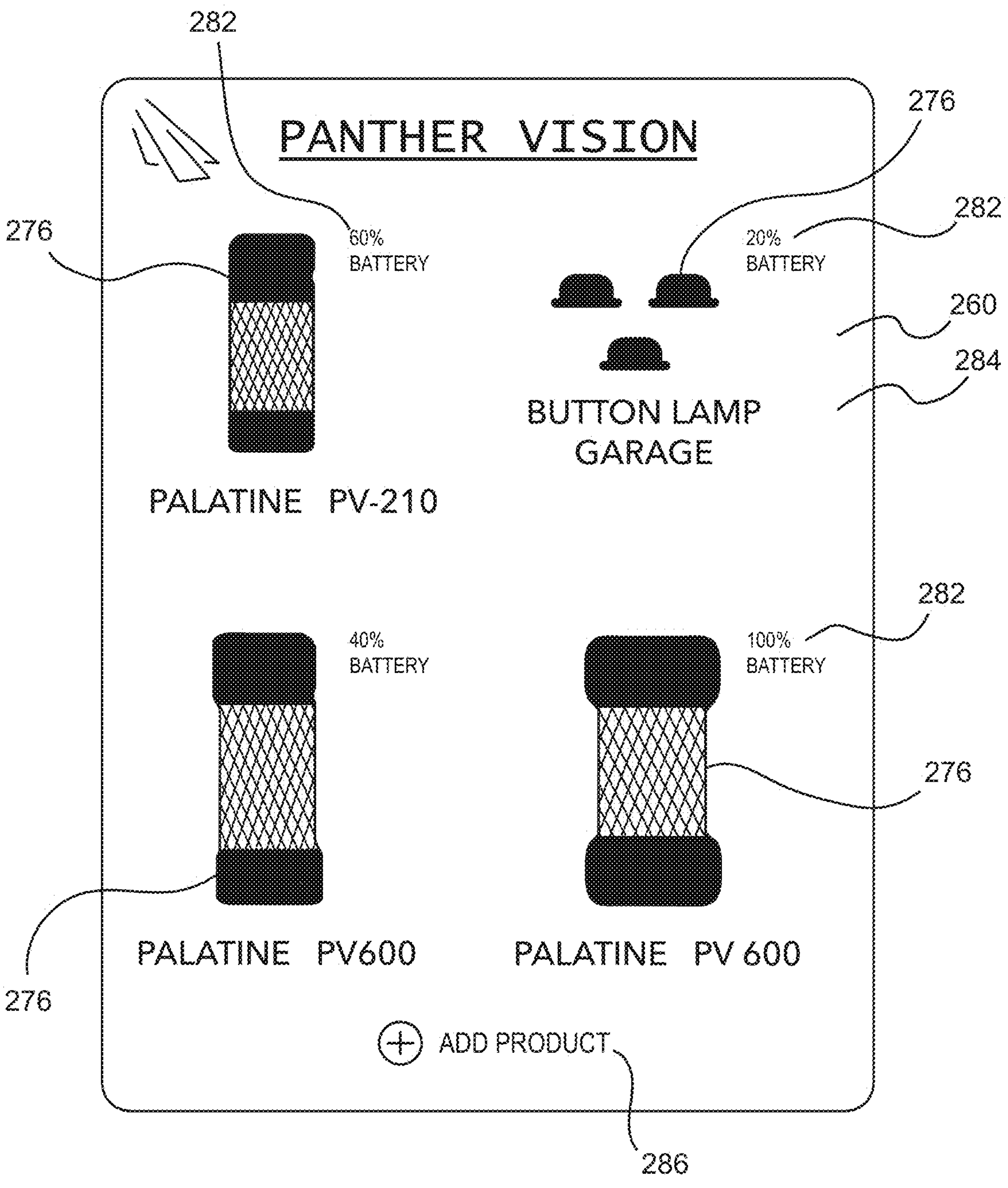

After the light device 276 is connected to the user device 254, the app can provide a setup functionality to the user via a setup screen 280, an example of which is shown in FIG. 46. The setup screen 280 can allow the user to change various settings for the light device 276, including an identification or name, owner, add or remove other authorized users, or the like. The setup screen 280 can also provide the user with the model number of the light device 276 and provide a help section. The help section can include a frequently asked questions section, a searchable database, a tutorial into the use of the light device, a link to some or all of these resources on the Internet, or combinations thereof. The setup screen 280 can also allow a user to delete the light device 276, and the profile thereof, from the memory of the device and app.

So configured, a user can connect to any number of light devices with the app and control operation thereof. The app can advantageously display, like that shown in FIG. 47, all of the light devices 276 registered with the app in one or more screens 284, accessible by scrolling, swiping, or paging over. In addition to identifying which light devices 276 are currently operating, the app can also provide a current power level 282 of the power source 20 for each light device 276. This informs the user of when a battery will need to be replaced or recharged as appropriate, as well as the current expected lifetime of the device 276 given the power level. The app can also provide a software switch or button 286 to add another product, the selection of which can take the user to the setup screen 280.

Figure 48:
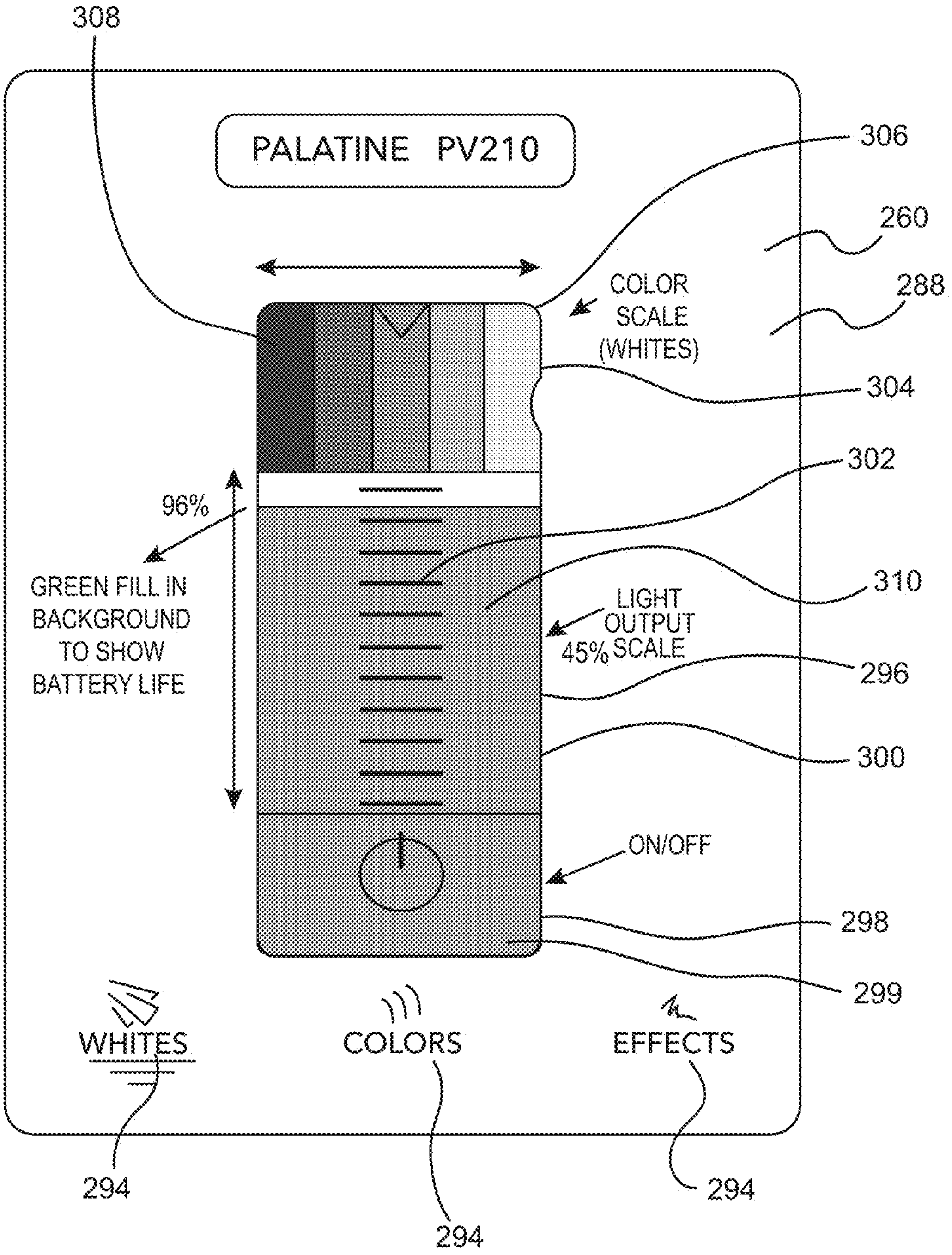
FIG. 48 is an example screen generated by application software for communicating with a light device showing a control screen for a light device.
Figure 49:
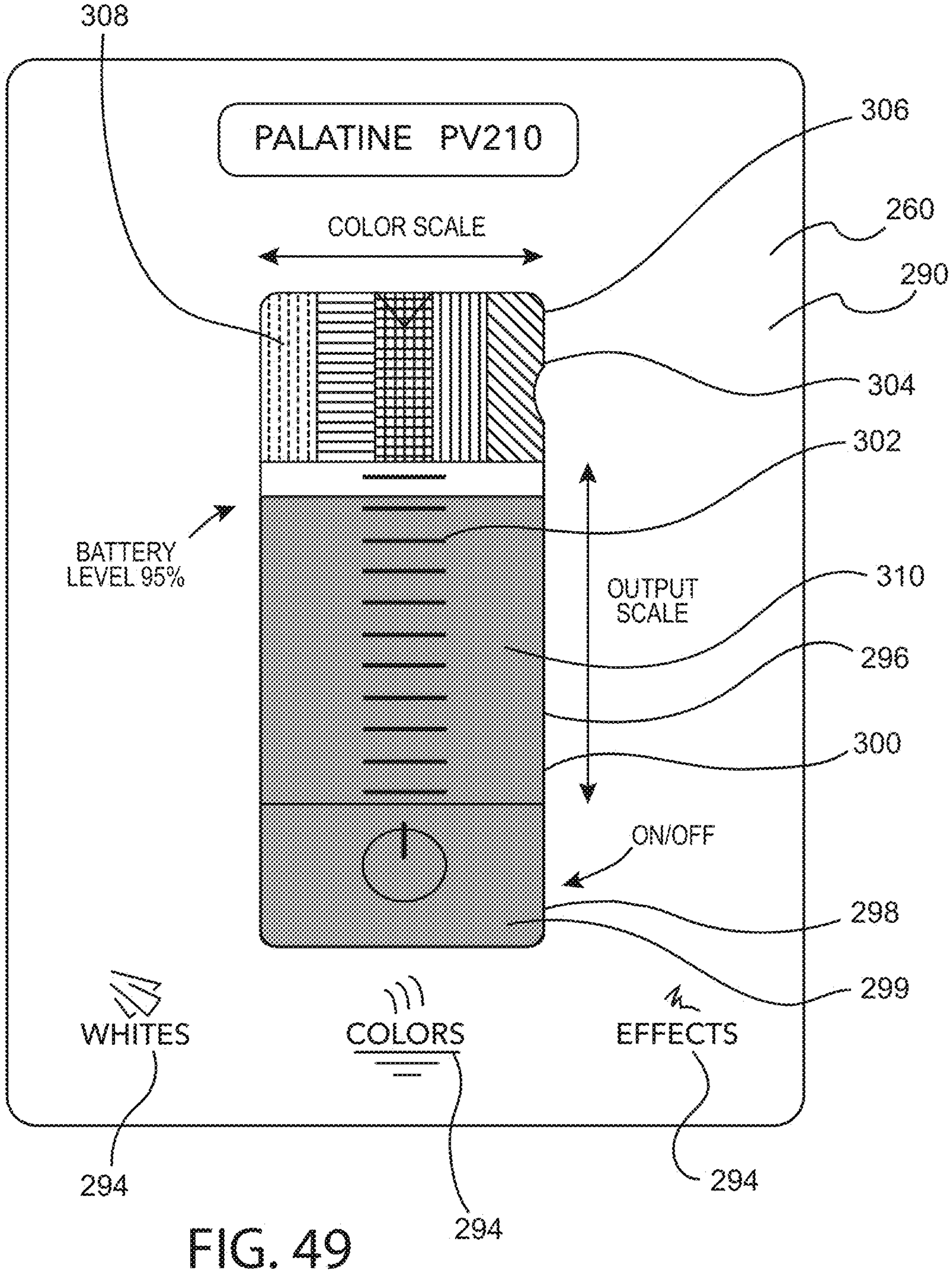
FIG. 49 is an example screen generated by application software for communicating with a light device showing a control screen for a light device.
Figure 50:
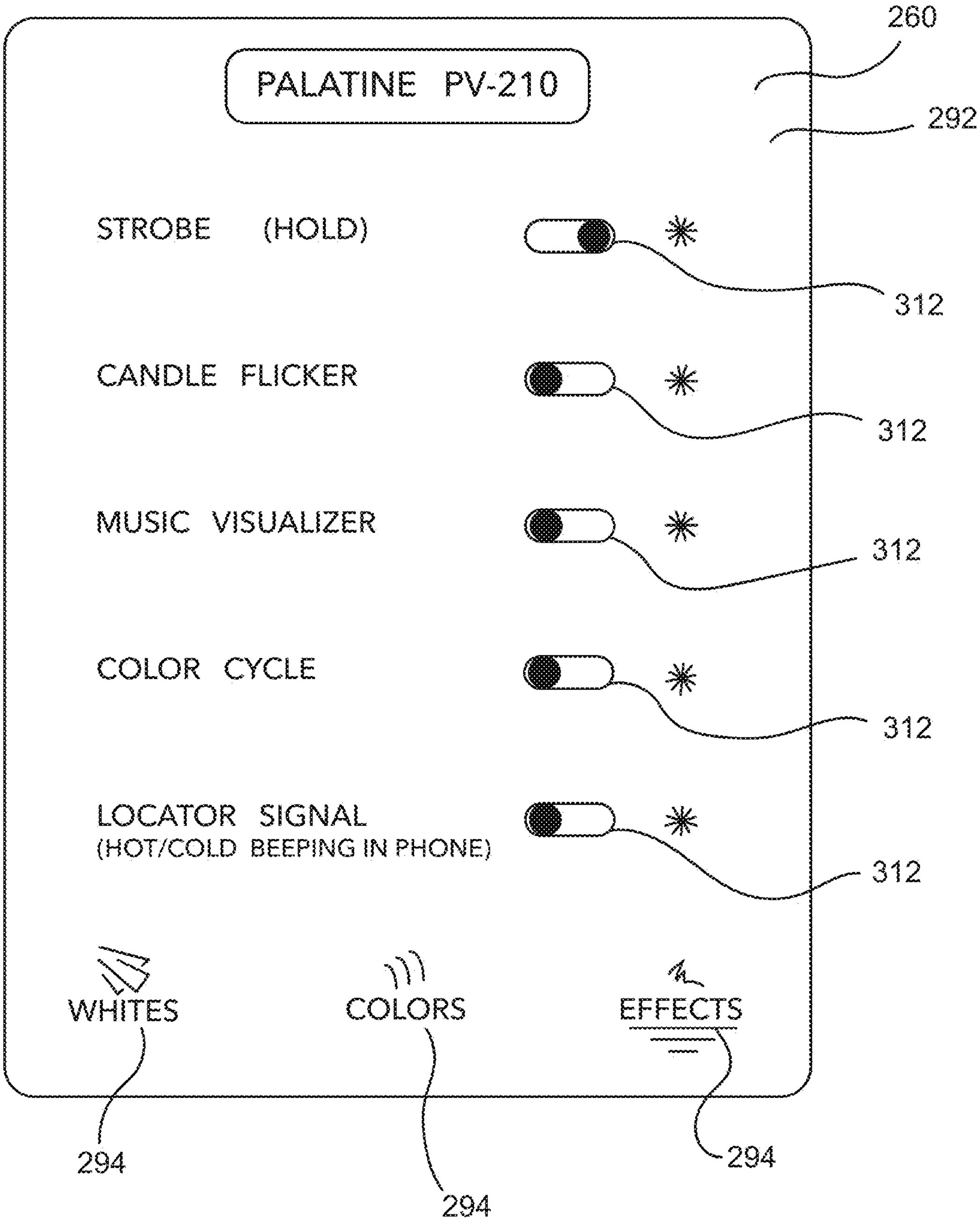
FIG. 50 is an example screen generated by application software for communicating with a light device showing an effects screen for a light device.

As shown in FIGS. 48-50, the app can further provide a series of screens 288, 290, 292, one or more of each dedicated to an individual light device 276. These screens 288, 290, 292 can be reached by selection of the desired light device 276 in the multiple device screen 284 of FIG. 47 or the setup screen 280 of FIG. 44. As shown, the device screens 288, 290, 292 can identify the light device 276 by name, indicate a current power source level, allow a user to set or adjust various settings, and/or enable or disable various effects. A user can cycle through the screens 288, 290, 292 by selection of an icon 294 for each screen located along the bottom or can swipe left or right as desired.

In first and second screens 288, 290, a profile 296 of the light device 276 is shown, which both confirms that the user is operating the correct device and provides a unique template, as described in more detail below. The first screen 288 can be directed to white-light use of the light device 276, while the second screen 290 can be directed to colored-light use of the light device 276, if applicable.

In the illustrated examples, a bottom portion 298 of each template 296 can include an on/off switch 299, allowing a user to shift the light device 276 between on and off states. A middle portion 300 of the template 296 can provide a brightness scale or slider 302 so that a user can adjust the brightness of the light device 276 by selecting a desired level. The scale or slider 302 can run vertically, as shown, horizontally, or other orientations. Next, a top portion 304 of the template can provide a color scale or slider 306 so that a user can adjust the color of the light projected from the light device 276. The background 308 of the top portion 304 of the template 296 can indicate each available color so that a user can quickly and easily choose a desired color. The color scale or slider 306 can run horizontally, as shown, vertically, or other orientations. A background 310 of the middle and/or bottom portions 300, 298 can also be utilized, as shown, to display a current power source level. For example, as the power source is depleted, the level indicator can adjust downward toward the bottom of the template 296.

Alternatively or in combination thereto, a percentage of remaining power level can be displayed in or next to the template 296.

In the third screen 292, shown in FIG. 50, the user can enable or disable various effects for the light device 276. The effects can be provided in a list, each with a corresponding switch 312. For example, the effects can include a strobe light, a candle flicker setting, a music visualizer functionality, cycling through available colors, or activating a locator signal that is displayed on or emitted by the user device 254. The locator signal can utilize the strength of the signal connection between the light device 276 and the user device 254 to signal to a user how close the light device 276 is. For example, with an audible signal, the user device 254 can increase a beeping frequency as the user approaches the light device 276 and decrease the beeping frequency as the user extends the distance from the light device 276. A light intensity or blinking could also be used.

Another embodiment, or a further functionality of the app, directed to the setup and control of other light devices, including light buttons, is shown in FIGS. 51A-55. Light buttons 314, shown in FIG. 51A, can have a base 315 and a cover 316 forming a housing 317. The light buttons 314 can further include one or more light sources 318, a power source 319, and circuitry for operating the light source including a control device 320, such as a processor, and a transceiver 321 to communicate with the user device 254 disposed within the housing 317. The light buttons 314 can further include one or more details or configurations disclosed in U.S. application Ser. No. 14/216,545, filed Mar. 17, 2014, which is hereby incorporated by reference herein in its entirety. The compact size and configuration of the light buttons 314 allows a user to place several in a desired area for directed lighting.

Figure 51A:
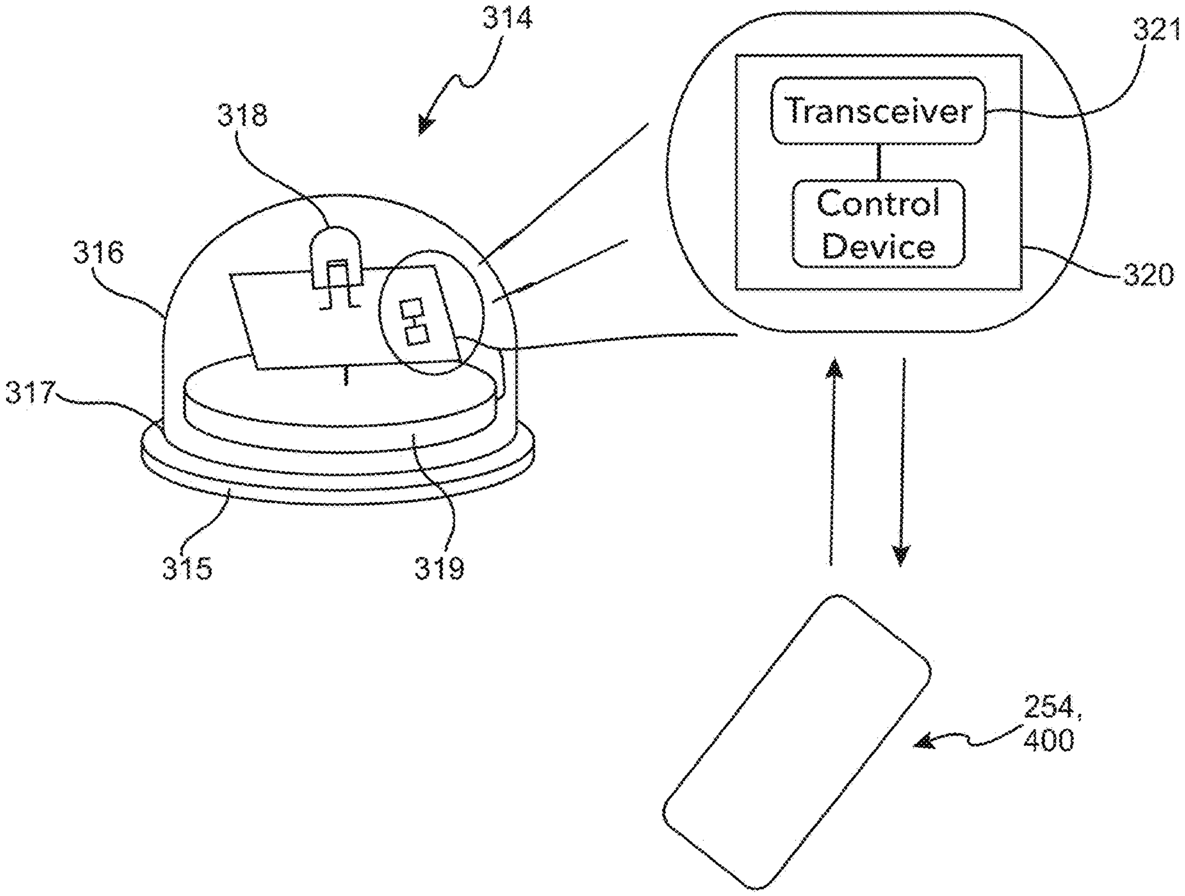
FIG. 51A is a diagram of a light button device in communication with a communication device.
Figure 51B:
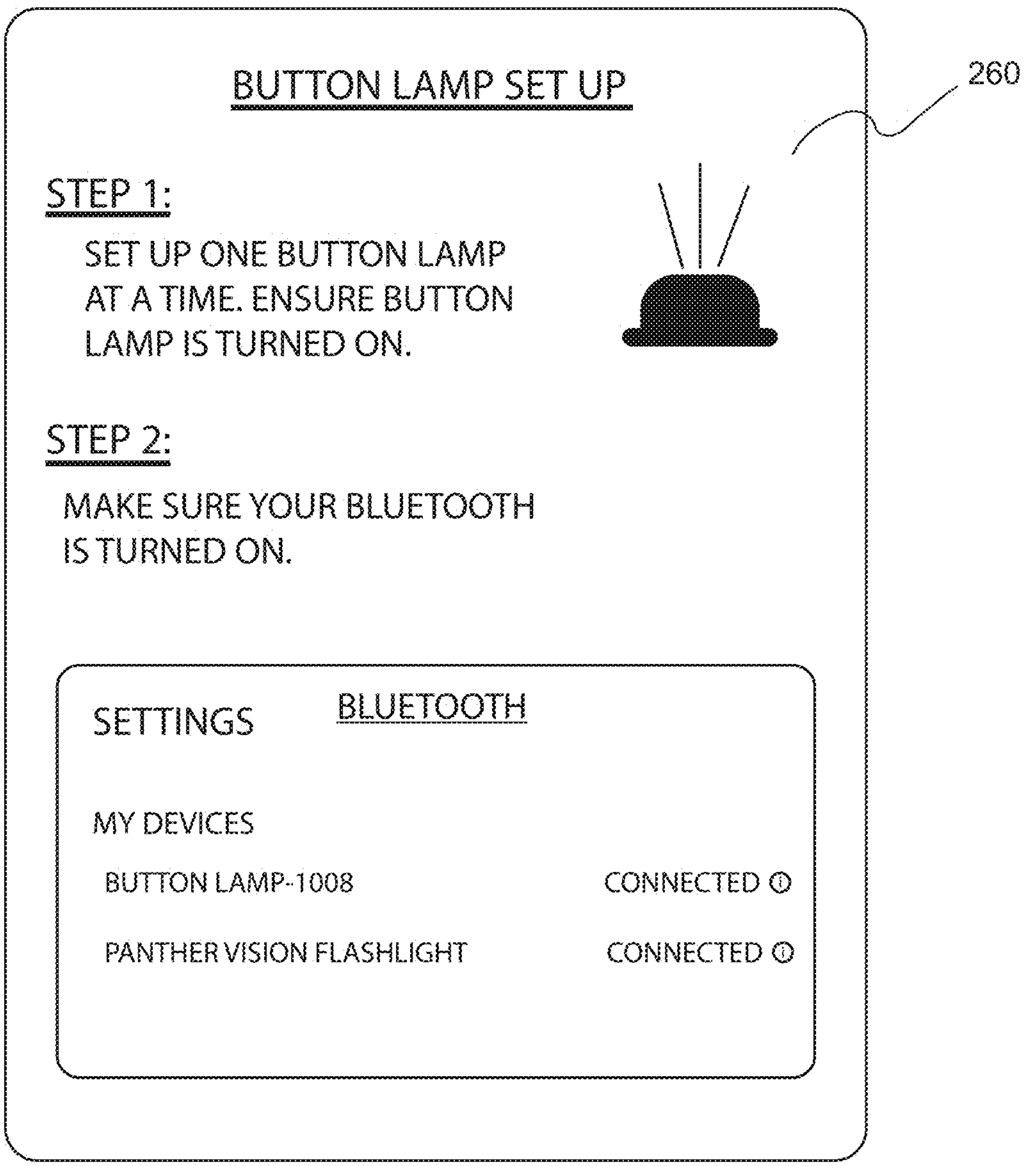
FIG. 51B is an example screen generated by application software for communicating with a light button showing a first set up screen.
Figure 52:
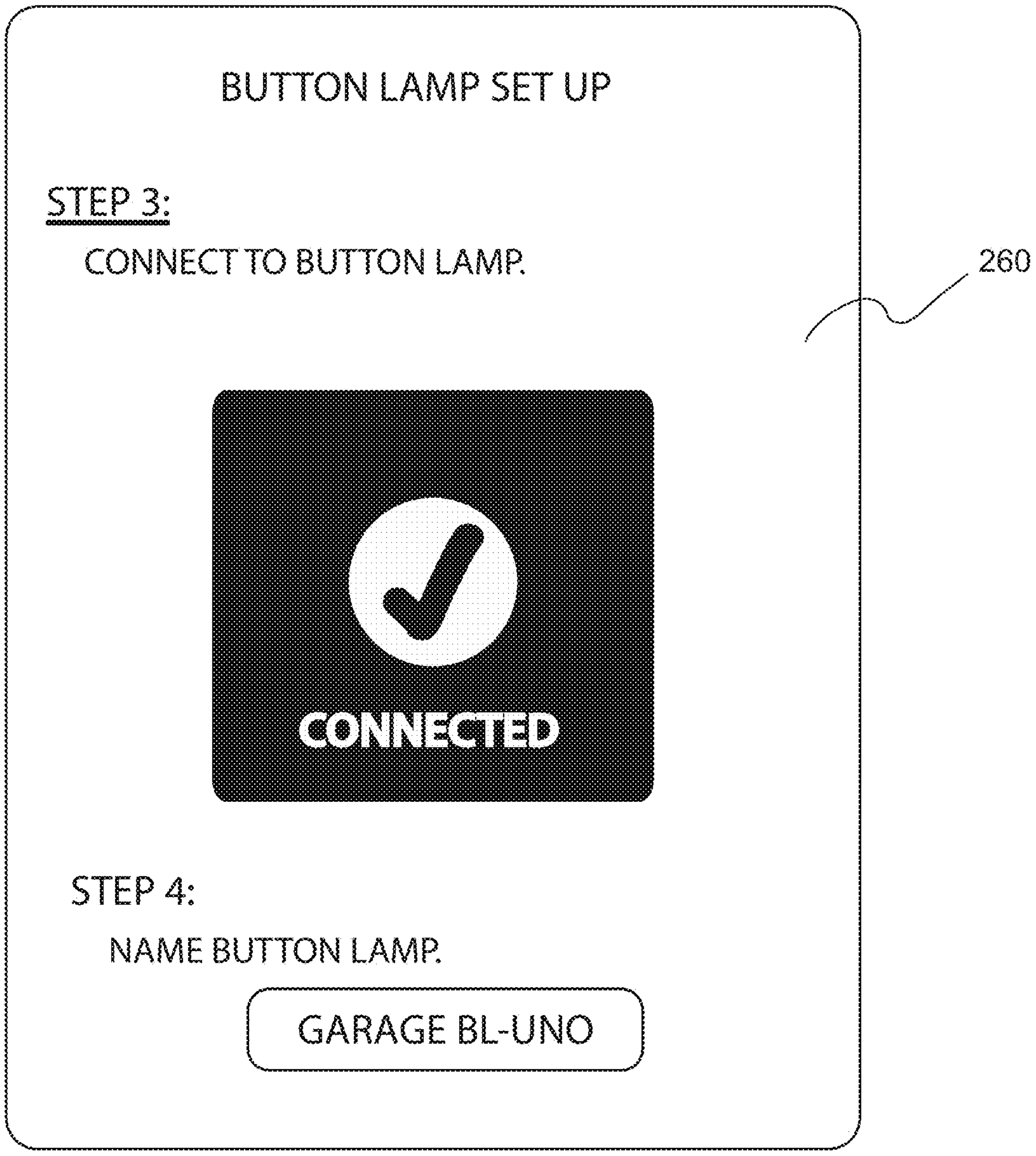
FIG. 52 is an example screen generated by application software for communicating with a light button showing a second set up screen.
Figure 53:
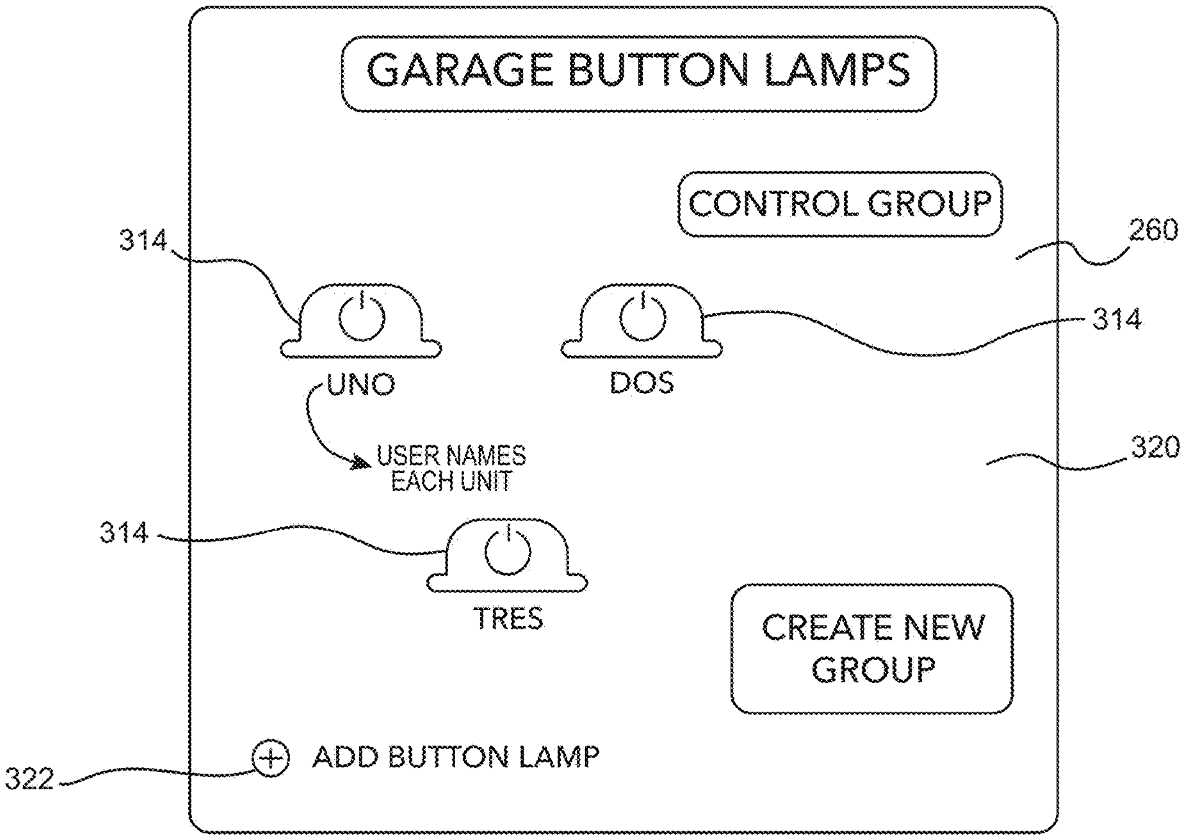
FIG. 53 is an example screen generated by application software for communicating with a light button showing a group of light buttons.

As shown in FIG. 51B, the app, once opened and brought to the front on a display 260 of the user device 254, can include introductory directions for setting up one or more of the light buttons 314. For example, a first step can be to make sure that only one desired light button 314 is currently turned on. A second step can be to make sure that the user device 254 currently has Bluetooth activated. A third step can be to connect the user device 254 to the light button 314. The connection can be achieved through selection of the desired light button identified on the display of the user device by a user, either within the app itself or within a separate settings section of the user device. The selection of the button causes the processor 402 to operate the transceiver 406 and 408 to establish a pairing connection with the transceiver 321 of the light button 314. The app can then confirm that the light button 314 is connected to the user device 254 by the processor 402 causing a confirmation indication to display on the display 410. A fourth step can be to name or rename the light button 314. To rename the light button 314, a user simply selects the name field and enters a desired name through the user inputs 412. The name can advantageously be used to reference a location of the light button 314 so that light can be turned on at desired locations easily. This process can then be repeated for other light buttons 314. The app can then store the registration information, including the name, in the memory 404 of the device 400.

If desired, the app can further provide a setup functionality to the user via a setup screen 280, such as that shown in FIG. 46 and described above, to change various settings for the light button 314, including an identification or name, owner, add or remove other authorized users, or the like, to provide the user with the model number of the light button, and to provide a help section.

So configured, a user can connect to any number of light buttons 314 with the app and control operation thereof. The app can advantageously display, like that shown in FIG. 53, all of the light buttons registered with the app in one or more screens 320, accessible by scrolling, swiping, or paging over. In addition to identifying which light buttons 314 are currently operating, the app can also display a current power level of the power source 319 for each light button 314. This informs the user of when a battery will need to be replaced or recharged as appropriate, as well as the current expected lifetime of the device given the power level.

The app can also provide a user the functionality to group light buttons 314 together for group operation. For example, a user can distribute light buttons 314 around a room as desired, name the buttons appropriately, group the buttons in a named group by selecting the desired buttons with a user input 412 and selecting a group option, and then collectively activate and deactivate the buttons 314 as desired via a selection of the on/off switch as discussed above. If desired, the app can display, like that shown in FIG. 54, a listing of groups of light buttons, as well as the names and power levels of the individual buttons. The app can also provide a software switch or button to add another product 322, the selection of which can take the user to the setup screen.

Figure 54:
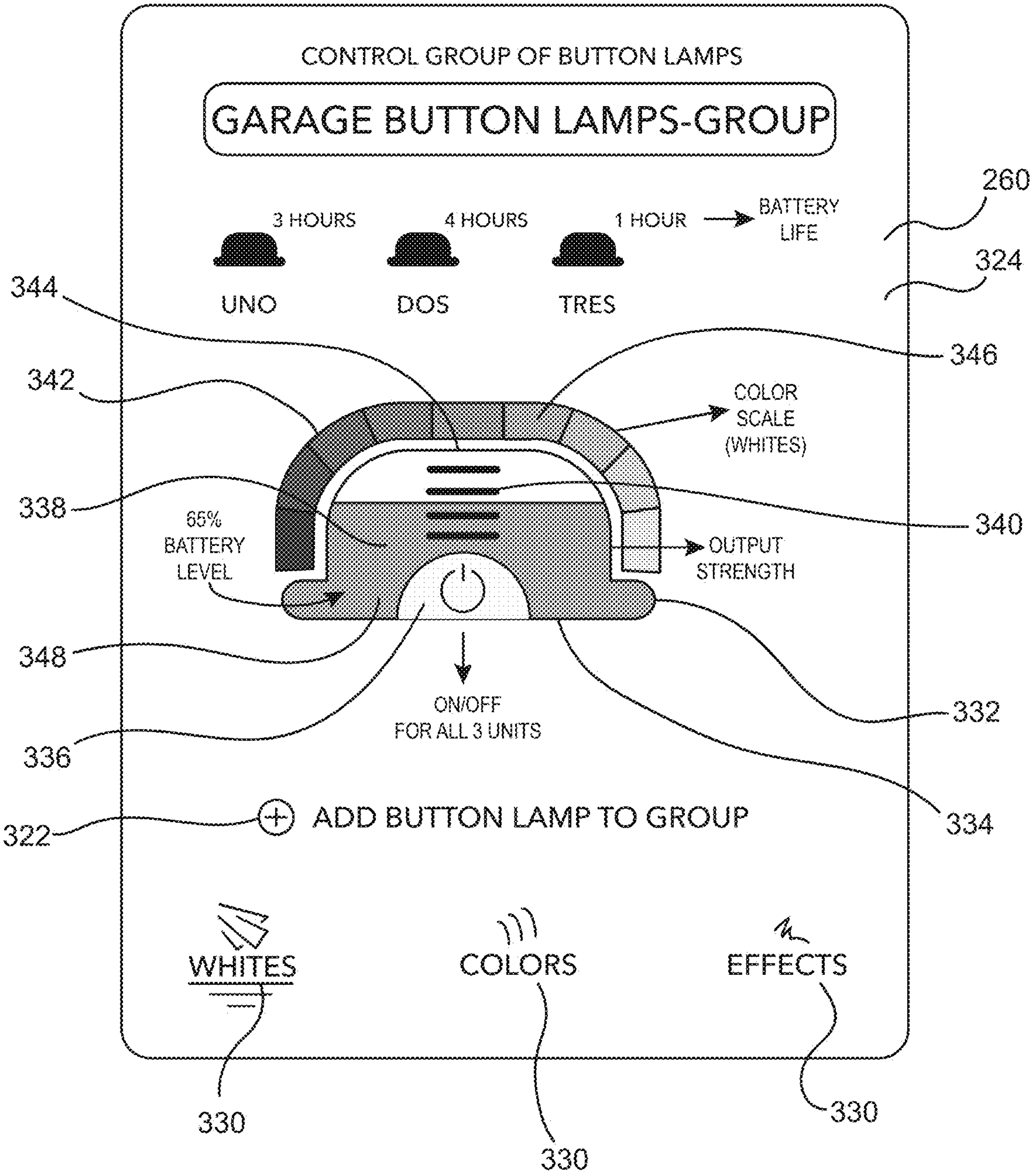
FIG. 54 is an example screen generated by application software for communicating with a light button showing a control screen for a group of light buttons.
Figure 55:
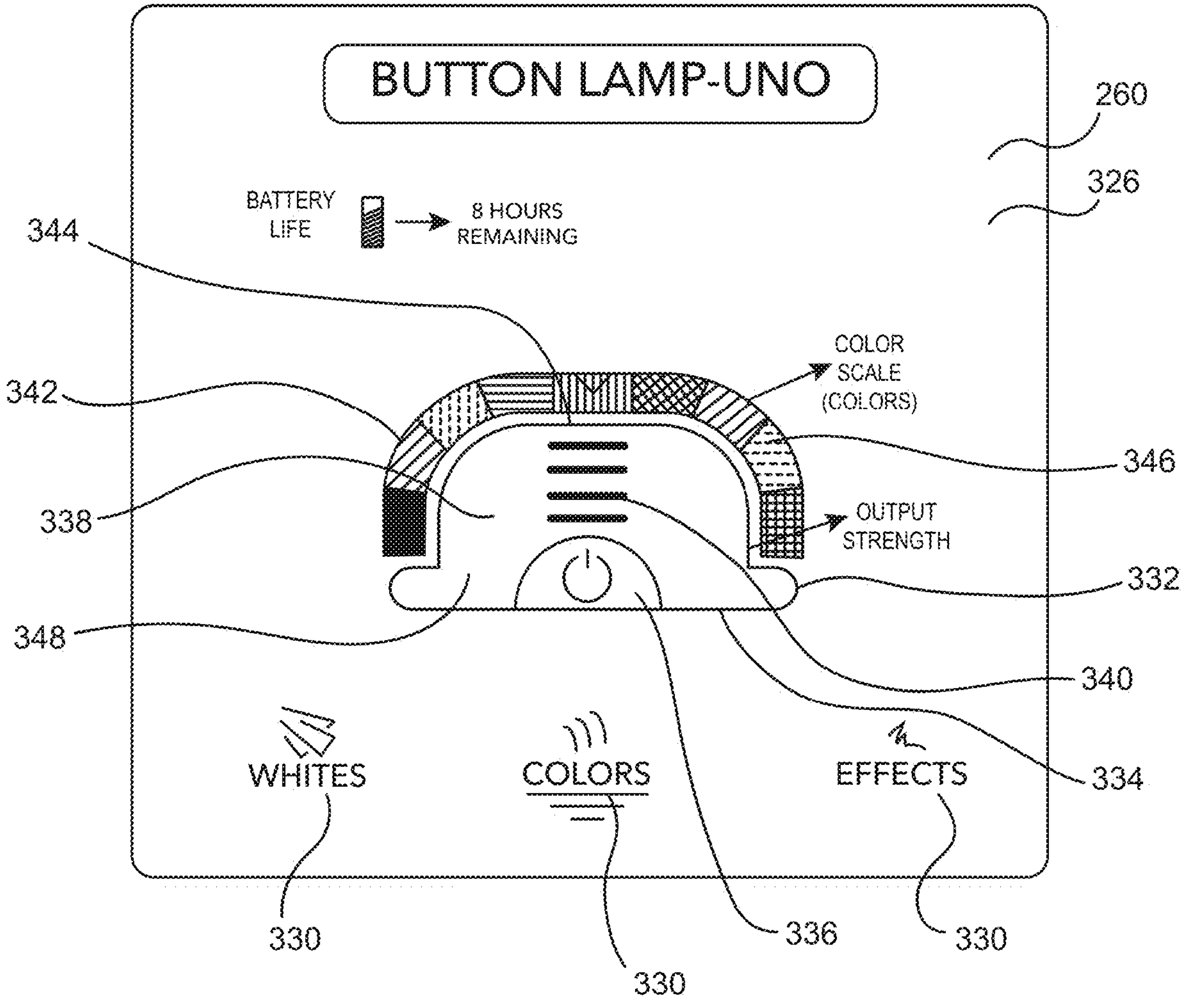
FIG. 55 is an example screen generated by application software for communicating with a light button showing an alternative control screen for a group of light buttons.

As shown in FIGS. 54 and 55, the app can further provide a series of screens 324, 326, one or more of each dedicated to a group of light buttons 314. Alternatively, or in addition thereto, these screens can be dedicated to an individual light button. These screens 324, 326, 328 can be reached by selection of the desired group or individual device in the multiple device screen of FIG. 53 or the setup screen of FIG. 46. As shown, the device screens can identify the group and light buttons by name, indicate a current power source level, allow a user to set or adjust various settings, and/or enable or disable various effects. A user can cycle through the screens by selection of an icon 330 for each screen located along the bottom or can swipe left or right as desired.

In first and second screens 324, 326, a profile 332 of an individual light button is shown, which both confirms that the user is operating the correct button device and provides a unique template, as described in more detail below. The first screen 324 can be directed to white-light use of the light buttons 314, while the second screen 326 can be directed to colored-light use of the light buttons 314, if applicable.

In the illustrated examples, a bottom portion 334 of each template 332 can include an on/off switch 336, allowing a user to shift the light buttons 314 between on and off states. The remaining portion 338 of the template can provide a brightness scale or slider 340 so that a user can adjust the brightness of the light device 314 by selecting a desired level. The scale or slider 340 can run vertically, as shown, horizontally, or other orientations. Next, a scale 342 can be provided over a top portion 344 of the template 332 for selection of a particular color of the light projected from the light buttons 314. The background 346 of the scale 342 can indicate each available color so that a user can quickly and easily choose a desired color. The color scale or slider 342 can run horizontally, as shown, vertically, or other orientations. The background 348 of the template can also be utilized, as shown in some embodiments, to display a current power source level. For example, as the power source is depleted, the level indicator can adjust downward toward the bottom of the template 332. Alternatively or in combination thereto, a percentage of remaining power level can be displayed next to the template 332.

In the third screen, the user can enable or disable various effects for the light buttons 314, such as those shown in the screen 292 of FIG. 50. The effects can be provided in a list, each with a corresponding switch 312. For example, the effects can include a strobe light, a candle flicker setting, a music visualizer functionality, cycling through available colors, or activating a locator signal that is displayed on or emitted by the user device 254.

Furthermore, for all of the application software described herein, the information entered by various users can be compiled at a remote storage location, such as a server device or the like. The compiled data allows a company to track user preferences and identify any issues with the products. For example, the compiled data can include how often the product is used and for how long, how often the batteries need to be replaced or recharged and how long recharging takes, any defective products, time of year the products are used, regional tendencies for particular products, as well as customer information, such as age, gender, profession, hobbies, marital status, etc. All of this information can be requested in a set up or registration screen presented by the application software or compiled as a result of the user using the application software.

Figure 56:
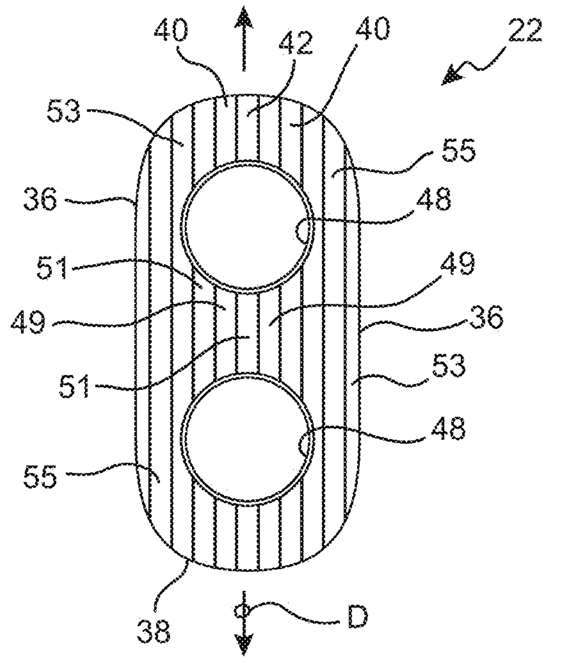
FIG. 56 is a perspective view of a flashlight showing a pair of recessed light sources disposed within lenses in a flashlight head having cooling fins extending therebetween, laterally outwardly on either side thereof, as well as above and below.
Figure 57:
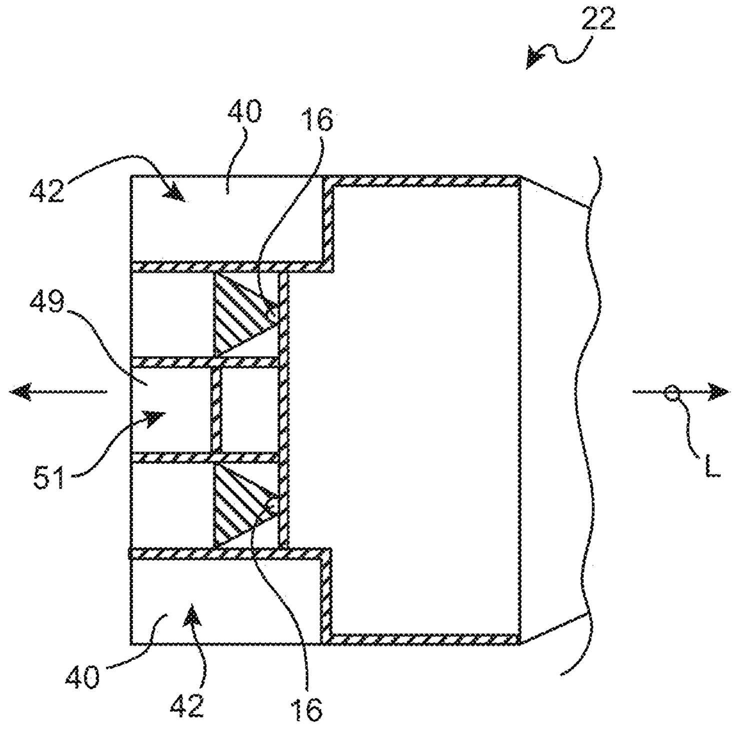
FIG. 57 is a cross-sectional view of the flashlight head of FIG. 56 showing the cooling fin configuration.
Figure 58:
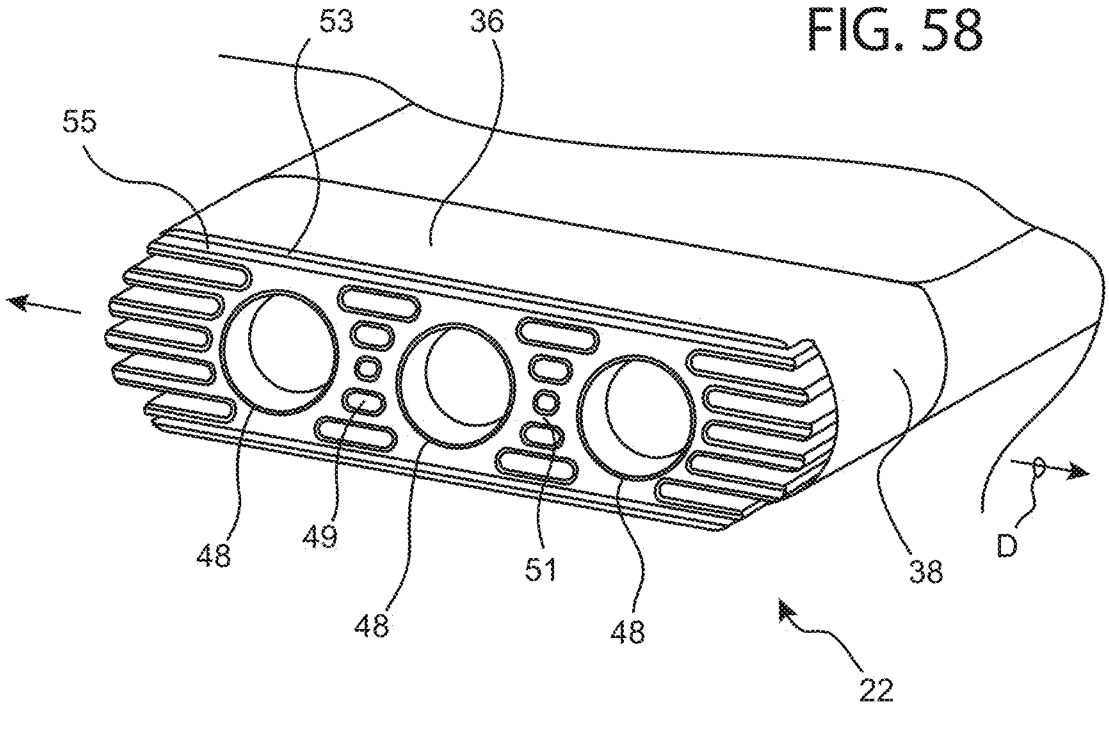
FIG. 58 is a sectional perspective view of a flashlight showing three recessed light sources disposed within lenses in a flashlight head having cooling fins extending therebetween, laterally outwardly on either side thereof, as well as above and below.

Multiple LED flashlight embodiments are shown in FIGS. 56-58. In a first embodiment, the flashlight 10 includes two light sources 16 disposed in the head 22 thereof in a side-by-side orientation spaced laterally along a centerline D of the head that extends generally orthogonal to the flashlight longitudinal axis L. In a second embodiment, the flashlight 10 includes three light sources 16 disposed in the head 22 thereof in a side-by-side orientation spaced laterally along the centerline D of the head. In the three LED embodiment where the head 22 has a width W extending between the rounded ends 38, center points of the openings 48 can be spaced apart by about 40% of the width W of the head 22 and the rounded ends 38 can be spaced apart by about 20% of the width W of the head 22. Although two or three LEDs are shown, any number of side-by-side LEDs laterally spaced along the centerline D or stacked LEDs spaced in a direction along a vertical axis V orthogonal to the centerline D and to the longitudinal axis L of the flashlight can be included with a similarly expanded configuration. For example, a four light source flashlight could have the light sources disposed in a square configuration.

In these forms, the head 22 includes through openings 48 for each of the light sources 16 in the front wall 44 thereof. The LEDs 16 are recessed within the head 22 similar to the embodiments described above and the through openings 48 can have similar configurations. Moreover, the flashlight can include all of some of the corresponding light mounting and electrical components previously set forth.

Next, the fins 40 and grooves 42 disposed laterally outwardly of the openings 48 can be configured as described above with respect to the single opening embodiments. As shown in FIGS. 56-58, however, the flashlights of these forms can further include fins 49 and grooves 51 disposed between the openings 48, as well as fins 53 and grooves 55 that extend the entire width of the flashlight head 22 above and below the openings 48. In the illustrated form, the fins 49 and grooves 51 extend linearly in a parallel manner between the rounded ends 38 of the flashlight head 22. Of course, the fins and grooves can extend between and orthogonal to the sides 36 of the flashlight head 22 or extend obliquely with respect thereto.

Figure 44:
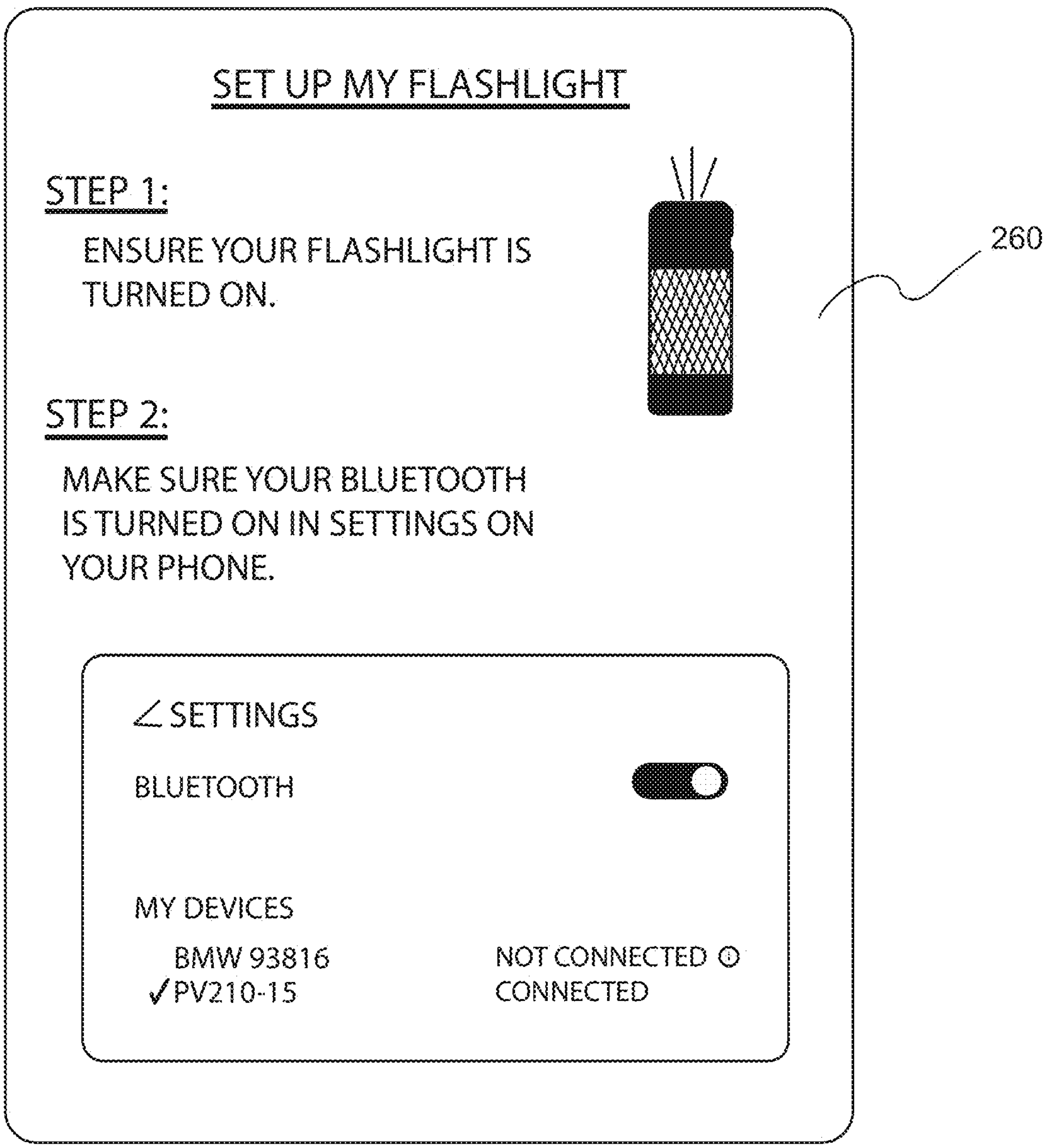
FIG. 44 is an example screen generated by application software for communicating with a light device showing a second set up screen.
Figure 45:
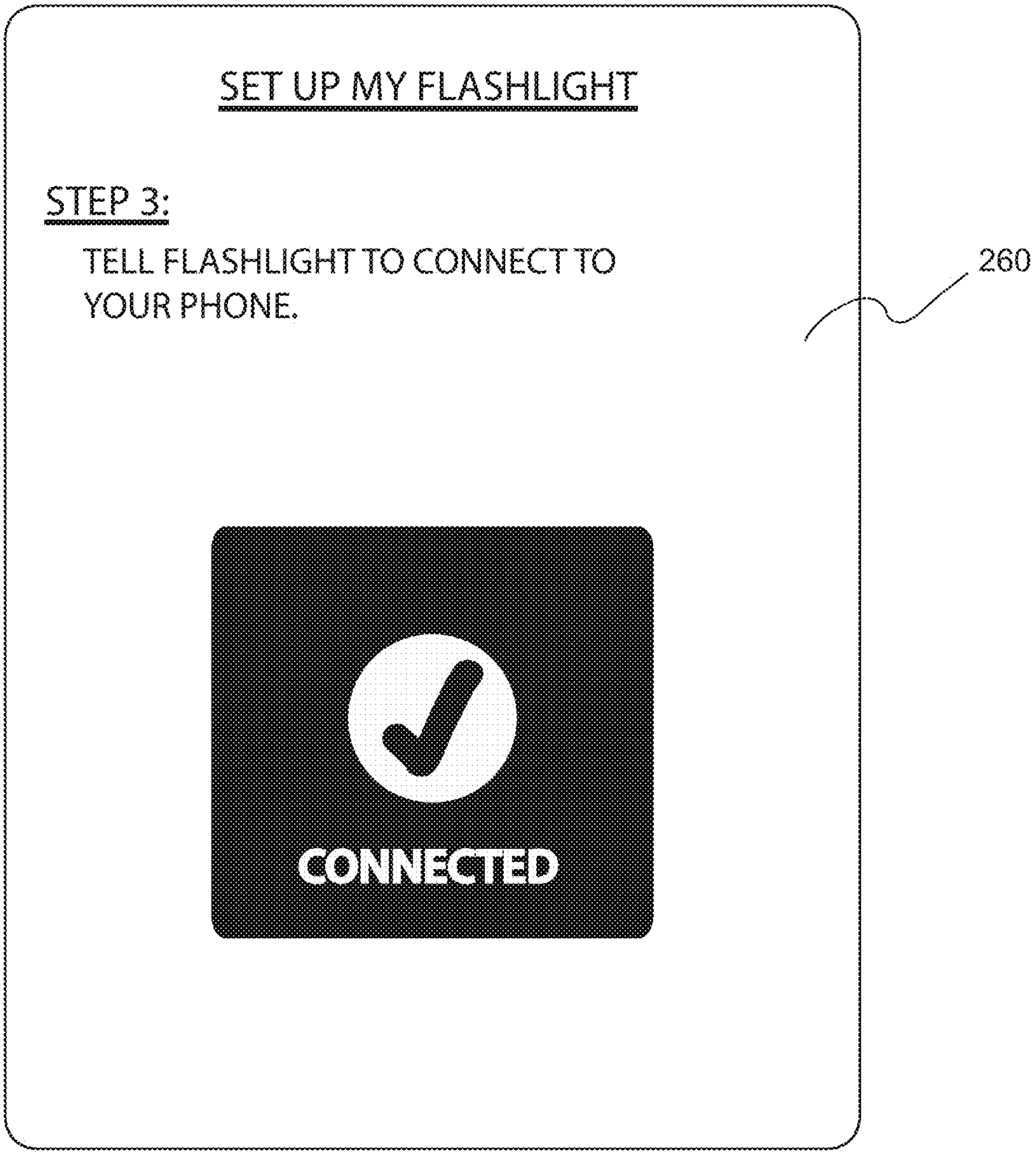
FIG. 45 is an example screen generated by application software for communicating with a light device showing a third set up screen.

If desired, the cooling structure can be configured to accommodate the electrical components for the flashlight. For example, as shown in FIG. 44, the fins 49 and grooves 51 disposed between the openings 48 can have a relatively shorter depth from a front face of the flashlight head 22 rearwardly along the flashlight longitudinal axis L as compared to the other fins 40, 51 and grooves 42, 53. Although the two LED embodiment is shown, one or both of the fins 49 and grooves 51 disposed between adjacent openings of the three LED can also have a relatively shorter depth. As such, the flashlight head 22 can house electrical components, such as any or all of the components of the front light assembly 56 described above, generally centrally therein between the openings 48 so that the overall length of the flashlight 10 is compact. This configuration advantageously maintains a small profile for the flashlight while also providing cooling structure across the entire face of the flashlight head 22.

Additionally, the flashlight of these forms can optionally include a larger power source than those previously discussed. For example, the flashlight central portion 24 can be sized so that the power source compartment therein can receive C batteries, D batteries, or the like, which can be disposed in a single row align lengthwise along the flashlight longitudinal axis L or multiple rows extending along the longitudinal axis L disposed laterally next to each other as desired. The flashlight embodiments can also utilize relatively high-powered 7 watt LEDs configured to emit 1000 lumens each, so that the 2 LED embodiment emits 2000 lumens and the 3 LED embodiment emits 3000 lumens.

In these instances, the dimensions of the central portion 24 will be larger and therefore the flashlight head 22 will be larger. Accordingly, these increased dimensions can be utilized to increase the size of the lens 78 disposed forwardly of the LEDs 16. In one example, the front circular surface of the lenses 78 can have about the same diameter as the power source 20. As such, in a form using C batteries having a 26.2 mm diameter and 50 mm height, the lens 78 can similarly have a diameter of about 26.2 mm. In another form using D batteries having a 34.2 mm diameter and a 61.5 mm height, the lens 78 can similarly have a diameter of about 34.2 mm.

The switch device 18 utilized in any of the flashlights described above can have additional functionalities other than a traditional two-setting on/off switch. For example, the switch can have high/low settings so provide more or less illumination as desired. Additionally, for flashlights having more than one LED, the switch can include positions so that individual ones or combinations of the LEDs are illuminated. For example, in a two LED flashlight, the switch device can be a multiple-position switch, or be configured to cycle through multiple settings, corresponding to some or all of: off, all on, one on, one low, two low. In a three LED flashlight, the switch device can be configured to cycle through multiple settings corresponding to some or all of: off, all on, one on, two on, three on, one low, two low, three low. Moreover, the multiple-LED flashlight can include different types of LEDs, such as red or green LEDs, and the switch device can be configured to cycle through illuminating the LEDs individually.

It will be understood that various changes in the details, materials, and arrangements of the parts and components that have been described and illustrated in order to explain the nature of the lighted components as described herein may be made by those skilled in the art within the principle and scope of this disclosure.

The invention claimed is:

1. A flashlight comprising:

an elongate housing extending along a longitudinal axis and having a forward portion with a forwardly facing surface and a rearward portion;

cooling fins of the forward portion of the elongate housing;

elongate slots between the cooling fins;

a forwardly facing central opening in the forwardly facing surface disposed centrally therein and having an arcuate, annular surface extending therearound, the cooling fins disposed at least partially around the opening;

a power source disposed within the housing; a switch device mounted to the housing;

an LED disposed in the forward portion of the elongate housing and mounted to project light through the opening, the LED electrically connected to the power source and the switch device so that the LED can be selectively energized;

wherein the LED is mounted within the forward portion so that the cooling fins dissipate heat generated by the operation thereof, and the cooling fins and elongate slots therebetween extend rearwardly along the longitudinal axis from the forwardly facing surface with the slots opening at forward ends thereof to the forwardly facing surface, the cooling fins and elongate slots each also extend laterally outward in a lateral direction relative to the LED with the cooling fins extending laterally parallel to one another and the elongate slots extending laterally parallel to one another, a central axis of the central opening extends orthogonally to the longitudinal axis and the lateral direction to bisect the central opening, and the elongate slots have inner ends that are closely adjacent to and spaced from the central opening and are laterally spaced at varying lateral distances from the central axis so that the inner ends together cooperate to form an arcuate, annular wall portion extending about the central opening which includes at least a portion of the annular surface.

2. The flashlight of claim 1, wherein the power source is a rechargeable power source.

3. The flashlight of claim 1 wherein the elongate slots each have a generally constant thickness between adjacent ones of the cooling fins taken in a direction along the central axis.

4. The flashlight of claim 1, wherein the cooling fins surround a majority of the opening.

5. The flashlight of claim 4, wherein the housing has a narrow configuration between top and bottom wall portions with sidewall portions extending between the top and bottom wall portions, the sidewall portions being smaller than the top and bottom wall portions to provide the housing with the narrow configuration thereof, the cooling fins extending laterally inwardly from the sidewall portions on either side of the opening.

6. A flashlight comprising:

an elongate housing extending along a longitudinal axis and having a forward portion with a forwardly facing surface and a rearward portion;

cooling fins of the forward portion of the elongate housing;

elongate slots between the cooling fins;

a forwardly facing opening in the forwardly facing surface, the cooling fins disposed at least partially around the opening;

a power source disposed within the housing; a switch device mounted to the housing;

an LED disposed in the forward portion of the elongate housing and mounted to project light through the opening, the LED electrically connected to the power source and the switch device so that the LED can be selectively energized;

wherein the LED is mounted within the forward portion so that the cooling fins dissipate heat generated by the operation thereof, and the cooling fins and elongate slots therebetween extend rearwardly along the longitudinal axis from the forwardly facing surface with the slots opening at forward ends thereof to the forwardly facing surface, the cooling fins and elongate slots each also extending laterally outward in a lateral direction relative to the LED with the cooling fins extending laterally parallel to one another and the elongate slots extending laterally parallel to one another, and the forward portion, the rearward portion, and a middle portion of the housing are formed as three pieces that are separably assembled together.

7. The flashlight of claim 6, wherein connections between the forward, middle, and rearward portions of the housing include seals therein such that the housing is waterproof.

8. The flashlight of claim 6, wherein the forward and rearward portions of the housing connect together capturing the middle portion therebetween.

9. The flashlight of claim 8, wherein the forward and rearward portions of the housing connect together using fasteners extending through the middle portion.

10. The flashlight of claim 9, wherein the middle portion includes interior channels on opposing sides thereof sized to receive the fasteners therethrough.

* * * * *